US012566124B2

(12) United States Patent
Khismatullin et al.

(10) Patent No.: US 12,566,124 B2
(45) Date of Patent: Mar. 3, 2026

(54) APPARATUS, SYSTEMS AND METHODS FOR IN VITRO SCREENING OF COMPLEX BIOLOGICAL FLUIDS

(71) Applicant: The Administrators of the Tulane Educational Fund, New Orleans, LA (US)

(72) Inventors: Damir Khismatullin, New Orleans, LA (US); Nithya Kasireddy, Hyderabad (IN)

(73) Assignee: The Administrators of the Tulane Educational Fund, New Orleans, LA (US)

( * ) Notice: Subject to any disclaimer, the term of this patent is extended or adjusted under 35 U.S.C. 154(b) by 0 days.

(21) Appl. No.: 17/793,879

(22) PCT Filed: Jan. 27, 2021

(86) PCT No.: PCT/US2021/015336
§ 371 (c)(1),
(2) Date: Aug. 5, 2021

(87) PCT Pub. No.: WO2021/154890
PCT Pub. Date: Aug. 5, 2021

(65) Prior Publication Data
US 2023/0041135 A1 Feb. 9, 2023

Related U.S. Application Data

(60) Provisional application No. 62/966,316, filed on Jan. 27, 2020.

(51) Int. Cl.
*G01N 15/1429* (2024.01)
*B01L 3/00* (2006.01)
(Continued)

(52) U.S. Cl.
CPC .... *G01N 15/1429* (2013.01); *B01L 3/502761* (2013.01); *G01N 15/0227* (2013.01);
(Continued)

(58) Field of Classification Search
CPC .......... G01N 15/1429; G01N 15/0227; G01N 29/036; G01N 29/348; G01N 2015/0073;
(Continued)

(56) References Cited

U.S. PATENT DOCUMENTS 6,949,355 B2 9/2005 Yamanishi
2003/0124516 A1 7/2003 Chung
(Continued)

FOREIGN PATENT DOCUMENTS

JP 298651 A 4/1990
WO 2017085613 A4 5/2017
WO WO-2017085613 A1 * 5/2017

OTHER PUBLICATIONS

Jenkins, Rob, et al. "Design, construction and analysis of 60 Hz notch filters." Philadelphia: Department of Bioengineering, University of Pennsylvania (1998) (Year: 1998).*
(Continued)

*Primary Examiner* — Timothy P Graves

(57) ABSTRACT

The disclosed apparatus, systems and methods relate to technology that provides a method for the assessment of the polymerization of a sample, e.g., whole blood or blood plasma coagulation, by a non-contact acoustic tweezing device via the application of a sweeping frequency to the levitating sample and the corresponding assessment of extracted sample parameters.

14 Claims, 37 Drawing Sheets

(51) Int. Cl.

| | |
|---|---|
| *G01N 15/0227* | (2024.01) |
| *G01N 29/036* | (2006.01) |
| *G01N 29/34* | (2006.01) |
| *G01N 15/01* | (2024.01) |
| *G01N 15/14* | (2006.01) |

(52) U.S. Cl.
CPC ......... *G01N 29/036* (2013.01); *G01N 29/348* (2013.01); *B01L 2200/0663* (2013.01); *B01L 2300/0654* (2013.01); *B01L 2400/0436* (2013.01); *G01N 2015/012* (2024.01); *G01N 2015/016* (2024.01); *G01N 2015/1493* (2013.01); *G01N 2015/1497* (2013.01); *G01N 2291/02818* (2013.01); *G01N 2291/02827* (2013.01)

(58) Field of Classification Search
CPC ..... G01N 2015/008; G01N 2015/1493; G01N 2015/1497; G01N 2291/02818; G01N 2291/02827; G01N 29/032; G01N 2015/0038; G01N 15/0205; G01N 15/1425; G01N 29/4436; G01N 2011/0073; G01N 15/06; G01N 2015/0092; G01N 2015/1006; G01N 2015/1486; G01N 29/2418; G01N 29/46; B01L 3/502761; B01L 2200/0663; B01L 2300/0654; B01L 2400/0436; B01L 2200/0652; B01L 2200/0626

See application file for complete search history.

(56) References Cited

U.S. PATENT DOCUMENTS

| | | | |
|---|---|---|---|
| 2017/0016878 A1* | 1/2017 | Khismatullin ......... G01N 11/02 |
| 2019/0212332 A1 | 7/2019 | Dimov |
| 2019/0255527 A1 | 8/2019 | Candelli |
| 2019/0353637 A1 | 11/2019 | Khismatullin et al. |

OTHER PUBLICATIONS

Mitchell, G., and Y. Bayazitoglu. "Viscosity measurements of acoustically levitated droplets in air." 34th Aerospace Sciences Meeting and Exhibit. 1996 (Year: 1996).*

Yang Fen et al: "Single-Cell Photoacoustic Microrheology", IEEE Transactions on Medical Imaging, IEEE, USA, vol. 39, No. 6, Dec. 5, 2019 (Dec. 5, 2019), pp. 1791-1800, XP011790842, ISSN: 0278-0062, DOI: 10.1109/TMI.2019.2958112.

Yamada et al: "Predicting Materials Properties with Little Data Using Shotgun Transfer Learning", DOI: 10.1021/acscentsci.9b00804 ACS Cent. Sci. 2019, 5, 1717-1730.

Rao: "Prediction of Future Observations in Growth Curve Models", Statistical Science 1987, vol. 2, No. 4, 434-471.

Copas: "Regression, Predictions and Shrinkage", J.R. Statist. Soc. B (1983), 45, No. 3, pp. 311-354.

Kelemen et al: "Elastic Model-Based Segmentation of 3-D Neuroradiological Data Sets", IEEE Transactions on Medical Imaging, vol. 18, No. 10, Oct. 1999.

Jenkins et al: "Design, Construction and Analysis of 60 Hz Notch Filters", 1998, BE 309 Laboratory, Department of Bioengineering, University of Pennsylvania, Philadelphia 19104.

Hosseinzadeh et al: "Monitoring of blood coagulation with non-contact drop oscillation rheometry", J Thromb Haemost. 2019;17:1345-1353. https://doi.org/10.1111/jth.14486.

Holt et al: "Quasi-static acoustic tweezing thromboelastometry", J Thromb Haemost 2017; 15: 1453-62.

Weisel et al: "Computer modeling of fibrin polymerization kinetics correlated with electron microscope and turbidity observations: clot structure and assembly are kinetically controlled", 1992, Department of Anatomy, University of Pennsylvania School of Medicine, Philadelphia, Pennsylvania 19104-6058 USA.

Kaibara et al: "Rheology of Blood Coagulation", Biorheology, vol. 33, No. 2, pp. 101-117, 1996.

* cited by examiner

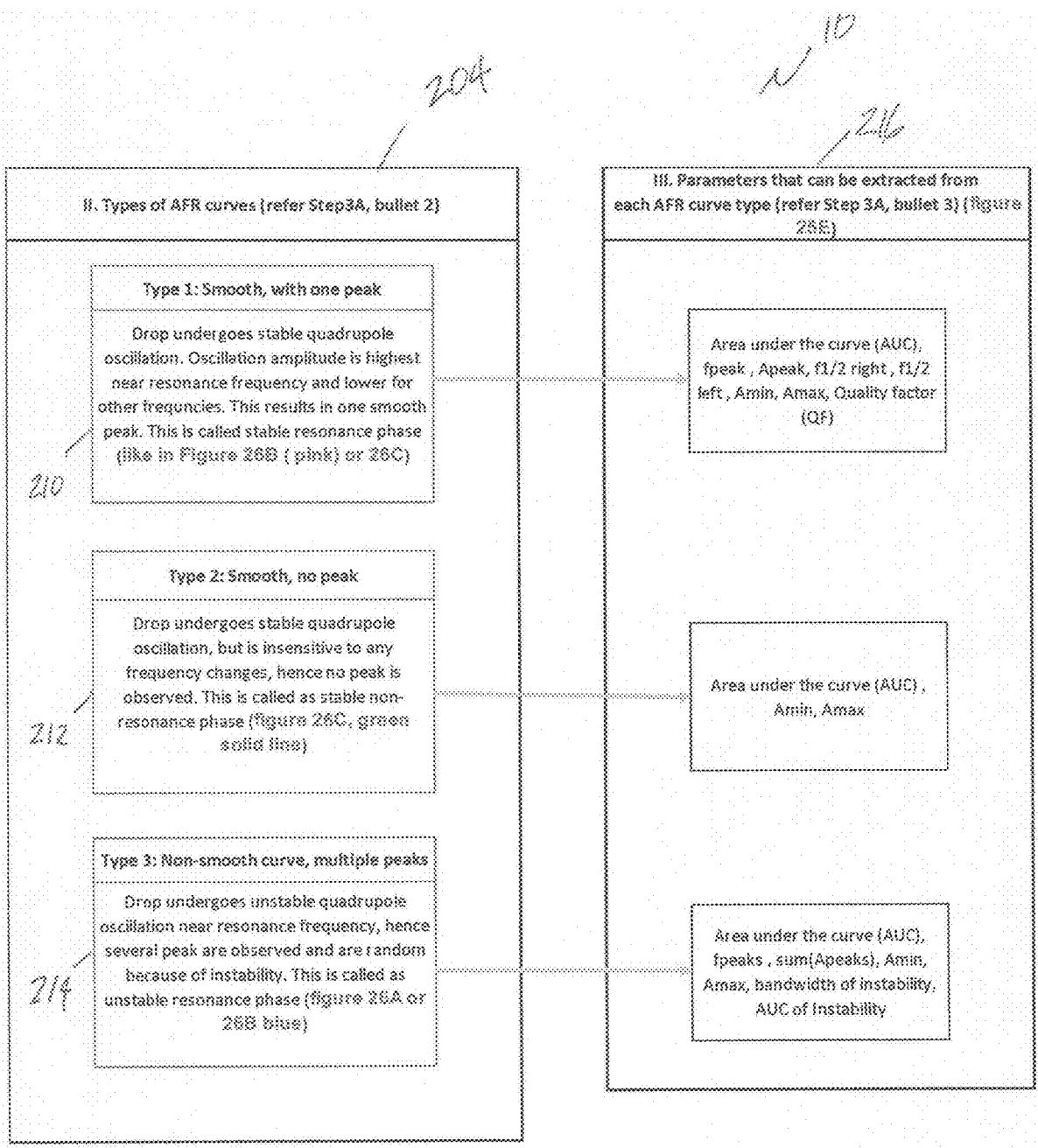

II. Types of AFR curves (refer Step3A, bullet 2)

Type 1: Smooth, with one peak

Drop undergoes stable quadrupole oscillation. Oscillation amplitude is highest near resonance frequency and lower for other frequncies. This results in one smooth peak. This is called stable resonance phase (like in Figure 26B ( pink) or 26C)

Type 2: Smooth, no peak

Drop undergoes stable quadrupole oscillation, but is insensitive to any frequency changes, hence no peak is observed. This is called as stable non-resonance phase (figure 26C, green solid line)

Type 3: Non-smooth curve, multiple peaks

Drop undergoes unstable quadrupole oscillation near resonance frequency, hence several peak are observed and are random because of instability. This is called as unstable resonance phase (figure 26A or 26B blue)

III. Parameters that can be extracted from each AFR curve type (refer Step 3A, bullet 3) (figure 26E)

Area under the curve (AUC), fpeak , Apeak, f1/2 right , f1/2 left , Amin, Amax, Quality factor (QF)

Area under the curve (AUC) , Amin, Amax

Area under the curve (AUC), fpeaks , sum(Apeaks), Amin, Amax, bandwidth of instability, AUC of instability

FIG. 12B

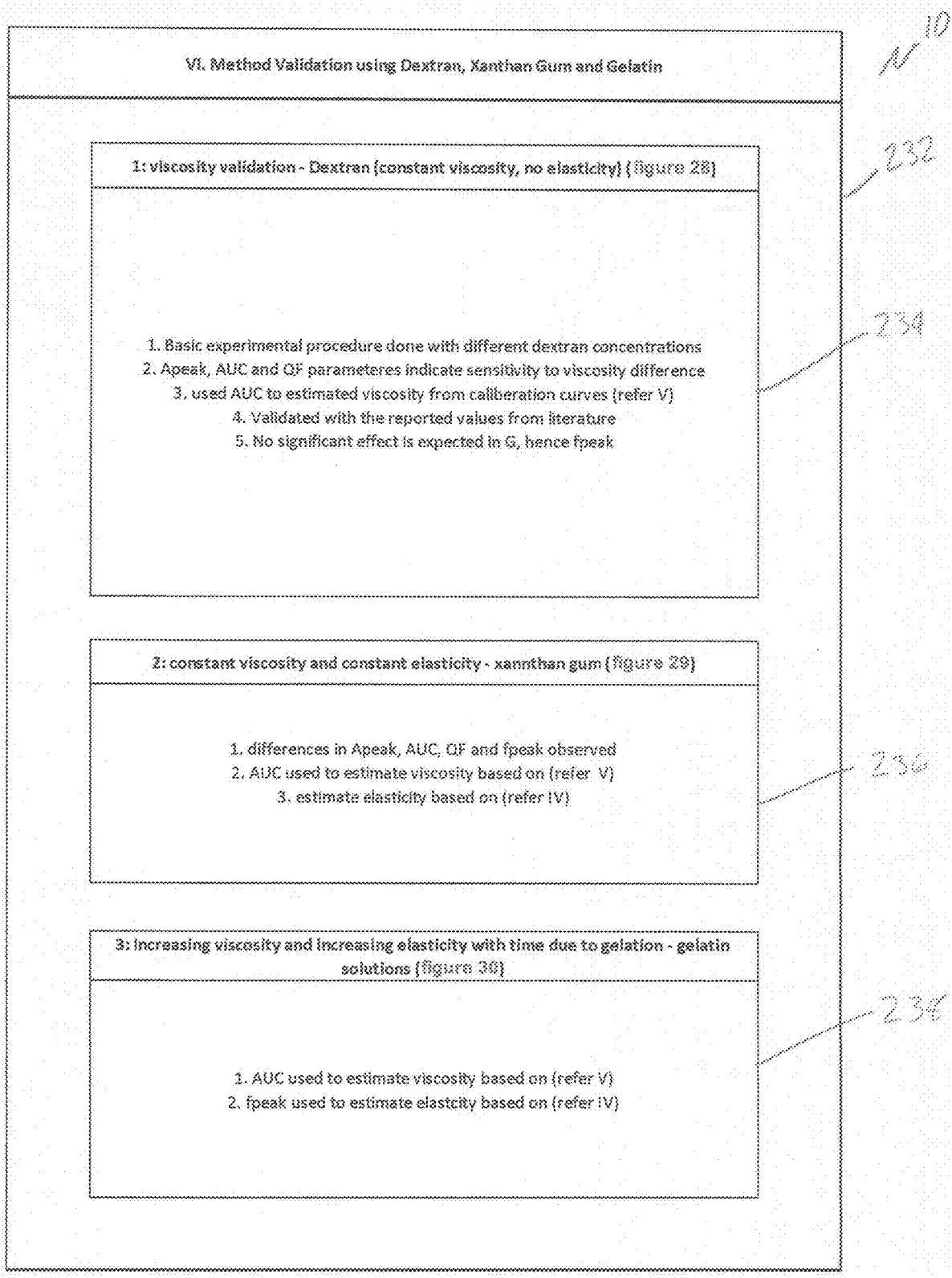

VI. Method Validation using Dextran, Xanthan Gum and Gelatin

1: viscosity validation – Dextran (constant viscosity, no elasticity) (figure 28)

1. Basic experimental procedure done with different dextran concentrations
2. Apeak, AUC and QF parameteres indicate sensitivity to viscosity difference
3. used AUC to estimated viscosity from caliberation curves (refer V)
4. Validated with the reported values from literature
5. No significant effect is expected in G, hence fpeak 2: constant viscosity and constant elasticity – xannthan gum (figure 29)

1. differences in Apeak, AUC, QF and fpeak observed
2. AUC used to estimate viscosity based on (refer V)
3. estimate elasticity based on (refer IV)

3: increasing viscosity and increasing elasticity with time due to gelation – gelatin solutions (figure 30)

1. AUC used to estimate viscosity based on (refer V)
2. fpeak used to estimate elastcity based on (refer IV)

FIG. 12E

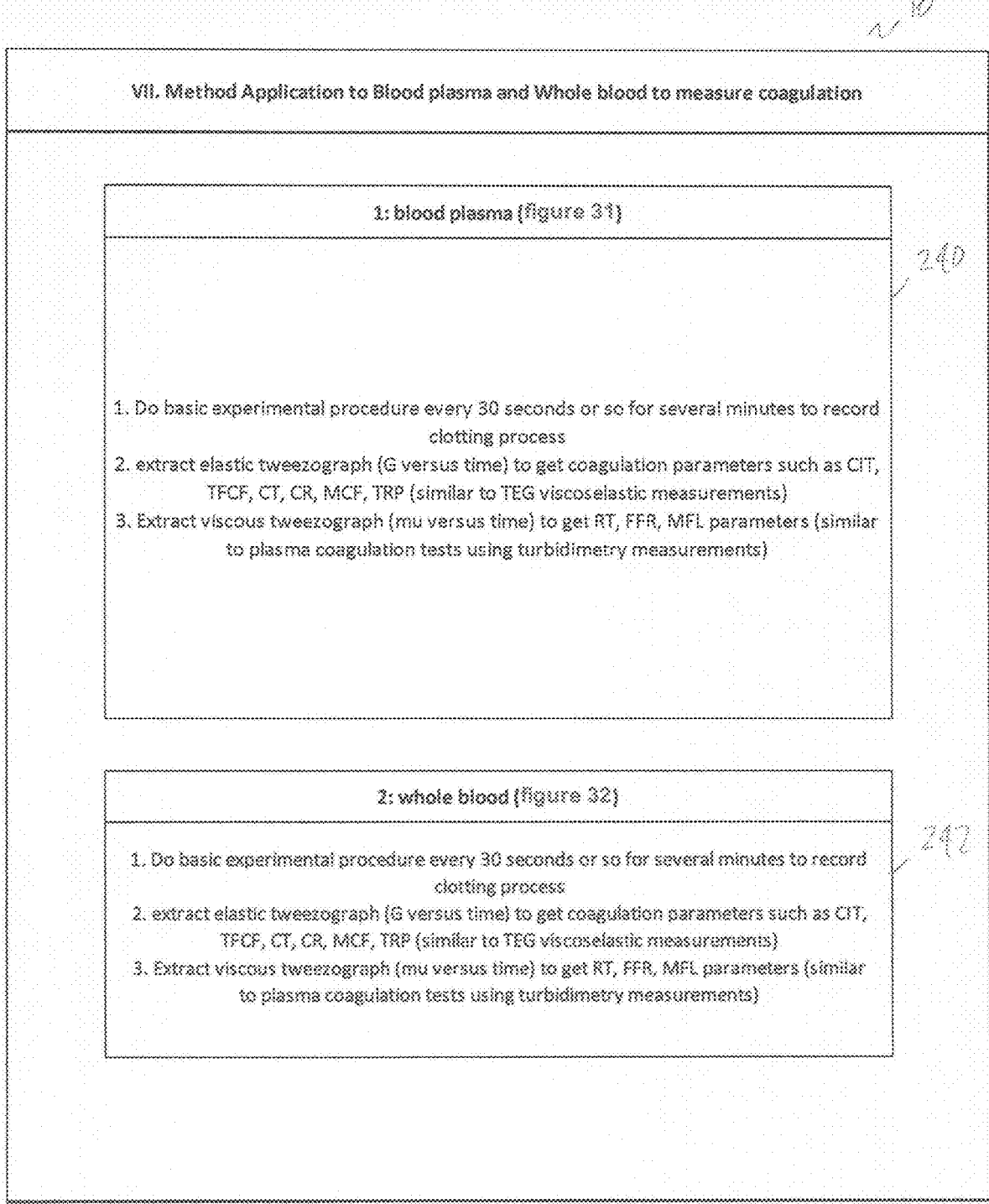

VII. Method Application to Blood plasma and Whole blood to measure coagulation

1: blood plasma (figure 31)

1. Do basic experimental procedure every 30 seconds or so for several minutes to record clotting process
2. extract elastic tweezograph (G versus time) to get coagulation parameters such as CIT, TFCF, CT, CR, MCF, TRP (similar to TEG viscoelastic measurements)
3. Extract viscous tweezograph (mu versus time) to get RT, FFR, MFL parameters (similar to plasma coagulation tests using turbidimetry measurements)

2: whole blood (figure 32)

1. Do basic experimental procedure every 30 seconds or so for several minutes to record clotting process
2. extract elastic tweezograph (G versus time) to get coagulation parameters such as CIT, TFCF, CT, CR, MCF, TRP (similar to TEG viscoelastic measurements)
3. Extract viscous tweezograph (mu versus time) to get RT, FFR, MFL parameters (similar to plasma coagulation tests using turbidimetry measurements)

FIG. 12F

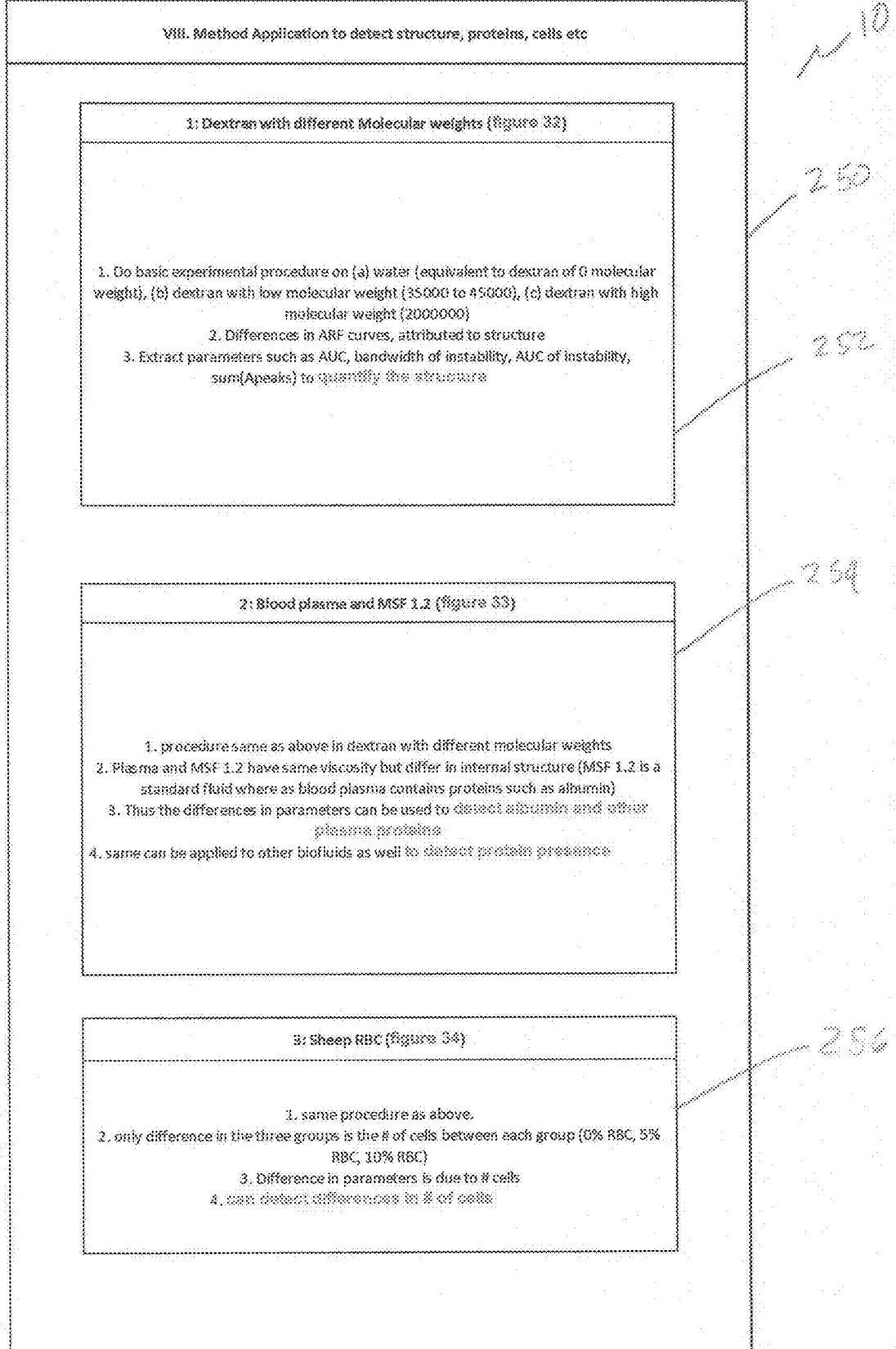

VIII. Method Application to detect structure, proteins, cells etc

1: Dextran with different Molecular weights (figure 32)

1. Do basic experimental procedure on (a) water (equivalent to dextran of 0 molecular weight), (b) dextran with low molecular weight (35000 to 45000), (c) dextran with high molecular weight (2000000)
2. Differences in ARF curves, attributed to structure
3. Extract parameters such as AUC, bandwidth of instability, AUC of instability, sum(Apeaks) to quantify the structure 2: Blood plasma and MSF 1.2 (figure 33)

1. procedure same as above in dextran with different molecular weights
2. Plasma and MSF 1.2 have same viscosity but differ in internal structure (MSF 1.2 is a standard fluid where as blood plasma contains proteins such as albumin)
3. Thus the differences in parameters can be used to detect albumin and other plasma proteins
4. same can be applied to other biofluids as well to detect protein presence 3: Sheep RBC (figure 34)

1. same procedure as above.
2. only difference in the three groups is the # of cells between each group (0% RBC, 5% RBC, 10% RBC)
3. Difference in parameters is due to # cells
4. can detect differences in # of cells

FIG. 12G

Levitation
signal

Modulation
signal

Driving
signal

Output from
APD/Images

Time

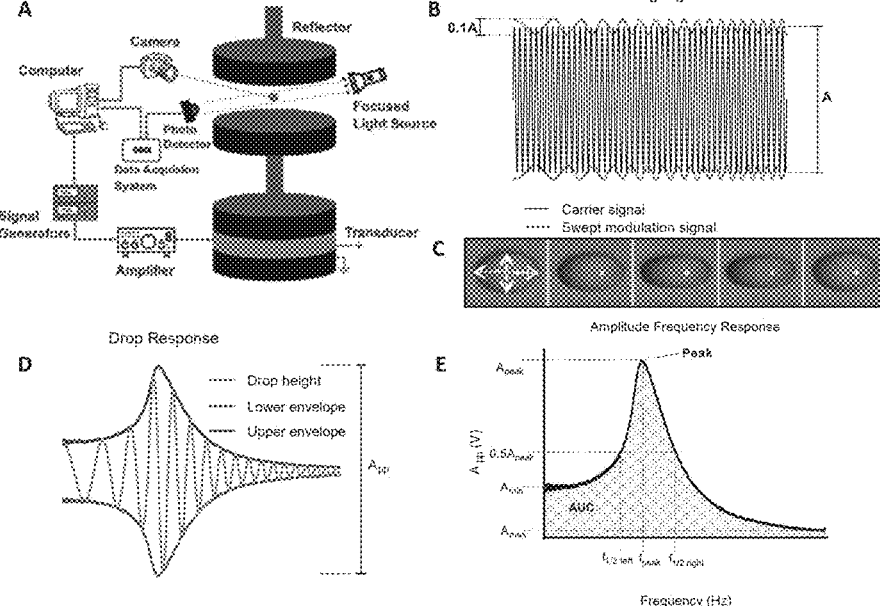

Fig.25: (A) Schematic of the acoustic tweezing apparatus. (B) Illustration of the driving signal on the sample drop consisting of the carrier (unmodulated) signal required to levitate the drop (black) and the swept modulated signal (pink) to induce shape oscillation of the drop. (C) Series of images of a levitating blood drop during shape oscillation. (D) Representative change in drop height (measured from changes in voltage of the photo-detector output) induced by the swept modulation signal (pink). Dark and light blue curves are the upper and the lower envelopes of the drop response. (E) Amplitude-frequency response (AFR) of a levitating drop and the following properties measured from the response: Area under the curve (AUC), $f_{peak}$, $A_{peak}$, $f_{1/2\,right}$, $f_{1/2\,left}$ Raw data figures
• To explain the multiple peak issue as well as occurrence of non-resonance
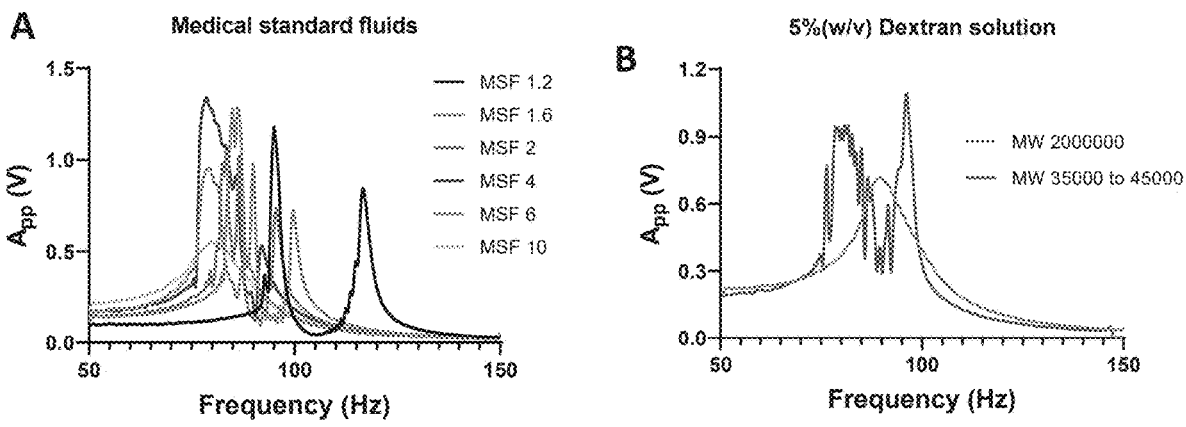
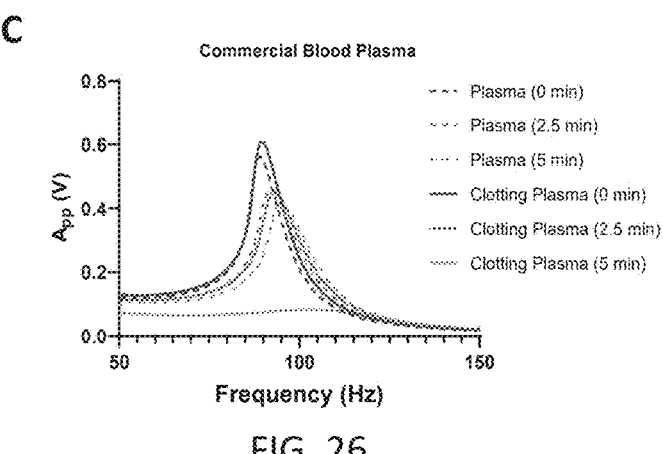
FIG. 26

• Viscosity Measurement - validation

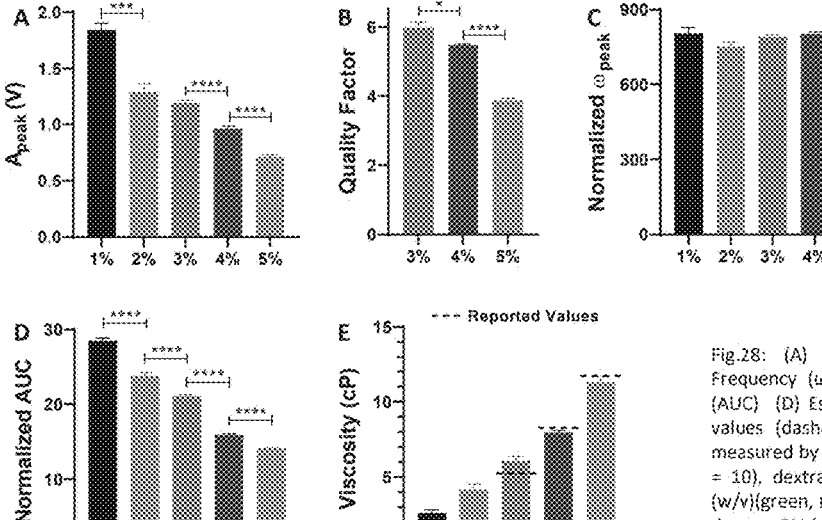

Fig.28: (A) Peak amplitude (B) Normalized Peak Frequency ($\omega$) (C) Normalized Area under the curve (AUC) (D) Estimated viscosity and reported reference values (dashed lines in black), of dextran solutions measured by ATS technique: dextran 1% (w/v) (black, n = 10), dextran 2% (w/v) (pink, n = 10), dextran 3% (w/v)(green, n = 25 ), dextran 4% (w/v) (purple, n = 25), dextran 5% (w/v) (lavender, n = 26 ) (E) Quality factor of dextran solutions measured by ATS technique: dextran 3% (w/v)(green, n = 25 ), dextran 4% (w/v) (purple, n = 25), dextran 5% (w/v) (lavender, n = 26 )

Xanthan Gum
- Constant viscoelasticity
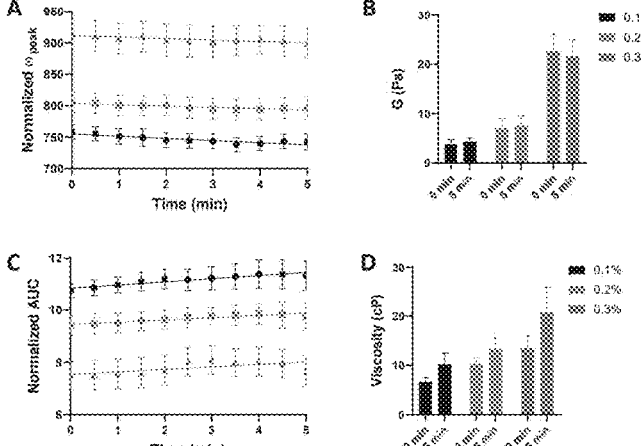
Fig.29: (A) Normalized Peak Frequency ($\omega$) (B) Estimated elastic modulus at 0 minutes and 5 minutes (C) Normalized Area under the curve (AUC) (D) Estimated viscosity, of xanthan gum solutions measured by ATS technique: xanthan gum 0.1% (w/v) (black, n = 12), xanthan gum 0.2% (w/v) (pink, n = 11), xanthan gum 0.3% (w/v) (green, n = 10)

Viscoelasticity during Polymerization - Gelatin
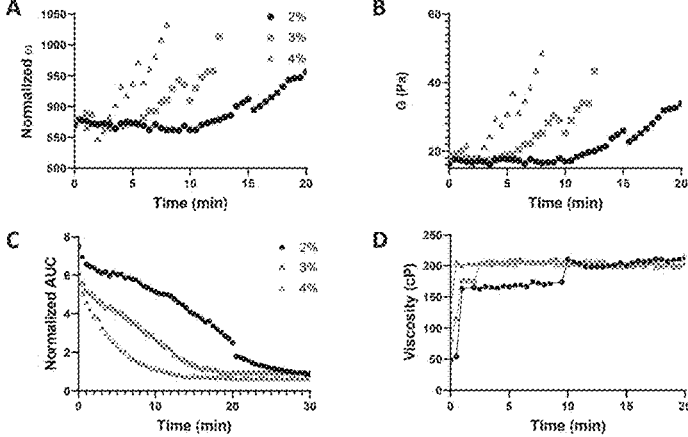
Fig.30: (A) Normalized Peak Frequency (ω) (B) Estimated elastic modulus (C) Normalized Area under the curve (AUC) (D) Estimated viscosity, versus time of gelatin solutions measured by ATS technique: gelatin 2% (w/v) (black, mean of 6 drops), gelatin 3% (w/v) (pink, mean of 5 drops), gelatin 4% (w/v) (green, mean of 5 drops)

Application - Blood Plasma

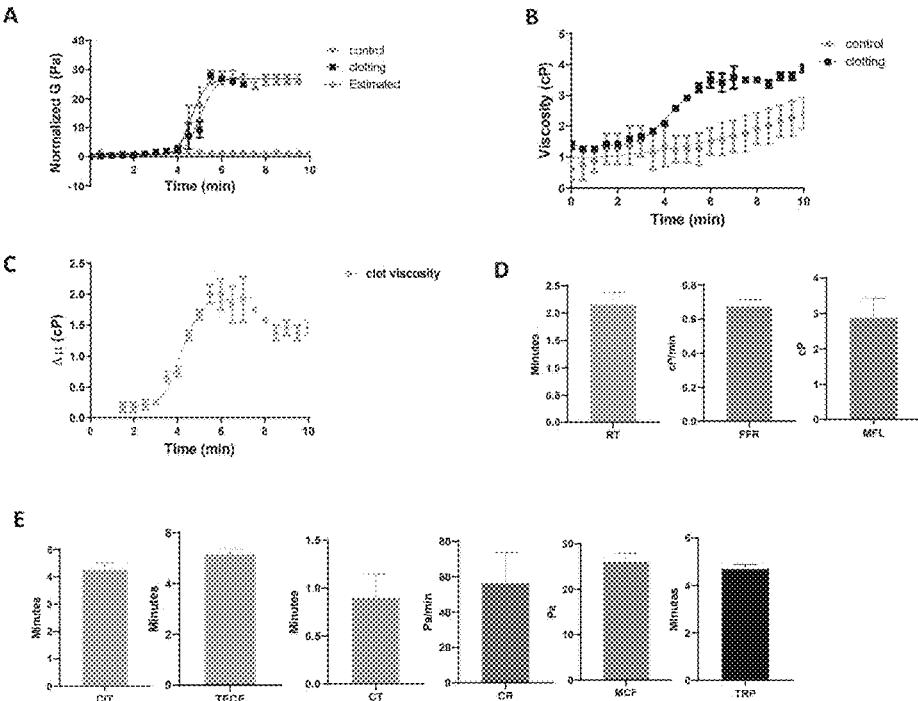

Fig.31: (A) Change in Elastic modulus with time for plasma or elastic tweezograph (control, pink, n =3),plasma treated with APTT and CaCl2 (clotting, black n = 3) and estimated elastic modulus (green, n = 3). (B) Change in viscosity, with time or viscous tweezograph, for plasma (control, pink, n =3) and plasma treated with APTT and CaCl2 (clotting, black n = 3). (C) Change in Viscosity due to clotting with time (green, n =3). (D) Coagulation parameters obtained from viscous tweezograph – reaction time (RT, green, n = 3), Fibrin formation rate (FFR, teal, n=3), Maximum fibrin level (MFL, pink, n=3). (E)   Coagulation parameters obtained from elastic tweezograph – clot initiation time (CIT, green, n=3), Time to firm clot formation (TFCF, orange, n=3), Clotting time (CT, blue, n=3), Clotting rate (CR, grey, n=3), Maximum clot firmness (MCF, pink, n=3), Time to reach peak clotting (TRP, black, n= 3);

Application – whole Blood

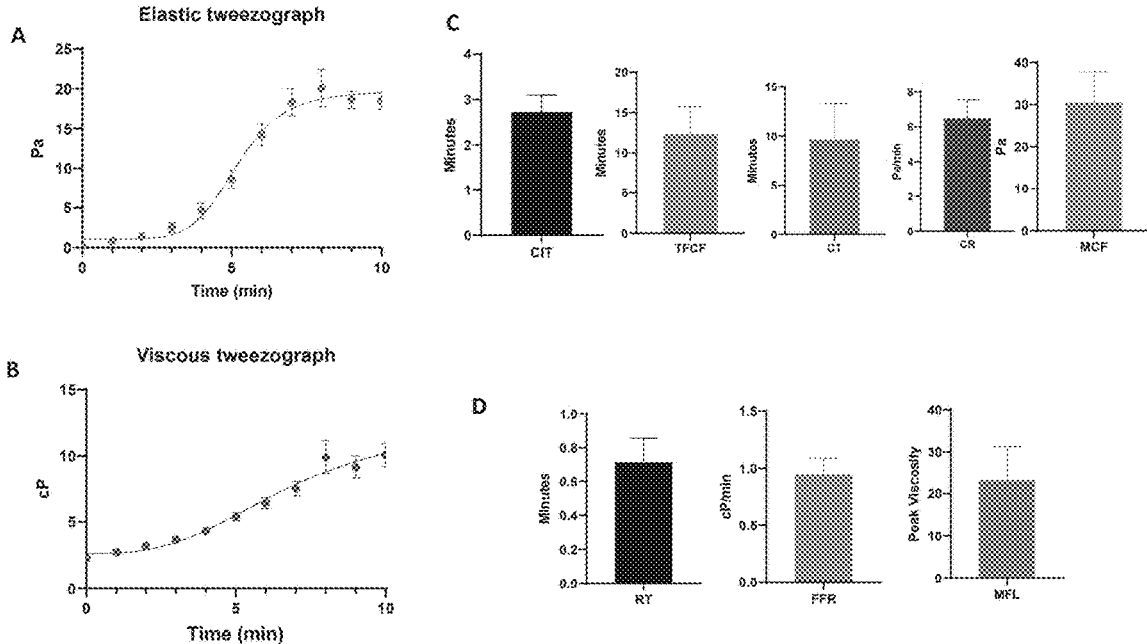

Fig.32: (A) Elastic tweezograph (control, pink, n =3) of citrated whole blood treated with APTT and CaCl2 (green, n = 18). (B) Viscous tweezograph, of citrated whole blood treated with APTT and CaCl2 (red, black n = 18). (C) Coagulation parameters obtained from elastic tweezograph – clot initiation time (CIT, black, n=18), Time to firm clot formation (TFCF, pink, n=18), Clotting time (CT, teal, n=18), Clotting rate (CR, purple, n=18), Maximum clot firmness (MCF, lavender, n=18 (D) Coagulation parameters obtained from viscous tweezograph – reaction time (RT, black, n = 18), Fibrin formation rate (FFR, pink, n=18), Maximum fibrin level (MFL, teal, n=18).

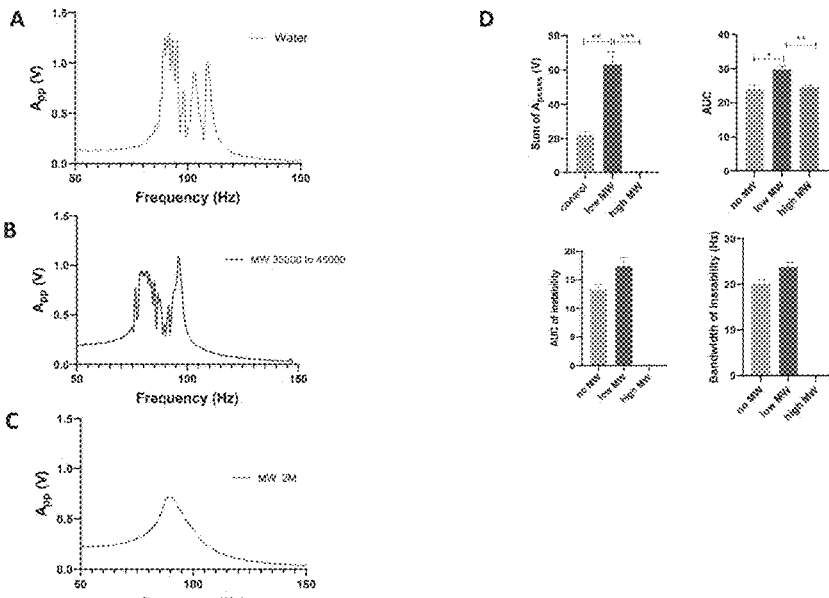
Fig.33: Sample Amplitude frequency response curves of (A) Water (control group, no MW, green). (B) 5% (w/v) Dextran MW 35000 to 45000 solution (low MW, blue). (C) 5% (w/v) Dextran MW 2000000 solution (high MW, pink). (D) Parameters extracted from AFR curves, including sum of Apeaks, AUC, AUC of instability and Bandwidth of instability for no MW (green), low MW (blue), high MW (pink)

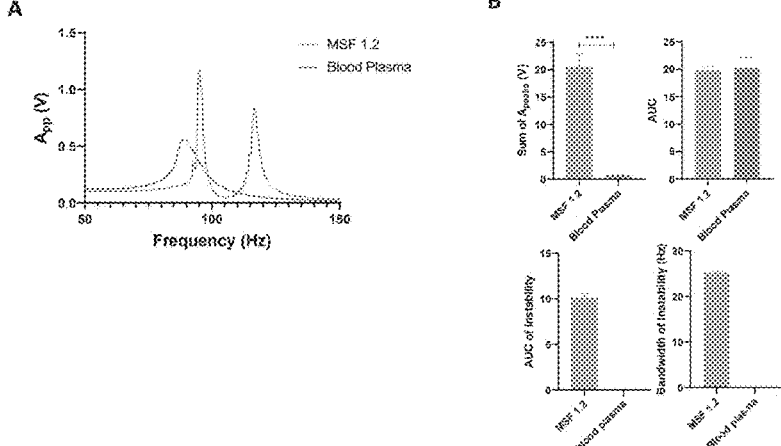
Fig.34: Sample Amplitude frequency response curves of (A) MSF 1.2 (green) and Blood plasma (pink). (B) Parameters extracted from AFR curves, including sum of Apeaks, AUC, AUC of instability and Bandwidth of instability for MSF 1.2(green) and Blood plasma (pink)

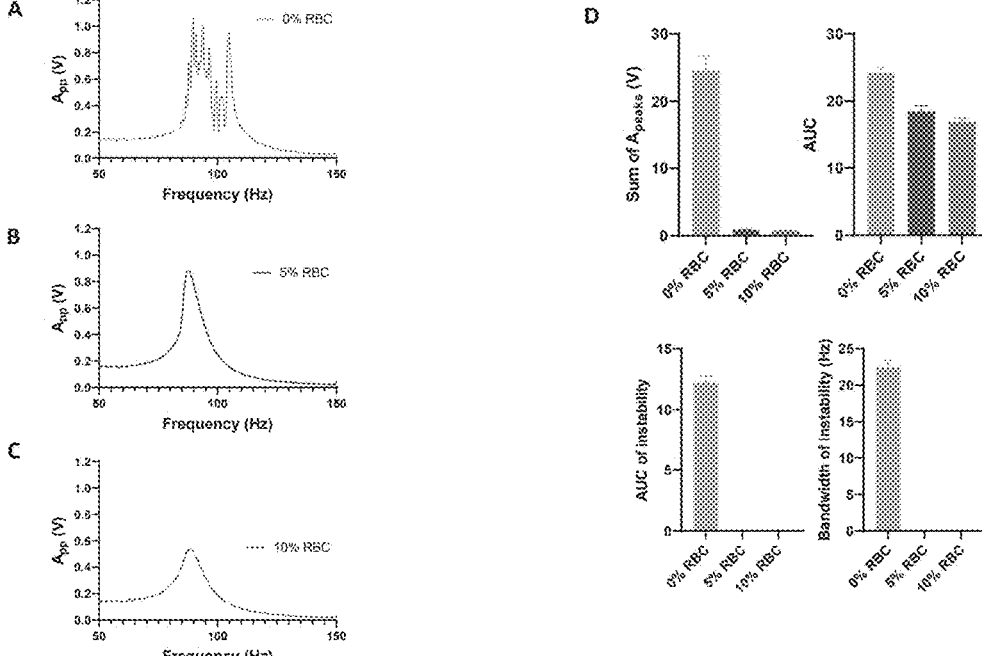
Fig.35: Sample Amplitude frequency response curves of (A) 0% Sheep RBC (green), (B) 5% Sheep RBC (blue) and (C) 10% Sheep RBC (pink). (D) Parameters extracted from AFR curves, including sum of Apeaks, AUC, AUC of instability and Bandwidth of instability for 0% RBC (green), 5% RBC (blue) and 10% RBC (pink)

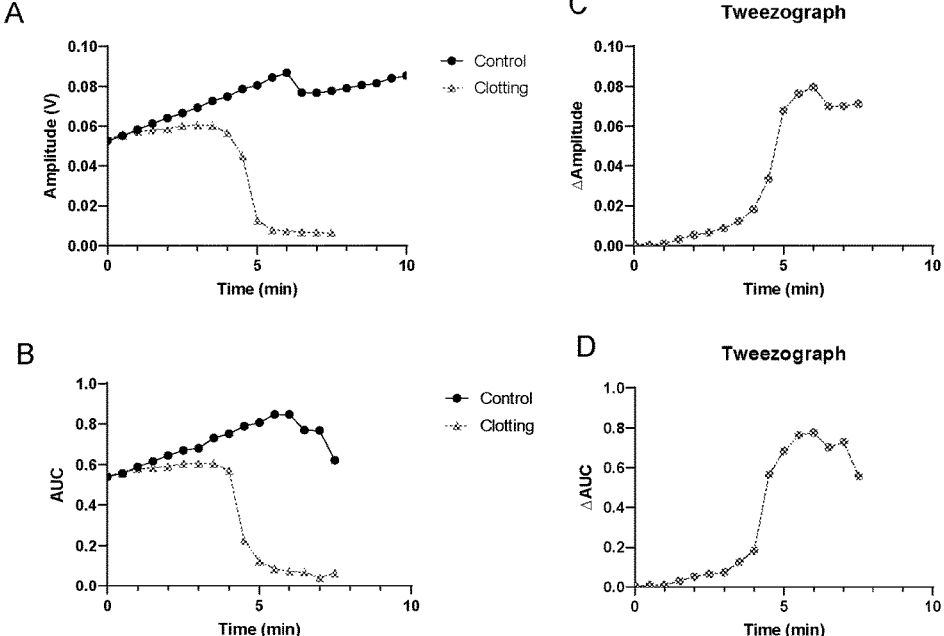
Fig.36: (A) Change in total amplitude with time and (B) Change in AUC with time, for Blood plasma (control, black) and Blood plasma treated with APTT and CaCl$_2$ (clotting, pink) (C) Amplitude tweezograph (green) and (D) AUC tweezograph (green) of coagulating blood plasma

APPARATUS, SYSTEMS AND METHODS FOR IN VITRO SCREENING OF COMPLEX BIOLOGICAL FLUIDS

CROSS-REFERENCE TO RELATED APPLICATION(S)

This application claims priority to U.S. Provisional Application No. 62/966,316 filed Jan. 27, 2020 and entitled "Novel Devices and Methods for In-Vitro Screening of Complex Biological Fluids," which is hereby incorporated by reference in its entirety under 35 U.S.C. § 119 (e).

TECHNICAL FIELD

The disclosed technology relates generally to devices, methods and systems for in vitro screening of complex biological fluids via acoustic tweezing spectroscopy.

BACKGROUND

Blood tests are one of physicians most resourced tools to diagnose some of the most common medical conditions of patients in the world today. A blood test ordered by a physician can deliver information about whether the red blood cells are delivering normal amounts of oxygen to the tissues, what kind of hormones are circulating in the blood vessels and how much, whether or not there is the right concentration of electrolytes, and so much more. Throughout history, blood tests have adapted to the most consequential pathological findings of the scientific world. (e.g, discovery of the human immunodeficiency virus (HIV), for which blood transfusion screening began in 1985) and have shaped institutional policy in countries around the world.

Although blood tests can offer significant information about a patient's health, the need for several different types of tests to draw proper conclusions can increase medical costs for patients. Additionally, overdrawing of blood, to perform several tests as well as to mitigate the possibilities of errors during testing (such as difficulties in blood fractionation), have been shown to increase the patient's risk for anemia. This risk increases by several times when the patients are already weak or otherwise immune-compromised or already lost a lot of blood or if they are newborns, neonates or children who have very little blood. There is a pressing need for simplifying the blood testing by reducing the amount of blood sample needed to be drawn to perform several tests. Although science and latest technologies are advancing, this issue remains largely unfulfilled.

The disclosed methods, system and devices relate to a novel, non-contact method for blood coagulation analysis on samples or compositions of biological material.

Chemical Composition of Human Blood

Blood is a mixture of cellular components and proteins in a fluid called plasma. It primarily delivers oxygen and essential nutrients to all the tissues. It also hosts several proteins and cells that are responsible for maintain homeostasis, generate immune response etc.

As shown in FIG. 1, the major cellular components of the blood are erythrocytes (red cells) and leukocytes (white cells). The major difference between red and white cells, other than their function, is that white cells are nucleated. The third wheel to the red and white cells are platelets, which are proteins recruited to plug damaged sites (wounds) in the blood vessel once the white cells have cleared out the invading bacteria.

TABLE 1

| Head-To-Head Comparison Of Red Blood Cells And White Blood Cells | | |
| --- | --- | --- |
| Blood Cell | Density (g/mL) | Diameter (μm) |
| Red | 1.11 | 7 |
| White | 1.08 | 12-20 |
| Platelets | 1.04-1.08 | 2-3 |

The function of the red cells is to deliver oxygen to tissues in the body. Red cells have a biconcave disk shape, which allows them to squeeze into small blood vessels and tight capillary junctions in tissues. A misconfigured red cell shape such as a sickle shape seen in patients with sickle cell anemia, where the shape significantly increases the elastic modulus of red cells and limits the ability to deform, obstructing its circulation. Iron molecules in the proteins called hemoglobin, which have high concentration in red cells, bind oxygen molecules for their delivery into the capillaries.

White cells serve as an important part of the body's immune system. The main three categories of white blood cells are granulocytes (includes basophils, neutrophils, and eosinophils), monocytes and lymphocytes, and their task is to recognize foreign cells in the body and to eliminate them through phagocytosis. During infections, their concentration in the blood increases, as these cells use the blood as a transport means to get to the tissue in need for their aid.

The presence of other cells and molecules in the blood have led to the development of blood tests for diagnostic purposes. Because blood vessels serve as the transportation system of the body, many different components necessary for life can be extracted from a blood sample. Beyond the testing for the antigens in the blood that have allowed us to classify blood by types (A, B, AB, and O), along with the Rhesus factor), blood tests for enzymes, molecules, and antibodies allow for testing of whether or not heart muscle tissue has been damaged, whether or not blood sugar level, or cholesterol level, or calcium level is too high or too low, and whether or not the patient has been infected with a virus.

Components of very low concentrations, such as tumor cells are hard to separate and track in whole blood samples. As shown in FIG. 2, circulating tumor cells ("CTC") are thought to be the main cause of cancer metastasis, the primary method at which cancer spreads in the body. Tumor cells protrude though the tissue epithelial layers, leak into blood vessels and enter the bloodstream and travel to a new destination. These cells may lay dormant in their new homes for years, leading to a false sense of cancer curation, only for the cancer to rise again down the line. The rarity of circulating tumor cells in the bloodstream makes it an obstacle in developing simple and accurate blood testing mechanisms to detect them.

The detection of viruses and their antiviral antibodies created by the body's immune system to defend against them have their own limitations. The concentration of viruses is highest in the first week of infection before the full development of the immune system response, while the concentration of the antibodies is highest nearly three weeks after the host is first infected. This difference in concentration peaks make it difficult to design blood tests to test for the appearance of one or the other and give way to the possibility of false diagnosis if the patient has progressed beyond a certain phase in the immune response.

Screening of biological fluids is crucial for selecting and banking donated blood. In 2017, the Food and Drug Administration (FDA) reported 37 deaths as a result of blood transfusions in the United States. In seven cases, the wrong blood type was given to the patient and in five cases, the blood was contaminated with bacteria. However, death as a direct result of blood transfusions has plummeted over the last few decades due to a higher emphasis on screening blood for transfusions after the discovery of the human immunodeficiency virus (HIV) in the 1980s, as well as the introduction of bar-coding technology to label blood in banks by type.

BRIEF SUMMARY

Discussed herein are various devices, systems and methods relating to methods, systems and devices for the real-time assessment of whole blood or blood plasma coagulation by non-contact acoustic tweezing technology and for measuring polymerization characteristics of a sample, including but not limited to rheological measurements and polymerization kinetics. Other applications include detecting cells, detecting the difference in structure/molecular weight, detect the presence of proteins, and the like.

In Example 1, a noncontact in vitro method of analyzing a biological sample, comprising levitating the sample, the levitation comprising applying a carrier signal to the biological sample, tweezing the biological sample with a modulation signal, and sweeping the modulation signal over a range of frequencies, recording raw data and/or images from the sample, and analyzing the raw data and/or images for amplitude frequency response (AFR).

In Example 2, the method of Example 1, further comprising extracting parameters from the AFR curve, wherein the extracted parameters are AUC, fpeak, Apeak, f1/2 right, f1/2 left, Amin, Amax, quality factor (QF) and fpeaks, sum (Apeaks), bandwidth of instability and AUC of instability.

In Example 3, the method of Example 2, further comprising calculating one or more of viscosity, surface tension and elasticity from the extracted parameters.

In Example 4, the method of Example 1, wherein the modulation signal sweep comprises a range of from between about 150 Hz to about 50 Hz.

In Example 5, the method of Example 1, wherein the analysis utilizes peak amplitude to establish viscosity and/or elastic modulus.

In Example 6, the method of Example 1, wherein the analysis utilizes area under the curve (AUC) to establish viscosity and/or elastic modulus.

In Example 7, the method of Example 1, wherein the analysis utilizes A min and/or A_max, to establish viscosity and/or elastic modulus.

In Example 8, the method of Example 1, wherein the analysis utilizes quality factor (QF) to establish viscosity and/or elastic modulus.

In Example 9, the method of Example 8, wherein the QF, found by resonant frequency over bandwidth utilizes one half of maximum amplitude to establish the bandwidth.

In Example 10, the method of Example 8, wherein the QF, found by resonant frequency over bandwidth, utilizes between about 30% and about 70% of maximum amplitude to establish the bandwidth.

In Example 11, the method of Example 1, wherein the analysis utilizes peak frequency, to establish elastic modulus.

In Example 12, the method of Example 1, wherein the analysis comprises utilizing two or more parameters to establish viscosity and/or elastic modulus.

In Example 13, the method of Example 12, wherein the two or more parameters are selected from the group consisting of AUC, fpeak, Apeak, f1/2 right, f1/2 left, Amin, Amax, quality factor (QF) and fpeaks, sum (Apeaks), bandwidth of instability and AUC of instability.

In Example 14, the method of Example 2, wherein the analysis comprises extracting parameters from a viscous tweezograph or elastic tweezograph.

In Example 15, the method of Example 2, further comprising detecting and quantifying molecular weight differences.

In Example 16, the method of Example 2, further comprising detecting and quantifying large proteins.

In Example 17, the method of Example 2, further comprising detecting and quantifying the number of cells present.

In Example 18, the method of Example 1, wherein the analysis comprises extracting parameters from a viscous tweezograph and further comprising measuring whole blood fibrin kinetics.

In Example 19, the method of Example 1, further comprising measuring molecular weight and/or number of cells from A_peak and/or f_peak.

In Example 20, the method of Example 1, further comprising measuring molecular weight and/or number of cells from AUC.

In Example 21, the method of Example I, wherein the range of frequencies is between about 150 Hz and about 50 Hz and the defined time is between about 1 second and about 60 seconds.

In Example 22, a noncontact in vitro method of analyzing a biological sample, comprising levitating the sample, the levitation comprising applying a carrier signal to the biological sample, tweezing the biological sample with a modulation signal, and sweeping the modulation signal, recording raw data and/or images from the sample, and analyzing the raw data and/or images for sample parameters.

In Example 23, the method of Example 22, wherein the biological sample is whole blood or blood plasma.

In Example 24, the method of Example 22, wherein the range of frequencies is between about 150 Hz and about 50 Hz.

In Example 25, the method of Example 22, wherein the range of frequencies is applied over a defined time.

In Example 26, the method of Example 25, wherein the defined time is between about 1 second and about 60 seconds.

In Example 27, the method of Example 25, wherein the range of frequencies is between about 150 Hz and about 50 Hz and the defined time is between about 1 second and about 60 seconds.

In Example 28, the method of Example 22, wherein the sample parameters comprise one or more of AUC, fpeak, Apeak, f1/2 right, f1/2 left, Amin, Amax, quality factor (QF) and fpeaks, sum (Apeaks), bandwidth of instability and AUC of instability.

In Example 29, the method of Example 22, further comprising establishing one or more of clot initiation time (CIT), time to firm clot formation (TFCF), clotting time (CT), clotting rate (CR), maximum clot firmness (MCF) and time to reach peak (TRP), reaction time (RT), fibrin formation rate (FFR) and maximum fibrin level (MFL).

In Example 30, the method of Example 14, further comprising establishing one or more of clot initiation time (CIT), time to firm clot formation (TFCF), clotting time (CT), clotting rate (CR), maximum clot firmness (MCF) and time to reach peak (TRP), reaction time (RT), fibrin formation rate (FFR) and maximum fibrin level (MFL).

In Example 31, the method of Example 1, wherein the modulation signal sweep comprises a range of from between about 1000 Hz to about 10 Hz.

In Example 32, the method of Example 22, wherein the modulation signal sweep comprises a range of from between about 1000 Hz to about 10 Hz.

In Example 33, a noncontact in vitro method of analyzing a biological sample, comprising levitating the sample, the levitation comprising applying a carrier signal to the biological sample, tweezing the biological sample with a modulation signal, and sweeping the modulation signal, recording raw data and/or images from the sample, and analyzing the raw data and/or images to extract parameters from the AFR curve, wherein the extracted parameters are AUC, fpeak, Apeak, f1/2 right, f1/2 left. Amin, Amax, quality factor (QF) and fpeaks, sum (Apeaks), bandwidth of instability and AUC of instability.

In Example 34, a noncontact in vitro method of analyzing whole blood, comprising levitating the sample, the levitation comprising applying a carrier signal to the biological sample, tweezing the biological sample with a modulation signal, and sweeping the modulation signal over a range of frequencies, recording raw data and/or images from the sample, and analyzing the raw data and/or images to extract parameters from the AFR curve, wherein the extracted parameters are AUC, fpeak, Apeak, f1/2 right, f1/2 left. Amin, Amax, quality factor (QF) and fpeaks, sum (Apeaks), bandwidth of instability and AUC of instability.

In Example 35, the method of Example 34, wherein the analysis comprises extracting parameters from a viscous tweezograph and further comprising measuring whole blood fibrin kinetics.

In Example 36, the method of Example 1, wherein the modulation signal sweep comprises a range of from between about 10 Hz to about 1000 Hz.

In Example 37, the method of Example 22, wherein the modulation signal sweep comprises a range of from between about 10 Hz to about 1000 Hz.

In Example 38, the method of Example 22, wherein the sweep is at a single frequency.

In Example 39, the method of Example 33, further comprising establishing one or more of clot initiation time (CIT), time to firm clot formation (TFCF), clotting time (CT), clotting rate (CR), maximum clot firmness (MCF) and time to reach peak (TRP), reaction time (RT), fibrin formation rate (FFR) and maximum fibrin level (MFL).

In Example 40, the method of Example 34, further comprising establishing one or more of clot initiation time (CIT), time to firm clot formation (TFCF), clotting time (CT), clotting rate (CR), maximum clot firmness (MCF) and time to reach peak (TRP), reaction time (RT), fibrin formation rate (FFR) and maximum fibrin level (MFL).

In Example 41, a non-contact method of measuring a biological sample, comprising levitating the sample, the levitation comprising applying a carrier signal to the biological sample, tweezing the biological sample with a modulation signal, and sweeping the modulation signal, recording raw data and/or images from the sample, and analyzing the raw data and/or images to detect molecular weight of the biological sample.

In Example 42, a non-contact method of measuring a biological sample, comprising levitating the sample, the levitation comprising applying a carrier signal to the biological sample, tweezing the biological sample with a modulation signal, and sweeping the modulation signal, recording raw data and/or images from the sample, and analyzing the raw data and/or images to detect and quantify large proteins.

In Example 43, a non-contact method of measuring a biological sample, comprising levitating the sample, the levitation comprising applying a carrier signal to the biological sample, tweezing the biological sample with a modulation signal, and sweeping the modulation signal, recording raw data and/or images from the sample, and analyzing the raw data and/or images to detect and quantify the number of cells present.

Wherever any of the phrases "for example," "such as," "including" and the like are used herein, the phrase "and without limitation" is understood to follow unless explicitly stated otherwise. Similarly "an example." "exemplary" and the like are understood to be non-limiting.

The term "substantially" allows for deviations from the descriptor that do not negatively impact the intended purpose. Descriptive terms are understood to be modified by the term "substantially" even if the word "substantially" is not explicitly recited. Therefore, for example, the phrase "wherein the lever extends vertically" means "wherein the lever extends substantially vertically" so long as a precise vertical arrangement is not necessary for the lever to perform its function.

The terms "comprising" and "including" and "having" and "involving" (and similarly "comprises", "includes," "has," and "involves") and the like are used interchangeably and have the same meaning. Specifically, each of the terms is defined consistent with the common United States patent law definition of "comprising" and is therefore interpreted to be an open term meaning "at least the following." and is also interpreted not to exclude additional features, limitations, aspects, etc. Thus, for example, "a process involving steps a, b, and c" means that the process includes at least steps a, b and c. Wherever the terms "a" or "an" are used, "one or more" is understood, unless such interpretation is nonsensical in context.

In certain examples and implementations discussed herein, reference is made to elasticity or furmness, which generally can refer to the mechanical elasticity as a property that is measured or otherwise established herein with regard to elastic modulus, as would be readily appreciated by those of skill in the art.

While multiple embodiments are disclosed, still other embodiments of the disclosure will become apparent to those skilled in the art from the following detailed description, which shows and describes illustrative embodiments of the disclosed apparatus, systems and methods. As will be realized, the disclosed apparatus, systems and methods are capable of modifications in various obvious aspects, all without departing from the spirit and scope of the disclosure. Accordingly, the drawings and detailed description are to be regarded as illustrative in nature and not restrictive.

BRIEF DESCRIPTION OF THE DRAWINGS

FIG. 25: (A) Schematic of the acoustic tweezing apparatus. (B) Illustration of the driving signal on the sample drop consisting of the carrier (unmodulated) signal required to levitate the drop (black) and the swept modulated signal (pink) to induce shape oscillation of the drop. (C) Series of images of a levitating blood drop during shape oscillation. (D) Representative change in drop height (measured from changes in voltage of the photo-detector output) induced by the swept modulation signal (pink). Dark and light blue curves are the upper and the lower envelopes of the drop response. (E) Amplitude-frequency response (AFR) of a levitating drop and the following properties measured from the response: Area under the curve (AUC), fpeak, $A_{peak}$, f1/2right, f1/2 left FIG. 26: Amplitude frequency response curves of (A) Medical standard fluids MSF 1.2 (black), MSF 1.6 (pink), MSF 2 (green), MSF 4 (purple), MSF 6 (lavender), MSF 10 (blue). (B) Dextran 5% (w/v) solutions of molecular weights-2000000 (pink), 20000 (blue). (C) Commercial blood plasma (dashed line) and commercial blood plasma treated with APTT and CaCl2 (solid line) at time 0 minutes (blue), 2.5 minutes (pink) and 5 minutes (green)

FIG. 28: (A) Peak amplitude (B) Normalized Peak Frequency (ω) (C) Normalized Area under the curve (AUC) (D) Estimated viscosity and reported reference values (dashed lines in black), of dextran solutions measured by The disclosed systems and methods: dextran 1% (w/v) (black, n=10), dextran 2% (w/v) (pink, n=10), dextran 3% (w/v) (green, n=25), dextran 4% (w/v) (purple, n=25), dextran 5% (w/r) (lavender, n=26) (E) Quality factor of dextran solutions measured by The disclosed systems and methods: dextran 3% (w/v) (green, n=25), dextran 4% (w/v) (purple, n=25), dextran 5% (w/v) (lavender, n=26)

FIG. 29: (A) Normalized Peak Frequency (ω) (B) Estimated elastic modulus at 0 minutes and 5 minutes (C) Normalized Area under the curve (AUC) (D) Estimated viscosity, of xanthan gum solutions measured by the system and methods: xanthan gum 0.1% (w/v) (black, n=12), xanthan gum 0.2% (w/v) (pink, n=11), xanthan gum 0.3% (w/v) (green, n=10)

FIG. 30: (A) Normalized Peak Frequency (0)) (B) Estimated elastic modulus (C) Normalized Area under the curve (AUC) (D) Estimated viscosity, versus time of gelatin solutions measured by the system and methods: gelatin 2% (w/v) (black, mean of 6 drops), gelatin 3% (w/v) (pink, mean of 5 drops), gelatin 4% (w/v) (green, mean of 5 drops)

FIG. 31: (A) Change in Elastic modulus with time for plasma or elastic tweezograph (control, pink, n=3), plasma treated with APTT and CaCl2 (clotting, black n=3) and estimated elastic modulus (green, n=3). (B) Change in viscosity, with time or viscous tweezograph, for plasma (control, pink, n=3) and plasma treated with APTT and CaCl2 (clotting, black n=3). (C) Change in Viscosity due to clotting with time (green, n=3). (D) Coagulation parameters obtained from viscous tweezograph-reaction time (RT, green, n=3), Fibrin formation rate (FFR, teal, n=3), Maximum fibrin level (MFL, pink, n=3). (E) Coagulation parameters obtained from elastic tweezograph-clot initiation time (CIT, green, n=3). Time to firm clot formation (TFCF, orange, n=3), Clotting time (CT, blue, n=3), Clotting rate (CR, grey, n=3), Maximum clot firmness (MCF, pink, n=3), Time to reach peak clotting (TRP, black, n=3);

FIG. 32: (A) Elastic tweezograph (control, pink, n=3) of citrated whole blood treated with APTT and CaCl2 (green, n=18). (B) Viscous tweezograph, of citrated whole blood treated with APTT and CaCl2 (red, black n=18). (C) Coagulation parameters obtained from elastic tweezograph-clot initiation time (CIT, black, n=18), Time to firm clot formation (TFCF, pink, n=18), Clotting time (CT, teal, n=18), Clotting rate (CR, purple, n=18), Maximum clot firmness (MCF, lavender, n=18 (D) Coagulation parameters obtained from viscous tweezograph-reaction time (RT, black, n=18), Fibrin formation rate (FFR, pink, n=18), Maximum fibrin level (MFL, teal, n=18).

FIG. 33: Sample Amplitude frequency response curves of (A) Water (control group, no MW, green). (B) 5% (w/v) Dextran MW 35000 to 45000 solution (low MW, blue). (C) 5% (w/v) Dextran MW 2000000 solution (high MW, pink). (D) Parameters extracted from amplitude frequency response (AFR) curves, including sum of Apeaks, AUC, AUC of instability and Bandwidth of instability for no MW (green), low MW (blue), high MW (pink).

FIG. 34: Sample Amplitude frequency response curves of (A) MSF 1.2 (green) and Blood plasma (pink). (B) Parameters extracted from AFR curves, including sum of Apeaks, AUC. AUC of instability and Bandwidth of instability for MSF 1.2 (green) and Blood plasma (pink)

FIG. 35: Sample Amplitude frequency response curves of (A) 0% Sheep RBC (green). (B) 5% Sheep RBC (blue) and (C) 10% Sheep RBC (pink). (D) Parameters extracted from AFR curves, including sum of Apeaks. AUC, AUC of instability and Bandwidth of instability for 0% RBC (green). 5% RBC (blue) and 10% RBC (pink)

FIG. 36: (A) Change in total amplitude with time and (B) Change in AUC with time, for Blood plasma (control, black) and Blood plasma treated with APTT and CaCl$_2$) (clotting, pink) (C) Amplitude tweezograph (green) and (D) AUC tweezograph (green) of coagulating blood plasma

DETAILED DESCRIPTION

Figure 1:
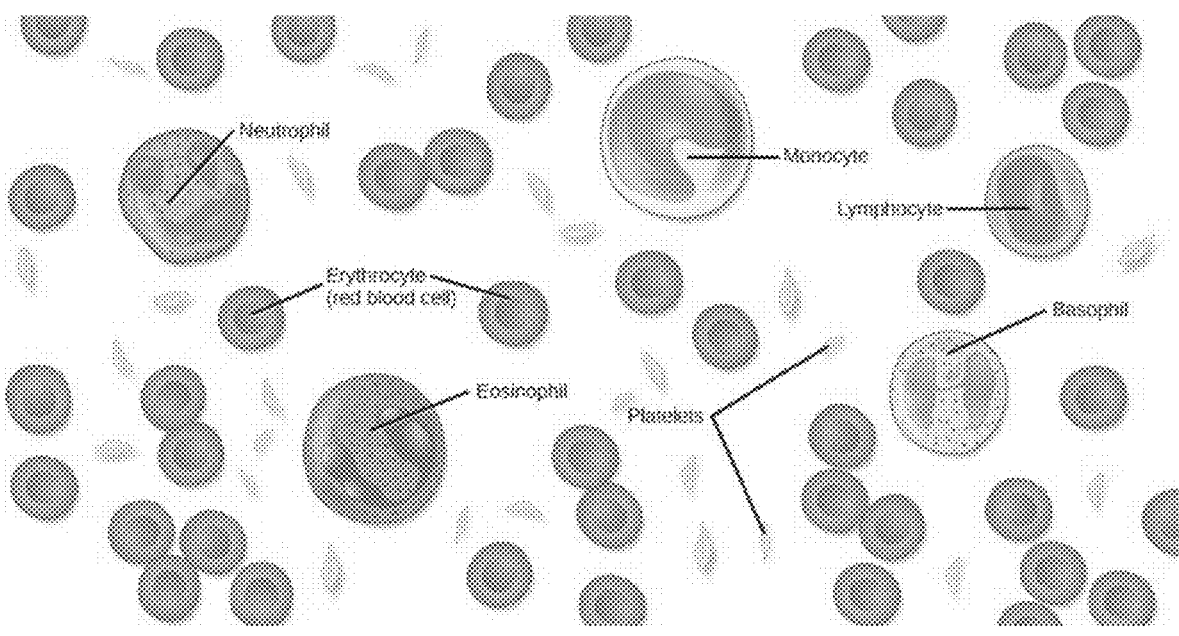
FIG. 1 depicts the three main cellular compositions of whole blood—red blood cells, white blood cells and platelets.
Figure 2:
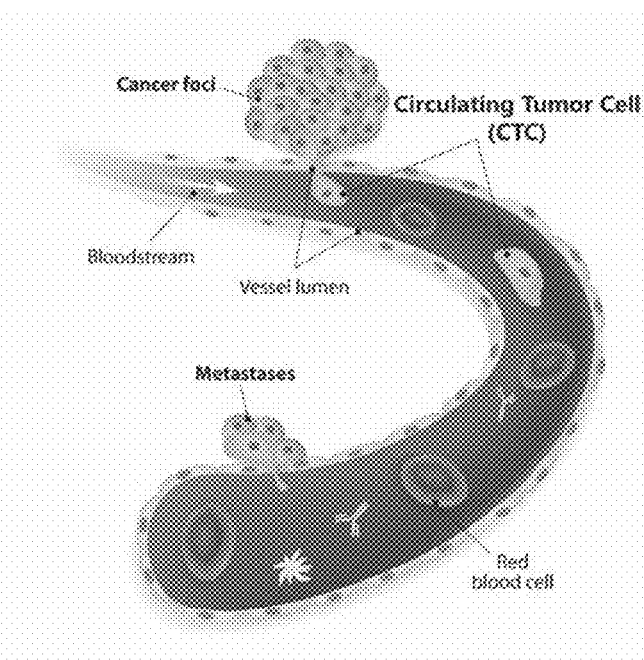
FIG. 2 is a . . . Cancer is widely believed to spread in the body by the process of metastasis. Cells from tumors shed into the bloodstream, migrating to different areas of the body FIG. 3. A simple example of a type of chromatography—paper chromatography. Leaf extract is placed on a strip of paper and will react with propanone. Here, the roles are reserved. In order to reveal the pigmentation of the leaf extract components, the propanone (mobile phase) will rise and move through the extract (stationary phase) and the subsequent reaction reveals the pigment composition FIG. 4. When a cell passes through electrodes, it will change the acoustic impedance of the system. These changes are then recorded to determine the cell volume, as volume is recorded as a pulse in voltage. This is a reproducible method if the quantity of the suspension is precisely controlled so that values remain the same FIG. 5. Cell particle size is determined by the signals generated from the mission of forward scattering light (FSC) directed to the photo-multiplying tubes (PMT), and the granularity of these particles is determined by the side scattered light (SSC) emitted.

The various embodiments disclosed or contemplated herein relate to devices, systems and methods for the levitation and analysis of certain biological samples, such as blood.

It is understood that biological fluids or biofuids can comprise a number of constituent parts. For example, blood includes plasma, cells, proteins, and platelets, which have their own natural frequencies. Given the multi-faceted composition of blood, the oscillation of a blood drop should be a complex waveform. In other words, the oscillation of a whole blood drop is the aggregation of the oscillations of the cells and proteins in the blood. Cells and proteins differentiated by size and shape will oscillate at different frequencies when imposed by a driving frequency and will make different contributions to the main oscillation of the whole blood drop. The disclosed system 10 relates to an acoustic tweezing rheometry method employed on devices capable of analyzing samples for several characteristics, certain non-limiting examples being to: measure the rheological properties of the biological fluids; extract coagulation parameters of blood and blood plasma from the measured changes in rheological properties during coagulation: detect and quantify the difference in the structure and/or molecular weight: detect and quantify the cells and/or proteins in the samples, amongst other applications The disclosure and tweezing rheometry method or system 10 relate to a novel, non-contact method for assessment of rheological properties of biological fluids, referred to as acoustic tweezing rheometry. The method uses acoustic levitation to measure the rheological properties of fluids, with volume as little as 6 μL. In order to levitate an object, a standing acoustic wave field is generated by a transducer and a reflector setup (FIG. 25A). The acoustic radiation force traps a sample drop in a host fluid (e.g., air) slightly below the pressure node where the force of gravity pulling the object down is balanced to enable drop levitation. This acoustic tweezing setup can be operated in two regimes-a quasi-static (QATT) and oscillatory regime. The oscillatory regime can be further divided into the free oscillation and forced oscillation. The acoustic tweezing rheometry technique discussed herein falls under the forced oscillation regime. Here, the sample drop deformation is achieved by inducing forced shape oscillations using amplitude modulation of the carrier signal (FIG. 25B). The modulation signal is further swept with a specific frequency or over a range of frequencies to obtain the amplitude-frequency response (AFR) of the sample drop. This amplitude frequency response is unique to each fluid and is dependent on its rheological properties such as viscosity, elasticity, surface tension and the like, as well as its components. Several parameters can be extracted from the amplitude frequency response which can be further used to determine the rheological and structural properties of the complex biological fluids.

As is well-known in physics and readily appreciated, every object, including fluids, has a natural frequency, which is a mechanical property of the object. When the driving frequency imposed on a levitated fluid drop is close to its natural frequency, the drop will oscillate at a higher amplitude than at other frequencies. This is called resonance. The oscillatory patterns of fluids like whole blood suggest that there will be a primary peak near its natural frequency. Secondary peaks may occur at overtones, which are natural frequencies higher than the primary natural frequency.

The presence of cells and proteins of different sizes and shapes as well as processes such as blood coagulation will cause a change in rheological properties such as viscosity and elasticity. These changes in viscosity or elasticity cause will lead to a change in the AFR. For example, the more viscous the fluid is, the more it will resist the oscillations leading to a decrease in the amplitude of oscillation, while an increase in elasticity during coagulation increases the natural frequency of the blood causing a shift in the resonance frequency. Additionally, any abnormality of certain cells and/or proteins in blood due to blood-related diseases affect the rheological properties (e.g., thrombosis, hemophilia, sickle cell disease and the like). Therefore, extraction of the AFR of the blood drop may provide a pathway to distinguishing healthy whole blood samples from the diseased ones.

The acoustic tweezing rheometry systems described herein can be successfully used to extract the viscosity and elastic modulus (or elasticity) of certain biological fluid samples, such as blood. When this system and methods are applied to coagulating whole blood and blood plasma during coagulation, a clinically relevant comprehensive coagulation profile can be created. It can also be used to detect and quantify cells, structure or molecular weight, and components inside the fluid.

While various implementations discuss the applications of the disclosed technology with regard to whole blood and blood plasma, it is appreciated that any number of other biological samples can be utilized, such as biopolymer solutions, saliva, synovial fluids, lymph, vitrious fluid, and the like.

Various embodiments of the disclosed methods, systems and devices can be performed using the devices and methods disclosed in U.S. patent application Ser. No. 15/068,126, filed on Mar. 11, 2016, and Patent Cooperation Treaty Patent Application No. PCT/US2014/055559, filed on Sep. 15, 2014, both of which are entitled "Apparatus, Systems & Methods for Non-Contact Rheological Measurements of Biological Materials" and U.S. patent application Ser. No. 16/478,249, filed Jul. 16, 2019, and Patent Cooperation Treaty Application No. PCT/US18/14879, both of which are entitled "Apparatus, Systems And Methods For Integrative Photo-Optical/Mechanical Test For Noncontact Measurement Of Polymerization," and all of which are incorporated by reference herein in their entireties.

I. Diagnostic Methods for Assessing Biological Fluids

Clinically, the gold standard for assessing the compositions of biological fluids involve some use of immunoassay techniques. Immunoassays work by using immobilized antibodies to capture desired antigens in the testing sample. For higher levels of specificity, another antibody may be used to label the captured antigen, and then a tracer is used to provide the appropriate analytical signal for detection. This technique is used to screen for antibodies or other nanoscale molecules, which can be used to detect viruses or tumor markers in plasma serum (a liquid which separates from blood after it clots).

However, immunoassays can generally only be used with specific, expensive and complex instrumentation. Secondly, single-analyte immunoassays do not provide a high enough throughput for clinical usage and are not specific enough to diagnose a specific type of cancer, as a single tumor marker can mark for different types of cancers. Serological-based testing also examines the immune response to viruses, searching for the antibodies serving as a footprint to the presence of the virus. However, serological-based testing cannot distinguish between antibodies which correspond to viruses occurring now and ones which have already been cleared in the past. Furthermore, in clinical settings, only one virus can be tested for at a time. Decisions to perform these tests are entirely based on the hypothesis of the clinician. If the hypothesis is wrong, the possibility of missing the critical factors causing the patient's condition could lead to more serious consequences. It would be of tremendous value to be able to test for a wide range of viruses and other molecular components from a biological fluid sample. Not only would this cover for human error in misdiagnosing patients but would also decrease the amount of fluid that would need to be drawn for laboratory testing, decreasing the risk of patients suffering conditions such as anemia. The development of multi-analyte immunoassays, which are simple and inexpensive but also keep the specificity and sensitivity of single-analyte immunoassays are of clinical need.

Immunoassays are part of a broader category of a special type of chromatography-affinity chromatography. Affinity chromatography is the use of a biological reaction, such as the bonding of an antibody with an antigen, in order to separate the composition of a liquid. Generally, chromatography is a technique used in organic chemistry and biochemistry applications for separating a substance into its chemical components. A column is packed with a stationary phase element, any element that will react with the desired analyte (sample you are testing). The stationary phase is selected based on the factor (i.e., polarity, size, biochemical binding, boiling point) used for separation. The analyte (mobile phase) will pass through the stationary phase, react, and separate based on the different reactions of its individual components. The simplest example is the use of chromatography to separate the pigment of a leaf or a marker. Once the separation occurs, depending on the factor of separation, may be analyzed for signal detection.

Figure 3:
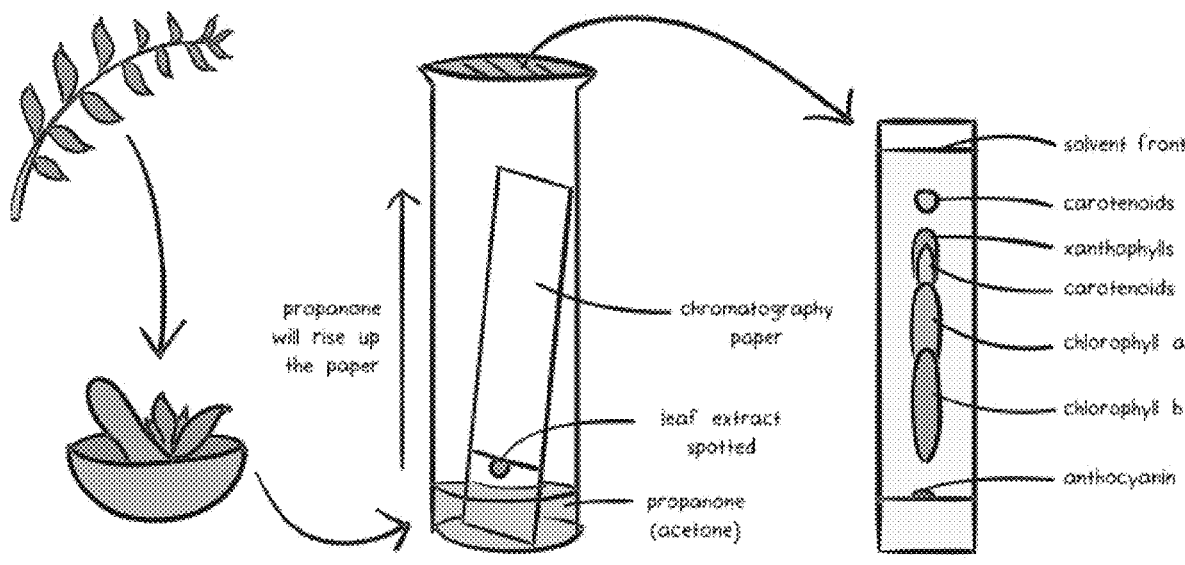

FIG. 3 depicts a simple example of a type of chromatography—paper chromatography. Leaf extract is placed on a strip of paper and will react with propanone. Here, the roles are reserved. In order to reveal the pigmentation of the leaf extract components, the propanone (mobile phase) will rise and move through the extract (stationary phase) and the subsequent reaction reveals the pigment composition.

Automated technologies to perform analysis of the components of biological fluids widely revolve around flow cytometry coupled with label-detection technologies like spectroscopy. Flow cytometers can not only be used to diagnose the presence of components on the nanoscale level, but also on the microscale level-blood cells. Hemotology analyzers such as Coulter-counter, which applies the principle of particles inducing changes in the impedance when flowing in a tube concurrently with an electrical current, are used to detect the presence of red blood cells and the different types of white blood cells., These changes are directly proportional to the particle volume in the assessed fluid.

Figure 4:
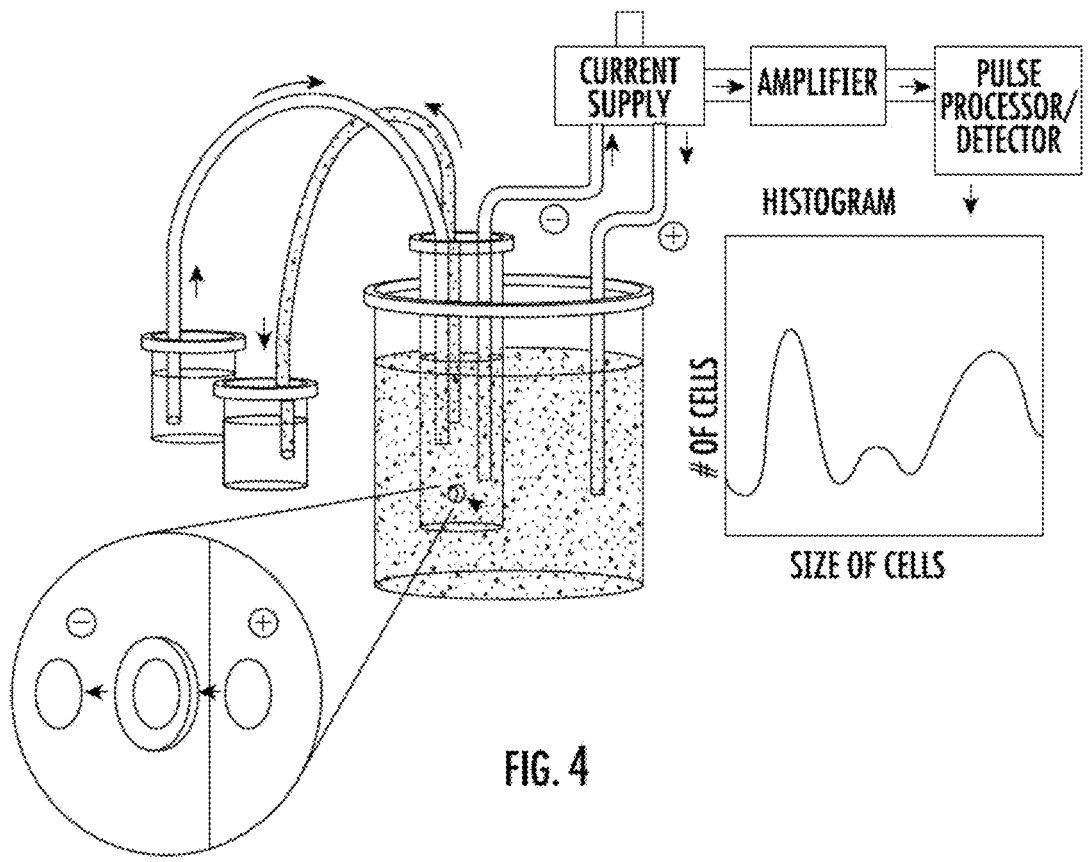

FIG. 4 depicts a stylized view of the assessment of changes in acoustic impedance. When a cell passes through electrodes, it will change the acoustic impedance of the system. These changes are then recorded to determine the cell volume, as volume is recorded as a pulse in voltage. This is a reproducible method if the quantity of the suspension is precisely controlled so that values remain the same.

Because the Coulter-counter does not differentiate between living and dead cells or provide an image to validate the cell count or to further enunciate the morphology of the detected cells, flow cytometry light-scattering or fluorescence detection techniques may be coupled with it to supplement its drawbacks to get more detailed information on the cellular components.

Figure 5:
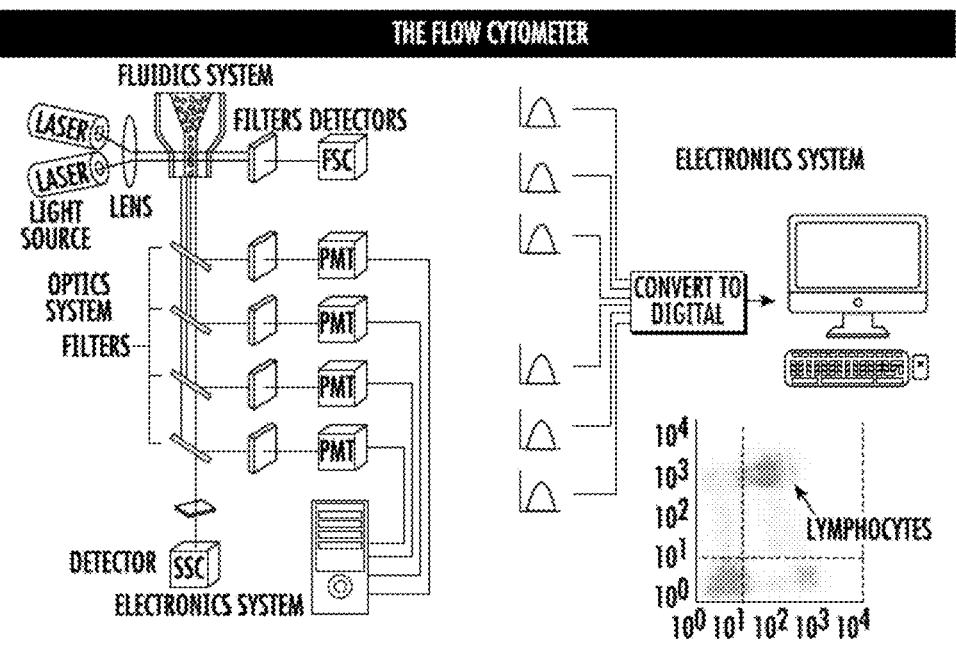

As shown in FIG. 5, cell particle size is determined by the signals generated from the mission of forward scattering light (FSC) directed to the photomultiplying tubes (PMT), and the granularity of these particles is determined by the side scattered light (SSC) emitted.

It is understood that hematology analyzers are beginning to become flow cytometers themselves as analyzers acquire the ability to detect antigen markers. However, the expense of the systems and the specialization to use the systems create room in the field for future development of apparatuses and methods for upgraded detection and diagnosis.

II. Acoustic Principles

Sound waves can move through any media. Sound waves are pressure waves, causing particle displacements in the media it travels through. The properties of the media allow it to amplify or dampen the pressure waves. The elasticity of the material determines the ability of the displaced particles to return to their original position-analogous to a guitar string when plucked or a swing when initially pushed.

When considering sound waves, however, particle displacement does not occur in an arc-like form like in a swing. Rather, the particles move in the direction of the wave propagation in simple harmonic motion. When displacement in simple harmonic motion occurs, the particle moves at a fixed number of times per second no matter the level of force initially exerted upon it. The displacement and return to original position occur as a cycle of vibration, and the number of cycles per second is referred to as the frequency of vibration. Some objects, such as a tuning fork are designed to vibrate almost exclusively as one frequency. The more complex the object is, the more expansive its frequency set is.

A tuning fork vibrates at one frequency, but most vibrations are more complex than that of a tuning fork. Pressure waves are for the most part, sinusoidal waves, beginning at zero, reaching a maximum peak and minimum peak its cycle before returning to zero. An object like a tuning fork only experiences one pressure wave at a specific frequency. However, the addition of two or more simple sinusoids to one another results in a complex waveform. A complex wave is not a sinusoidal wave, but it is periodic as it repeats itself in a cycle. The lowest frequency at which it repeats is called the fundamental frequency.

Figure 6:
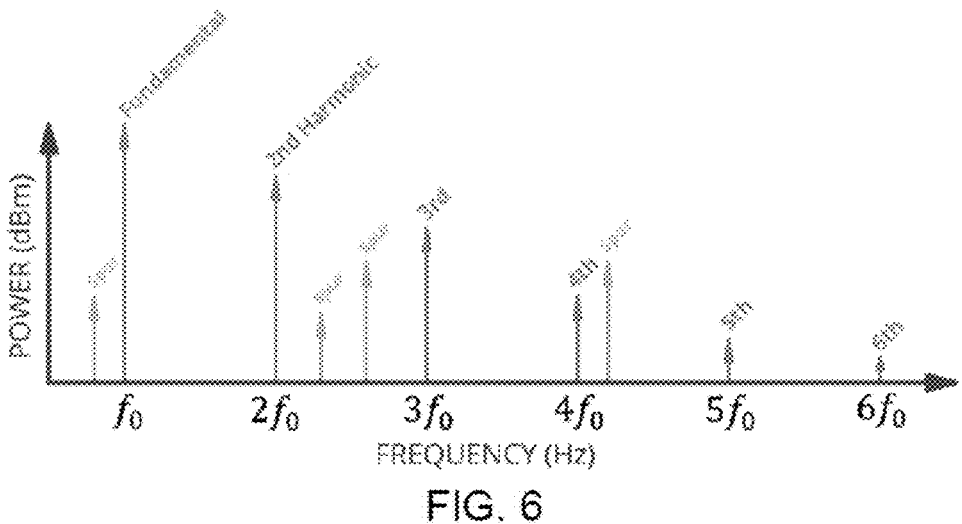
FIG. 6. Multiples of the fundamental frequency are called harmonics. Not every resonant frequency must be a harmonic, however. Spurious peaks may occur that are also very integral to the signal. These are overtones, but not harmonics as they are not multiples of the fundamental.

As shown in FIG. 6, multiples of the fundamental frequency are called harmonics. Not every resonant frequency must be a harmonic, however. Spurious peaks may occur that are also very integral to the signal. These are overtones, but not harmonics as they are not multiples of the fundamental.

The fundamental frequency is also known as the natural resonant frequency, because the fundamental frequency is like a pacemaker—it sets the pace at which other frequencies in a complex tone will follow. All enclosed objects of air, including fluid samples like blood, have natural frequencies. The natural frequency of a system is the fundamental frequency at which the system will experience its greatest oscillations after cessation of a driving force (when the oscillations are driven by an external force, the frequency of greatest oscillation is called the natural resonant frequency: an example of this would be the frequency of a swing being pushed or the frequency at which a person's voice can break a wine glass). Voice can break a wine glass, because when the driving force of the voice's frequency matches the natural resonant frequency of the wine glass, causing maximum vibrations (amplitude), the glass will eventually shatter.

III. Acoustics in Biomedical Applications

The physical character (i.e. size, shape) of components causing differentiation in acoustic response is a concept heavily used in acoustofluidics. Researchers have designed microfluidic devices capable of separating components from blood samples using strategically placed transducers and flow channel orientation. Ding et, al were able to use the concept of differentiation of acoustic radiation force experienced on particles commonly found in blood samples and designed a microfluidic device capable of separating MCF-7 human breast cancer cells from benign human leukocytes. It is possible to combine cell-removal and then exosome-removal modules into one microfluidic invention to separate exosomes from undiluted whole blood samples. The different experiences in acoustic radiation force will cause, as Ding put it: "different times to migrate to the pressure nodes, thus providing clear identifiers for separation".

Figure 7:
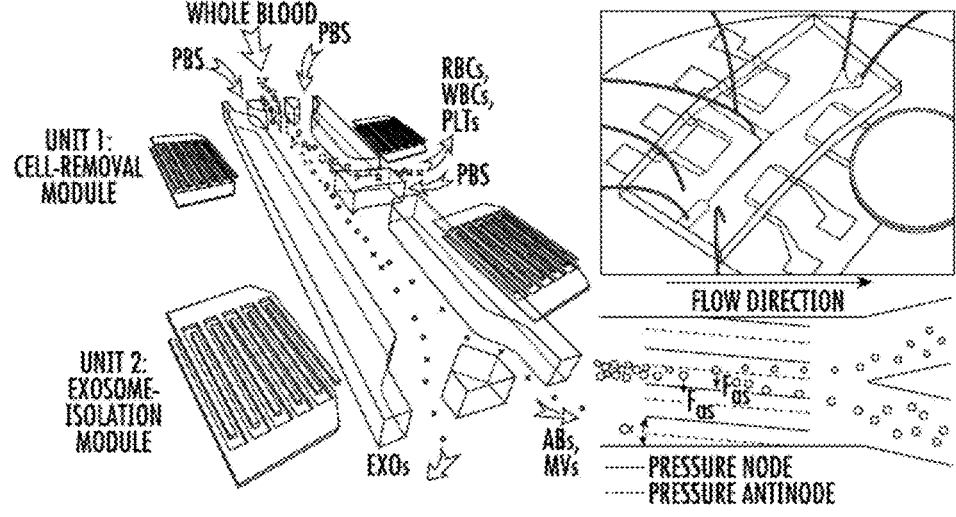
FIG. 7. (A) schematic of the cell removal and exosome isolation modules, (B) an image of the microfluidic chip itself. (C) mapping of the pressure nodes for the separation of cells FIG. 8 Effects of acoustic radiation force on levitated liquids

FIG. 7A depicts a schematic of the cell removal and exosome isolation modules, FIG. 7B is an image of the microfluidic chip itself, and FIG. 7C is a mapping of the pressure nodes for the separation of cells.

Classification of cellular components by their acoustic properties currently has been performed using photoacoustic methods, such as a microfluidic device embedded with a transducer of 375 MHz center frequency and a pulsed laser of 532 nm focused onto passing cells in the microfluidic flow channels. The objective has been to develop a soundwave-based flow cytometer which could assess characteristics of rapidly flowing cells, testing the device on melanoma cells and acute myeloid leukemia cells. The spectral width of the cellular acoustic response to simultaneous ultrasound and photoacoustic wave propagation was used to determine cell diameter of melanoma cells. Others utilized the same ultrasound and photoacoustic techniques (using an acoustic microscope) to differentiate red blood cells, white blood cells, and melanoma cells. They found that the white blood cells did not emit a photoacoustic signal, which allowed them to differentiate those cells from melanoma and red blood cells.

IV. Acoustic Levitation

By using ultrasound waves to interact with liquids, all the above can be accomplished. Ultrasonic acoustic levitation is achieved by using acoustic tweezers to hold objects in air. Levitation is achieved when the force of gravity pulling the object down is balanced by an opposing force. In this case, the opposing force is an acoustic radiation force. When the tweezers generate a standing wave field, this force reaches its peak values at specific points called nodes in the standing wave field where the amplitude is zero (waves cancel each other out at the nodes when they interact). At the nodes, the acoustic radiation force is enough to balance gravity, allowing for levitation of the object to occur. These nodes are like the pressure nodes described in the microfluidic applications of acoustic tweezing in the incorporated references Acoustic tweezing has been used in biomedical applications to manipulate cells and biological liquids and is preferred due to its ability to eliminate the potential effects of sample contact with device walls-including contamination or altered measurements. It is also relatively inexpensive compared to the high-powered lasers needed for optical tweezing methods and can be used for interacting with nanometer-sized samples, unlike optical or magnetic tweezers. Unlike other methods, acoustic tweezing has been shown not to damage cellular structure, proving its biocompatibility.

Figure 8:
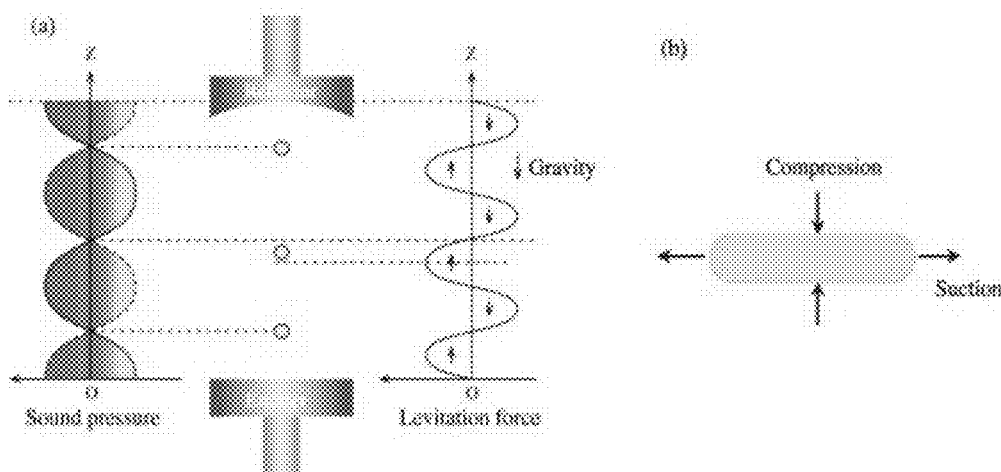

FIG. 8 is a schematic depicting the effects of acoustic radiation force on levitated liquids. Here, acoustic tweezing is used to study the rheological properties of fluid samples, including whole blood and developed a novel, non-contact method for rheological analysis, referred to as acoustic tweezing rheometry. The method uses acoustic levitation to measure with rheological properties of fluids, with volume as little as 6 μL or less.

Levitation at pressure nodes isolates the fluid sample to be manipulated by a driving force without contamination from the device. In dynamic acoustic tweezing experiments, a modulation signal is introduced to the standing wave field. This modulation signal is analogous to the driving force of air passing through the vocal folds into the vocal tract. The modulation signal induces fluid drop oscillations, which are analogous to the particle displacement (amplitude) due to the pressure wave. The frequencies at which greatest oscillations occur are the resonance frequencies of the system.

Such responses to the modulated signal have been used to differentiate between malaria-afflicted or sickled red blood cells, which are much stiffer than normal red blood cells. Stiffness affects the ability of red blood cells to deform which is, as mentioned previously, an integral part of the cell's ability to squeeze through tissue capillaries. The viscosity of a whole blood sample also affects the ability of the sample to oscillate. Because whole blood is a non-Newtonian fluid, its resistance to flow is dependent on a non-constant shear rate generated by the interaction between its cellular components. Therefore, the character of these components (mainly red blood cells) directly impacts the oscillation of the whole blood sample.

V. Spectral Analysis

Figure 9A:
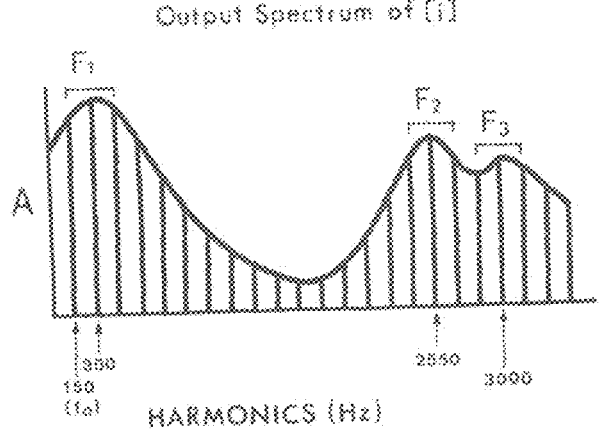
FIG. 9A depicts an exemplary implementation of a spectrum.
Figure 9B:
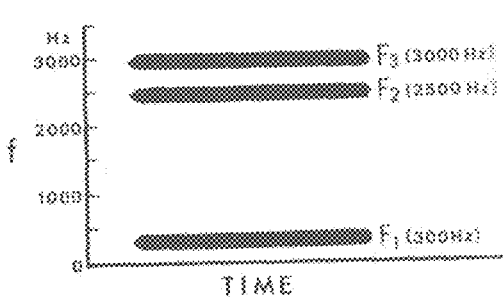
FIG. 9B depicts an exemplary implementation of a spectrogram.

As shown in FIG. 9A, after the signal is recorded, the oscillations of the media due to the presence of a driving force can be analyzed on a spectrum, a graph showing the amplitude response at each frequency in the system. The spectrum is the result of the computation of the Fourier transform of the time-domain signal (time vs. amplitude). The Fourier transform computes the energy at each frequency. The peaks of the Fourier transform can be identified as the resonant frequencies of the system. Spectrums are useful for a more quantitative look at the relationship between frequency and amplitude, as exact values are easier to extract from spectrums than its counterpart, the spectrogram, shown for example in FIG. 9B.

As perhaps the most widely used analytical tool in speech science, spectrograms provide information not only about the frequency components of the signal, but also about the corresponding amplitude at those frequencies. This is done by mapping the points on the spectrogram by intensity-normally the more intense portions represent higher amplitudes (this is done using a color map, black and white is most typical). Formants, or peaks, are found on spectrograms by finding broad bands of higher energy. The center of the energy band is chosen as the representative frequency of the formant.

Another metric which can be used to measure the quality of the formants beyond their amplitudes, is the quality factor, or Q-Factor, also abbreviated as QF. The Q-Factor is found by dividing the frequency of the peak by the width of the peak (the frequencies which corresponding to the beginning and end of the hump the peak creates). In Eq. 1:

$$Q = \frac{f_0}{BW} \qquad \text{Eq. (1)}$$

where the Q-factor is found by dividing the resonant frequency (f0) by the bandwidth (BW) of the resonance.

Figure 10:
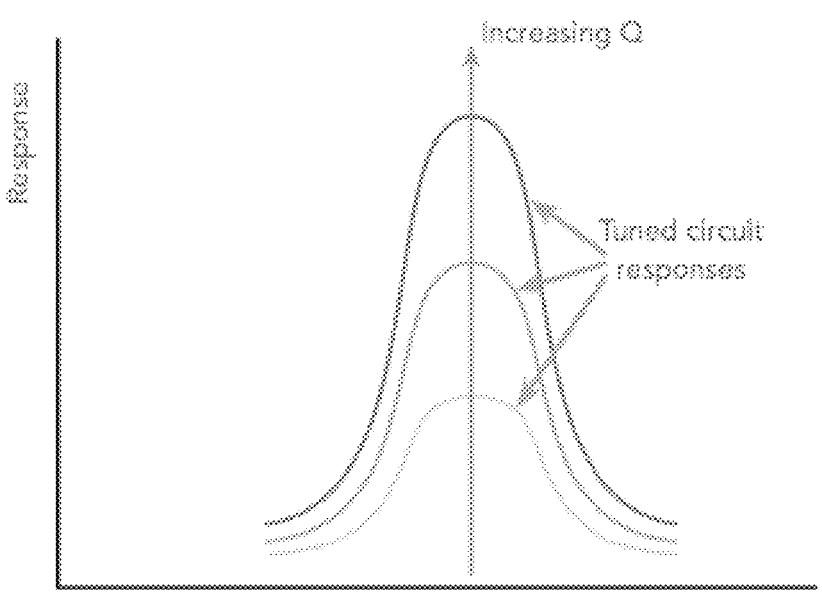
FIG. 10 depicts a frequency response graph, demonstrating that for a resonant circuit, the higher the Q-factor, the lower the damping and the sharper the resonant peak is.

Q-Factor is a measure of how damped the oscillator is. Damping is the opposite of amplification-instead of reinforcing a signal, dampening lowers the signal quality. The lower the Q-factor, the higher the damping, and the weaker the resonance. In this application, the higher the amplitude and the more prominent the formant is, the higher the Q-factor, as is shown in FIG. 10.

The value of the Q-factor describes how damped the system is. A system with a Q-factor >1/2 is an has an underdamped response, meaning that the damping is low so the oscillation will be sustained for a longer period, like in a pendulum. A system with a Q-factor <1/2 is an overdamped system, and the oscillation of this system is not going to be sustained as long. In fact, the oscillation will exponentially decay. A system with a Q-factor=1/2 is a critically damped system, and this system gradually rises to a steady-state. A strong resonance system will have peaks with higher Q-factors.

Following the basic principles of the source-filter theory of the vocal tract, acoustic levitation coupled with dynamic modulation will be used to induce oscillations of the levitated fluid. Such oscillations will be recorded and then spectrally measured for its spectral components in order to chart a spectral fingerprint of the fluid.

Experimental Examples

Figure 11:
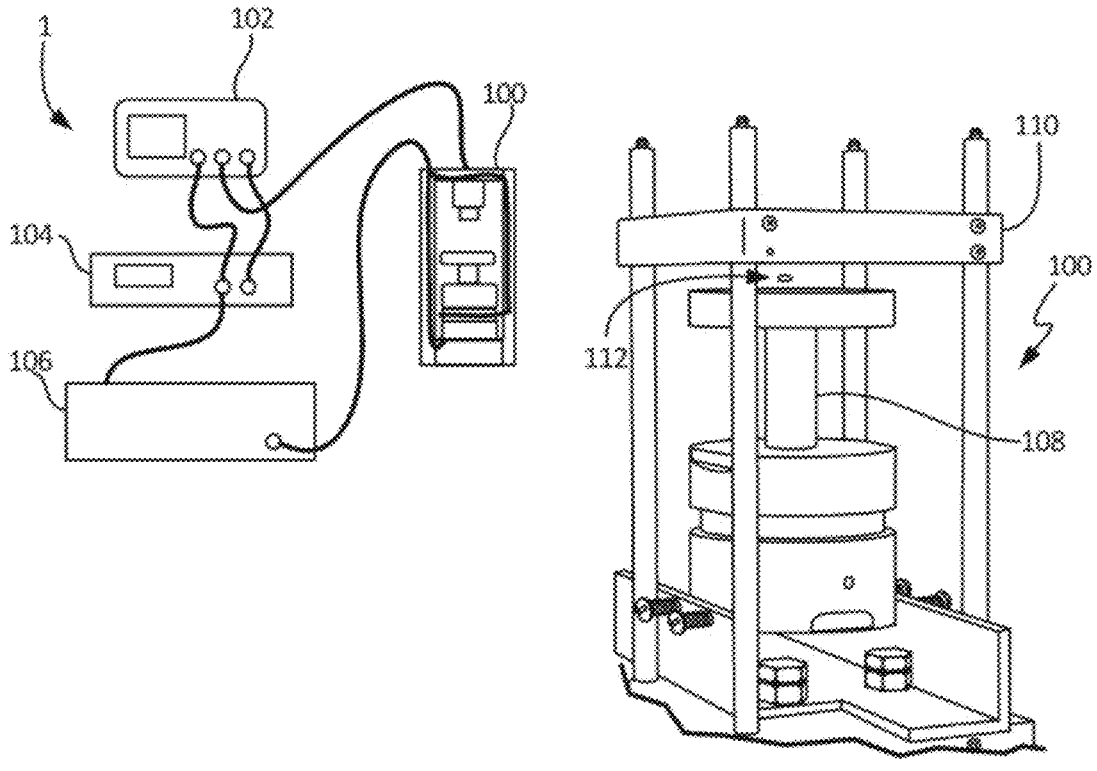
FIG. 11 depicts a model schematic of the system according to one implementation.

As disclosed herein, various implementations disclosed herein relate to a levitation and analysis system, shown generally at 10, also referred to variously as a tweezing system or acoustic rheological system executing certain methods on devices. It is understood that these systems, methods and devices contemplated herein refer to the technology for levitating and analyzing the samples, biofluids, blood and the like, as would be readily appreciated FIG. 11 depicts a schematic of one such system 10. In this implementation, the system 10 consists of a levitator (100), oscilloscope (102), function generator (104), amplifier (106), transducer (108), reflector (110), and a sample being levitated (112), such as are shown in the incorporated references. The carrier wave is sent by the function generator, amplified by the amplifier, and then sent to the transducer (108) to levitate the sample, where its characteristics are recorded and analyzed, as described herein and in the following Examples. Further detail on the levitator components and function can be found in the incorporated references.

Figure 12A:
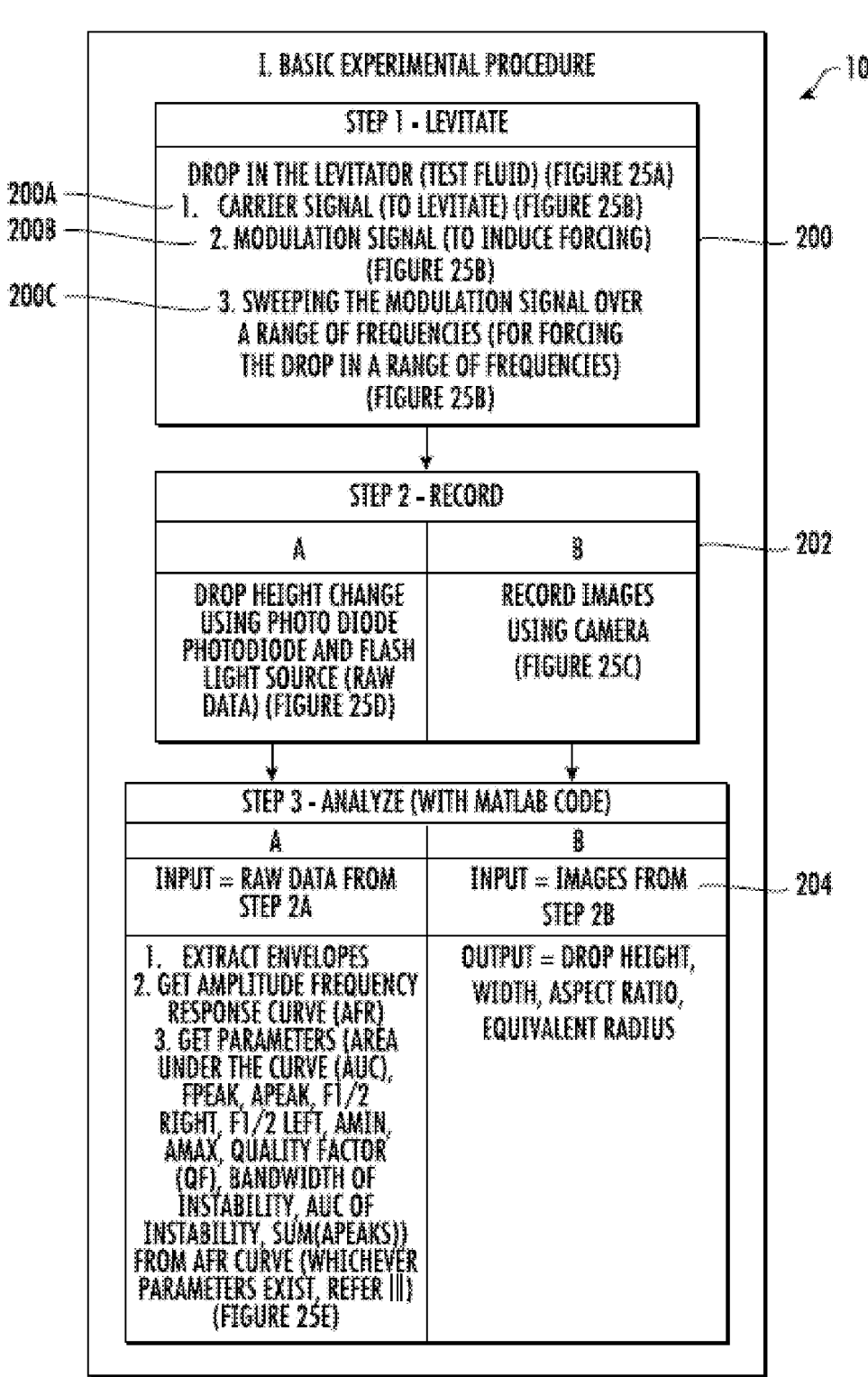
FIG. 12 The driving (carrier) signal is modulated by a sine wave, which serves as the modulation signal. The modulated output induces oscillations from the levitated fluid drop, which are recorded by a photodetector apparatus.

It is appreciated that one such levitation system is utilized in implementations such as those of FIG. 12A. In these and other implementations, the components are used to perform a variety of steps and sub-steps. For example, in the implementation of FIG. 12A, the system is used generally to perform levitation 200 and recording 202 for analysis 204, which can be done at the levitation system or on a separate processing system, as would be readily appreciated. In various implementations, known software and hardware components may be utilized, as would be readily appreciated.

As shown in FIG. 12A, the levitation step (box 200) can comprise a variety of sub-steps that can include an intervention or signal on the sample. That is, in various implementations, the levitation can comprise several sub-steps such as a carrier signal 200A, a modulation signal 200B and/or a sweeping signal 200C, as is further shown below in FIGS. 25A-25B.

In such implementations, the system 10 carrier signal 200A is used to levitate the drop with help of the carrier wave, which can be a sinusoidal signal whose frequency is the frequency of the transducer (such as about 29.5 kHz) generated by a first function generator. It is appreciated that many other configurations and frequencies can be used, such as from less than about 15 kHz to about 40 KHz or more. It is appreciated that the carrier frequency and configuration are such that the drop can be placed in the levitator and the drop will just be at rest if nothing is done.

Figure 13A:
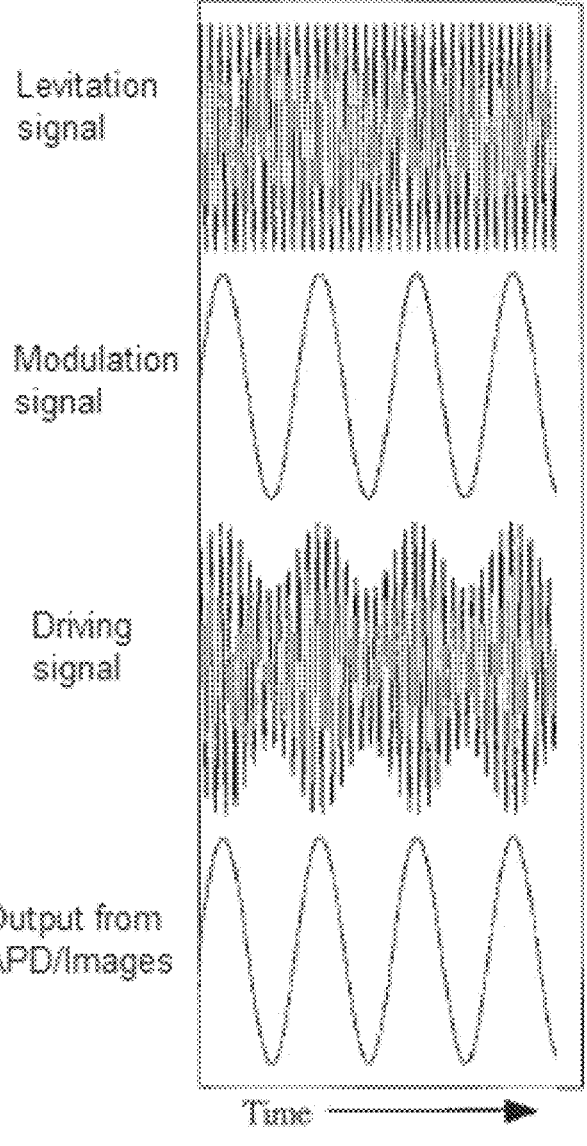
FIG. 13 depicts a model schematic of the system according to a further implementation. The levitation system—an automated syringe, placed on a stand is used to inject a 6 μL sample from the solution into the node sandwiched in-between the plates of the levitator-a transducer and a reflector. A flashlight is used as a light source for the camera, which is used to take photographs of the levitated sample. A humidifier (behind the camera) can be used to control the humidity in the room.

In the implementation of FIG. 12A, the modulation signal 200B is another sinusoidal signal which has a specific amplitude and a specific frequency. For example, a frequency such as 100 Hz and a depth of 10% can be utilized, meaning the amplitude of this modulated sinusoidal signal will be 10% of the modulation of the carrier signal amplitude as shown in FIG. 13A. It is understood that only the top and bottom depths of driving signal are modulated, and the depth determines how much the top and bottom depth are. In this example, the drop will be oscillating at 100 Hz frequency, which is hallmark modulation. Further explanation of depth as understood herein is found in relation to FIG. 25A. As depth is increased, more oscillation is observed, as would be understood by one of skill in the art.

In various implementations of the system 10, the modulation is swept 200C, that is, applied to the drop for a specified period of time and over a range of frequencies. Meaning, instead of utilizing a set frequency such as 100 Hz, the system utilizes a sweeping range (such as, for example from about 150 Hz to about 50 Hz, over a defined sweep time, such as about 10 seconds. It is appreciated that a variety of frequencies and times can be utilized, such as about 20 Hz to about 250 Hz or about 500 Hz, or from about 10 Hz to about 1 kHz or more such as up to about 30 kHz or more. In various implementations, the sweep can be over the course of a second or several seconds, such as about 10 seconds, about 30 seconds or more, up into the range of minutes of duration. It is appreciated that the size of the drop will impact these frequency and duration numbers, and that the rate of change in frequency over time is varied upon the specific properties of the drop, the size of the drop, and the specific parameters that are being studied.

Further, the sweeping 200C can occur in either direction, that is from a higher frequency to a lower frequency or from a lower frequency to a higher frequency. It is therefore understood that when the present discussion mentions from a first frequency to a second frequency, the opposite is also implied, that is, from the second frequency to the first frequency, as would be readily appreciated.

In various implementations, the sweep is determined on the basis of the rate of change, and the system 10 can utilize a variety of rates, such as from about 0.1 Hz/sec to about 100 Hz/sec change of frequency over time, either as an increase or decrease. Many implementations are of course contemplated, as discussed herein.

For example, if a sinusoidal signal 200B is applied for 10 seconds and in that 10 seconds the frequency of that sinusoidal signal is swept from about 150 Hz to about 50 Hz (or from about 50 Hz to about 150 Hz), which users select as needed, like as shown in FIG. 25B. Therefore the drop is subjected to a varying oscillation frequency, and for each frequency the drop will oscillate at a different amplitude and the oscillation amplitude is maximum at resonance frequency. Accordingly, a peak can be observed at a specific frequency when that particular drop has that frequency as resonance frequency.

In alternate implementations of the system, the sweep is omitted in favor of basic oscillation, and a single frequency that is, for example, slightly away from resonance is applied for a time (for example about 125 Hz for about 10 seconds) to collect the amplitude of oscillation for that one single frequency. One such example is shown in FIG. 36 and also in FIG. 12G.

Continuing with the implementation of FIG. 12A, during the recording step (box 202) raw data and/or images are recorded, such as image data via a camera and/or photo diode, respectively and as shown in FIG. 11 and FIGS. 25C-25D. Further aspects of the recording step are explained in detail herein.

During the analysis step (box 204) shown in the implementation of FIG. 12A, the raw data (step 2A) and/or images (step 2B) derived from the recording step (box 202) are inputted into an operations system as shown in FIG. 11 for analysis. Briefly, in certain implementations, the raw data can be analyzed via a number of optional sub-steps such as extraction 204A, generate an amplitude frequency response (AFR) curve 204B and retrieve parameters 204C, certain non-limiting examples including area under the curve (AUC), fpeak, Apeak, f1/2 right, f1/2 left, Amin, Amax, Quality factor (QF), bandwidth of instability, AUC of instability, sum (Apeaks) such as from the AFR curve, as is also shown in FIG. 25E.

As shown in the implementations of FIG. 12B, analysis can be performed depending on the nature of the AFR curve, several AFR curves can be identified, such as for example smooth with one peak (box 210), smooth with no peaks (box 212) or a non-smooth curve, having multiple peaks (box 214).

A smooth curve with one peak (box 210) refers to a situation where the drop undergoes stable quadrupole oscillation. Oscillation amplitude is highest near resonance frequency and lower for other frequencies. This results in one smooth peak. This is called stable resonance phase, as in FIG. 26B or 26C. In these situations, and as shown generally at box 216, certain parameters can be extracted, such as AUC, fpeak, Apeak, f1/2right, f1/2 left, Amin, Amax, Quality factor (QF) and others.

It is likewise understood that a smooth curve with no peaks (box 212) such as when a drop undergoes stable quadrupole oscillation, but is insensitive to any frequency changes, hence no peak is observed. This is called as stable non-resonance phase, as is also shown in FIG. 26C. Certain parameters in this situation are AUC, Amin, Amax and the like.

Additionally, it is understood that a non-smooth curve, having multiple peaks (box 214) refers to a situation where a drop undergoes unstable quadrupole oscillation near resonance frequency, hence several peak are observed and are random because of instability. This is called as unstable resonance phase, such as in FIGS. 26A-26B. Certain parameters in this situation are AUC, fpeaks, sum (Apeaks), Amin, Amax, bandwidth of instability, AUC of Instability and the like.

As shown in FIG. 12B, in various implementations, recorded images can be analyzed to output one or more of, for example, drop height, width, aspect ratio, equivalent radius and volume or others, as would be readily understood.

Figure 12C:
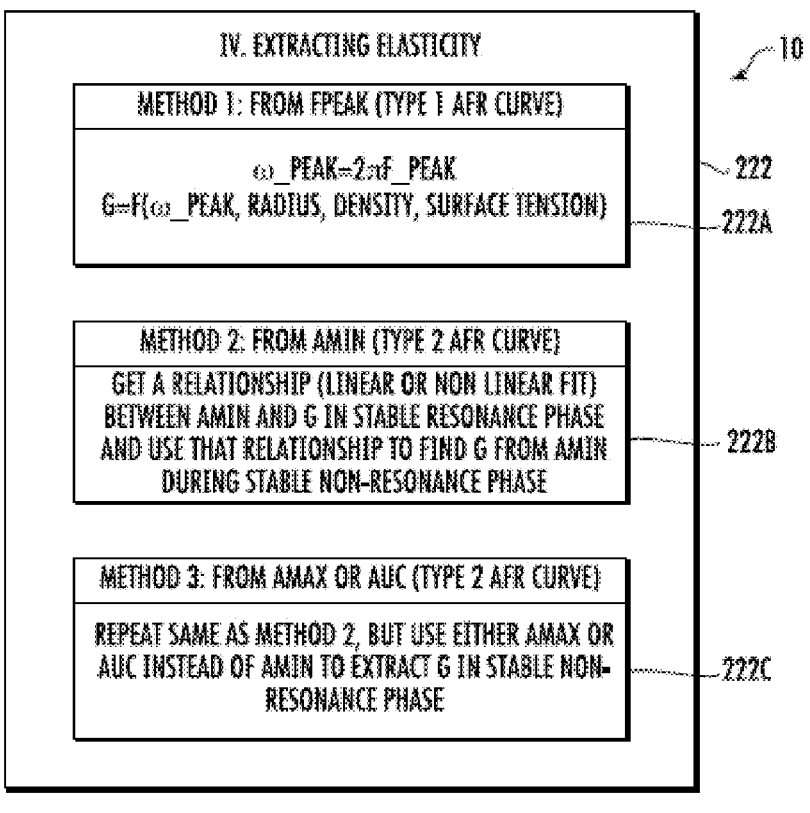

In FIG. 12C, in certain implementations, the system 10 extracts elasticity (box 222) as an optional step, from fpeak. Amin and or Amax or AUC. For example, in certain implementations, fpeak can be extracted 222A via:

$$\omega\_peak = 2\pi f\ peak$$

$$G = f(\omega\_peak, Radius, density, surface\ tension)$$

Further, elasticity or elastic modulus can be extracted from Amin 222B, where the relationship, linear or non-linear, between Amin and G in stable resonance phase is established and used to find G from Amin during stable non-resonance phases.

In further implementations, and as shown in FIG. 12C at 222C, elasticity can be extracted from the AUC, wherein the above procedure is applied but AUC or Amax is used instead of Amin to extract G, as would be readily appreciated.

Figure 12D:
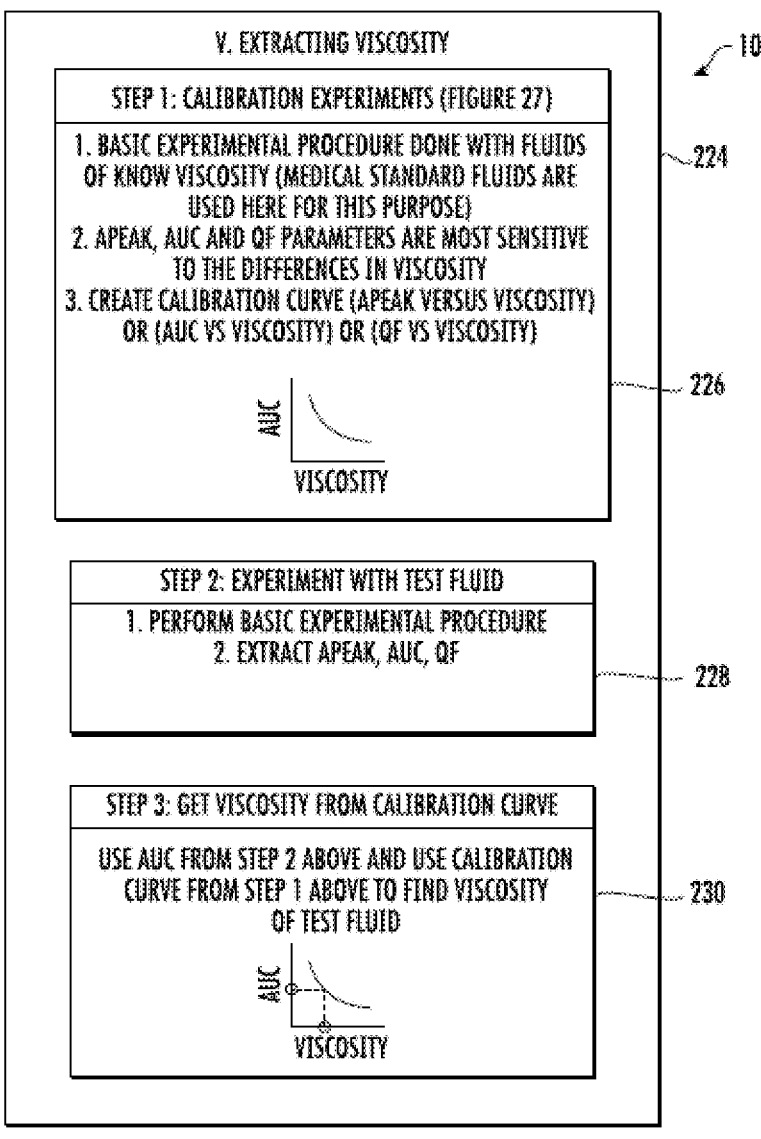

As shown in FIG. 12D, viscosity (box 224) can also be extracted from the parameters via a number of optional steps or sub-steps. In the implementation of FIG. 12D, optional calibration (box 226), experimentation (box 228) and calculation (box 230) steps are performed, though there are of course others and these can be performed in a variety of orders.

Briefly, during calibration (box 226), a standard procedure is performed with a fluid of known viscosity to establish certain parameters, such as Apeak, AUC and QF and create a calibration curve. Other parameters can of course be used.

During experimentation (box 228), the experimental or sample fluid is used to extract the same parameters, such as Apeak, AUC and/or QF. The calibration curve can then be used to establish viscosity (box 230), as would readily be appreciated.

As shown in the implementation of FIG. 12E, method validation (box 232) can be performed through a variety of techniques utilizing, for example, dextran, xanthan gum, gelatin and others, as is discussed herein at FIGS. 28-30. Briefly, as shown in FIG. 12E, certain non-limiting examples include viscosity validation (box 234), constant viscosity and constant elasticity (box 236) and/or increasing viscosity and elasticity (box 238).

During one such implementation of viscosity validation (box 234), several optional sub-steps are performed, namely, executing a basic experimental procedure with different dextran concentrations, establishing Apeak, AUC and QF parameters indicate sensitivity to viscosity difference, using AUC to estimated viscosity from calibration curves (as shown in FIG. 12D), validating with the reported values and establishing any effect on G and therefore fpeak. Further procedures are of course contemplated, as discussed elsewhere herein and below.

During one such implementation of constant validation (box 236), several optional sub-steps are performed, such as assessing any differences in Apeak, AUC, QF and fpeak observed, utilizing AUC to estimate viscosity based on (see FIG. 12D) and estimate elasticity.

During one such implementation of increasing viscosity and elasticity (box 238), several approaches can be utilized such as using the AUC can be used to estimate viscosity (see FIG. 12D) and/or fpeak used to estimate elasticity (see FIG. 12C). Further approaches are of course possible.

Turning to FIG. 12F, certain implementations of the system 10 can be applied to drop samples of, for example, blood plasma (box 240) and whole blood (box 242).

In the implementation of FIG. 12F, for blood plasma (box 240), several optional steps can be performed, including but not limited to: performing the basic procedure at set times to record clotting, extracting elastic tweezographs (that is, G over time) to establish coagulation parameters such as CIT, TFCF, CT, CR, MCF, TRP (similar to TEG viscoselastic measurements) and extracting extract viscous tweezograph (mu versus time) to get RT, FFR. MFL parameters (similar to plasma coagulation tests using turbidimetry measurements). Further series of steps can be performed, and one such example is shown at FIG. 31.

With regard to whole blood (box 242), and as shown in FIG. 32, the procedure can be similar to that previously described, with the *viscosus* tweezograph and parameters extracted. That is, in such implementations, the procedure is performed on whole blood drops at set times to record clotting, extracting elastic tweezographs (that is, G over time) to establish coagulation parameters including: reaction time (RT), fibrin formation rate (FFR), maximum fibrin level (MFL), clotting time (CT), clot initiation time (CIT), clotting rate (CR), time to firm clot formation (TFCT), maximum clot firmness (MCF), fibrin network formation time (FNFT), TRP (similar to TEG viscoselastic measurements) and extracting extract viscous tweezograph (mu versus time) to establish parameters (similar to plasma coagulation tests using turbidimetry measurements). Several of these parameters have not been measureable until the development of the presently disclosed method and associated systems and devices. Through these measurements, one can use the method to assess the functional levels of fibrinogen and Factor XIII in a blood sample, which are necessary for blood clot formation. When applied to other fluids, the method can detect the activity of molecules involved in the polymerization process or in the formation and cross-linking of fibrous proteins in biological tissues. When applied to blood coagulation, the disclosed system and method can measure the coagulation parameters of whole blood or blood plasma without exposing the blood sample to artificial reagents (ellagic acid, kaolin) or inducing sample contact with artificial surfaces.

As shown in FIG. 12G, in various implementations of the system 10, characteristics of a sample such as structure, weight, cell number, cell content and the like can be detected (box 250) from the sample, such as a whole blood or plasma sample. For example, molecular weight (box 252), protein content (box 254) and cell number (box 256) can be detected, as is shown in FIG. 12G.

In this implementation, for example, molecular weight can be detected by performing a number of steps on water and various low- and high-weight dextran to establish differences in, for example, the ARF curves and various parameters can be extracted, such as AUC, instability bandwidth, AUC of instability, sum (Apeaks) and the like.

Continuing with FIG. 12G, protein content (box 254) can be determined in a similar fashion utilizing, for example plasma and MSF 1.2 and determining differences in the parameters to detect albumin and other proteins. It is appreciated that alternate biofluids can of course be used.

The system 10 can further be used to determine a number of cells in a given sample, wherein several groups are assessed having various red blood cell percentages, and the detected parameter differences can be used to establish the number of cells in the sample.

Figure 12H:
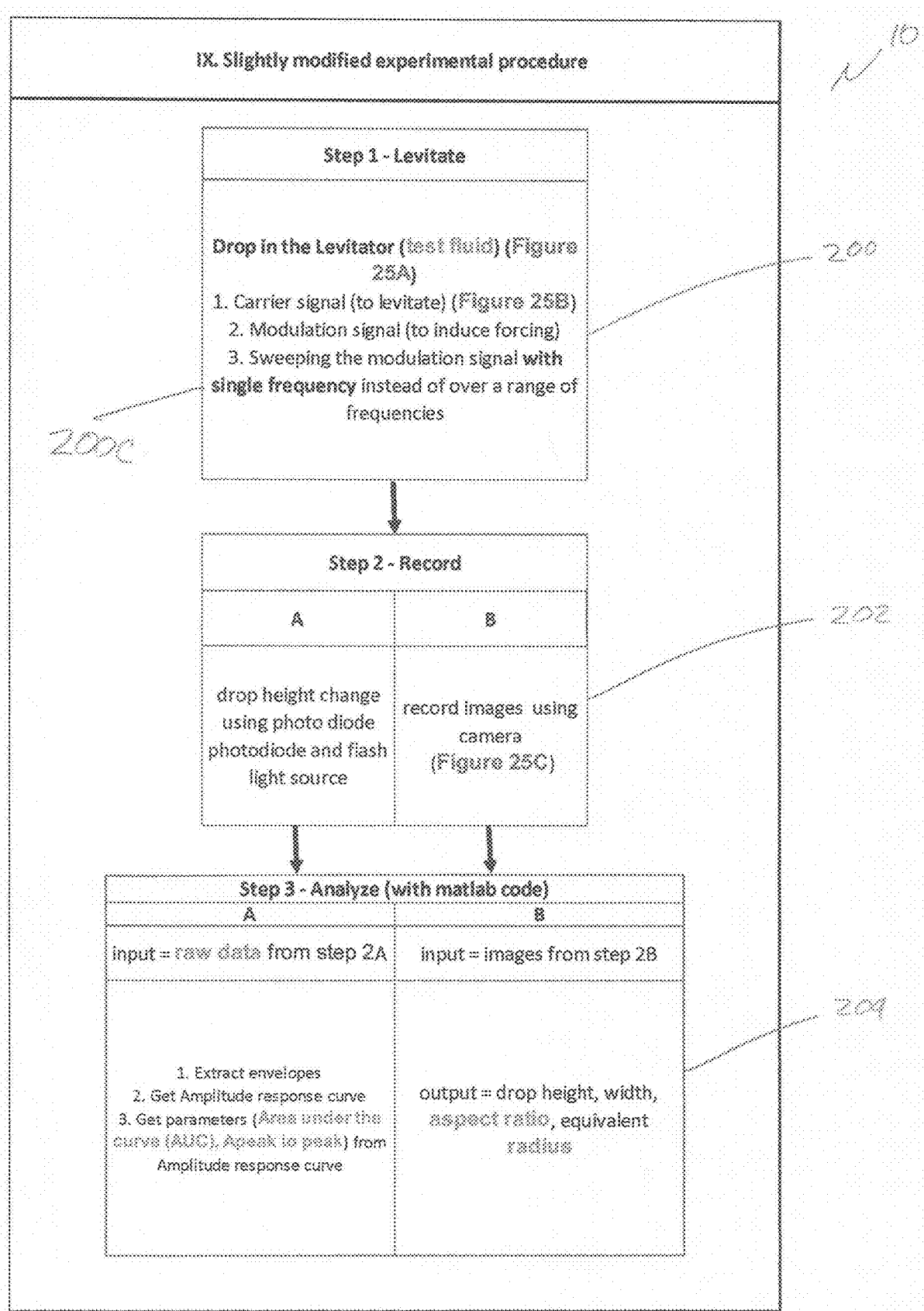

FIG. 12H depicts a further, alternate implementation of the experimental procedure outlined in FIG. 12A, with the difference being that the sweep 200C occurs at one set frequency, rather than over a range, as would be readily appreciated.

Figure 12I:
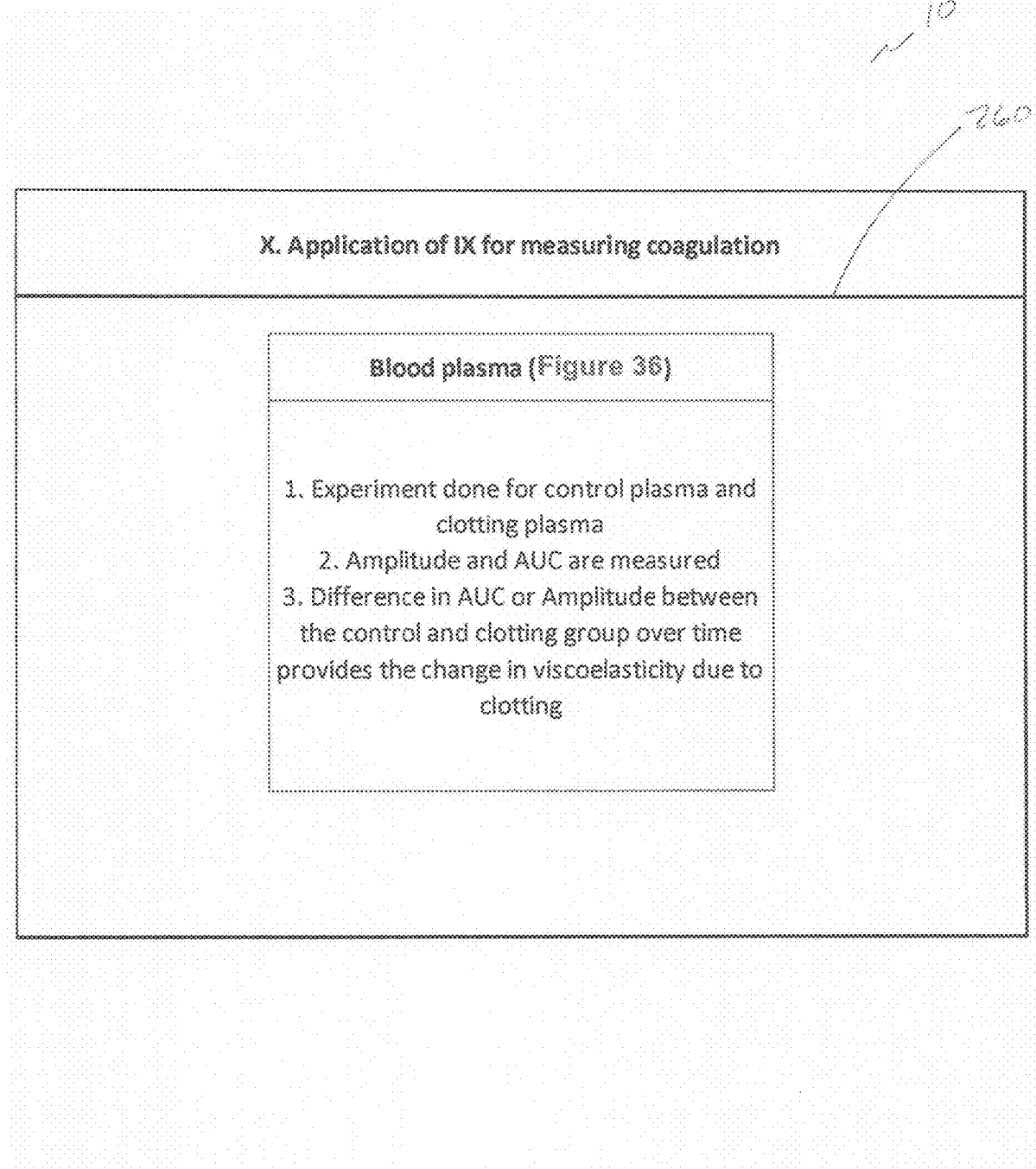

FIG. 12I depicts an application of the configuration of FIG. 12H as applied to blood plasma (box 260), where again, several optional steps are performed, namely, performing the experimental procedure on control and clotting plasma to record and analyze the AUC and amplitude to establish the difference in AUC and/or amplitude between the groups to establish the change in viscoelasticity due to clotting, as would be readily understood and as is further illustrated below in FIG. 36. Further implementations are of course possible.

The following examples are put forth so as to provide those of ordinary skill in the art with a complete disclosure and description of how the articles, devices and/or methods claimed herein are made and evaluated, and are intended to be purely exemplary of the invention and are not intended to limit the scope of what the inventors regard as their invention. However, those of skill in the art should, in light of the present disclosure, appreciate that many changes can be made in the specific embodiments which are disclosed and still obtain a like or similar result without departing from the spirit and scope of the invention.

Example I

MATERIALS AND METHODS

I. Acoustic Tweezing

In one Example, a custom-made acoustic levitation system was used for the experiments. The core of the device is a transducer and reflector, positioned as far apart from each other as a half-wavelength. A carrier wave was sent to the transducer by a function generator (Agilent 33220A Series Function Generator, Santa Clara, CA) and amplified using an amplifier (Krohn-Hite, Brockton, MA), thus creating a standing wave field. This standing wave field is made steady by two, 3.175 mm thick piezoelectric discs (Channel Industries, Santa Barbara, CA) serving as a 30 KHz transducer, and an aluminum cylinder serving as a reflector.

In dynamic acoustic tweezing spectroscopy experiments, the amplitude of the carrier wave is modulated by a sine wave using a second function generator. This modulation signal induces oscillations in the fluid drop, which is placed at a pressure node in the standing wave field and prior to the modulation, held steady. The oscillations of the fluid drop are recorded by a photodetector, which is aligned with the fluid drop. A flashlight is used as a light source, aligned with the levitated drop and the photodetector. The flashlight shines light through to the photodetector. As the fluid drop oscillates, it changes the amount of light which reaches the photodetector. Therefore, the output voltage from the photodetector is linearly proportional to the changing area of the fluid drop while oscillating As shown in FIG. 13A, the driving (carrier) signal is modulated by a sine wave, which serves as the modulation signal. The modulated output induces oscillations from the levitated fluid drop, which are recorded by a photodetector apparatus.

II. Sample Preparation

Samples for establishing a proof of concept were prepared by first creating base solutions of 5% dextran (United States Biological, Salem. MA) in aqueous solution. A 5% dextran concentration was chosen due to its ability to induce a more stable oscillatory mode. Dextran, in fact, has been used to make a fluid designed to mimic blood for ultrasonic applications because of dextran's ability to raise the viscosity of the water-based fluid. An increase in polymer concentration, such as dextran, increases the bulk viscosity of the solution. Therefore, fewer modes of oscillation in the solution are induced due to a higher viscosity (which reduces the tendency of the sample to oscillate when induced). Furthermore, increasing dextran concentration does not increase the elasticity of the solution. The ability to reduce the number of variable changes in the system allows for a more stable control group.

Each base solution of 5% dextran was mixed with a 10% solution of polystyrene microparticles (Sigma Aldrich, St. Louis, MO) in order to create solutions with concentrations of 0.025 M,0.05 M, and 0.1 M polystyrene microparticles in 5% dextran. Droplets from the solutions of these three solutions, along with that of the control group (5% dextran without polystyrene microparticles) were levitated.

III. Experimental Procedure

The levitation apparatus has two function generators in this example. The first function generator is used to send the carrier signal to create an acoustic wave field, and thus the frequency of the carrier wave must be controlled by the user in order to create a strong enough acoustic field to activate the node necessary to levitate the droplet. Once the node is activated, a pipette was used to extract 6 µL of solution and placed on the node in the standing wave field in-between the transducer and reflector. Once the acoustic field is strong enough to trap the droplet and levitate it, a custom LabVIEW code automatically triggers the second function generator to modulate the carrier wave. The sine wave serving as a modulation signal, modulates the carrier wave at a frequency sweep from 150 Hz to 50 Hz for ten seconds. During this modulation, voltage from the photodetector is captured using a data acquisition system (put data acquisition system information here). 6 samples of each concentration (5% dextran. 3% dextran, 1% dextran, 5% dextran w/0.1 PSMP, w/0.05 PSMP, and w/0.025 PSMP) were levitated (except for 10% PSMP, which only 4 samples were levitated), and 3 separate trials were done for each sample. The levitation period was done in one-minute intervals for ten minutes, meaning that the modulation signal was sent to the transducer every minute in order to induce ten-second oscillations.

Figure 13B:
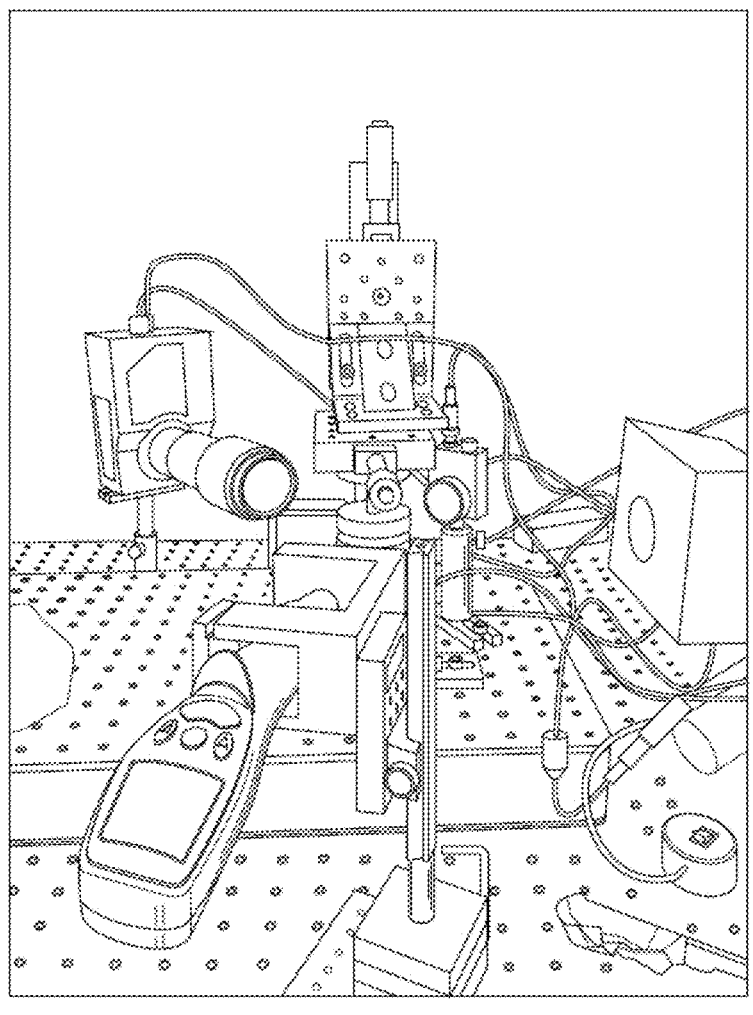
Figure 14:
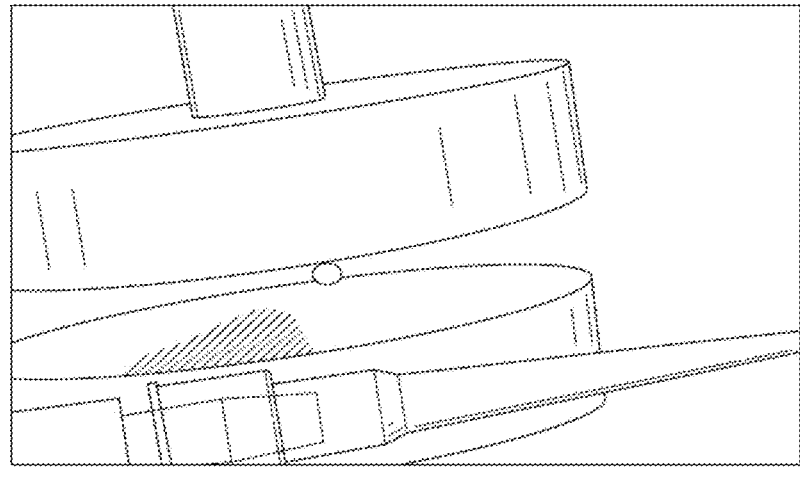
FIG. 14 depicts the levitation of a small sample via one implementation of the described system.

FIG. 13 depicts the levitation system—an automated syringe, placed on a stand is used to inject a 6 µL sample from the solution into the node sandwiched in-between the plates of the levitator-a transducer and a reflector. A flashlight is used as a light source for the camera, which is used to take photographs of the levitated sample. A humidifier (behind the camera) can be used to control the humidity in the room. In FIG. 14, a fluid sample of 6 µL is being levitated, though it is readily appreciated that a wide variety of sample sizes ranging down to less than 1 µL and above 15 µL. 20 µL or more are contemplated in various implementations. As would be appreciated, larger drops can be used when the levitator components are adjusted.

IV. Signal Processing

The raw voltage data was then processed through a custom MATLAB code which subtracted the mean of the signal from the entire signal to remove noise peaks at the ends of the signal and to normalize the signal, applied a notch filter to remove electrical line noise peaks at 60 Hz and its subsequent harmonics, applied a Hamming window over the length of the signal.

Figure 15:
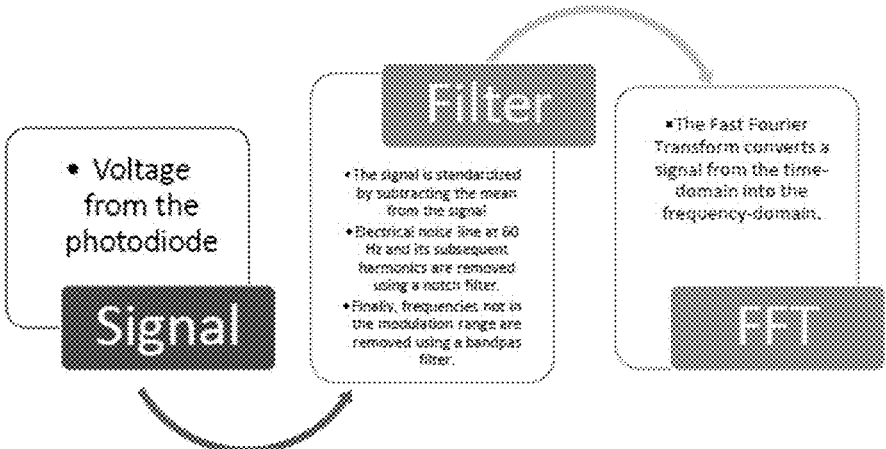
FIG. 15 is a schematic depicting the relationship between signal, filter and FFT.

As shown in FIG. 15, the voltage recorded by the photodetector is linearly proportional to the area of the fluid drop. The voltage (oscillation signal) is run through a bandpass filter, eliminating electrical hum noise at 60 Hz multiples. Then, the Fast Fourier Transform converts the signal from the time-domain to the frequency-domain.

V. Signal Analysis

Another custom MATLAB code was written to take the Fast Fourier Transform of the processed signal, converting the signal from the time-domain to the frequency-domain. Once taken, peak detection using specific thresholds for peak width and minimum peak distance was used to isolate distinctive peaks in the spectrum and the most prominent peaks were recorded. The same MATLAB code was also programmed to create a spectrogram of the processed signal, using a window-size of 250 s. The most prominent energy bands of the spectrogram were recorded, and then cross-matched with the prominent peaks of the spectrum for formant verification. Finally, the Q-factor was used to analyze the sharpness of the resonant peaks.

Figure 16:
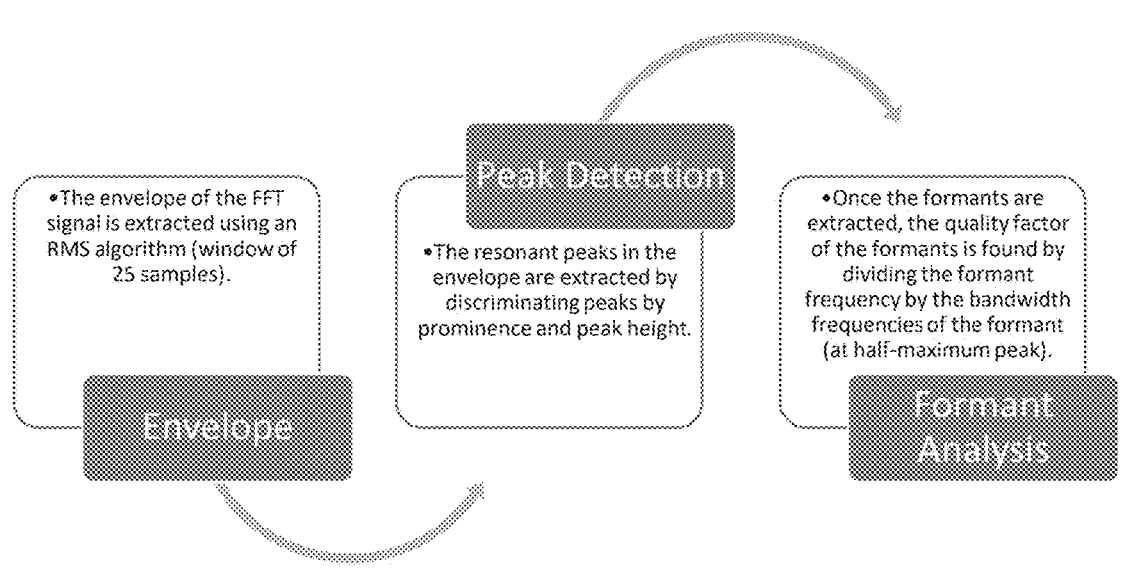
FIG. 16 is a schematic depicting the relationship between envelopes, peak detection and formant analysis.

As diagrammed in FIG. 16, envelopes are much smoother curves than the FFT, and therefore are much nicer to work with when approximating resonant peaks. Peak discrimination is performed via a peak width and prominence threshold, and then the quality factor of each resonance peak is calculated.

RESULTS

I. Formant Extraction

Figure 17:
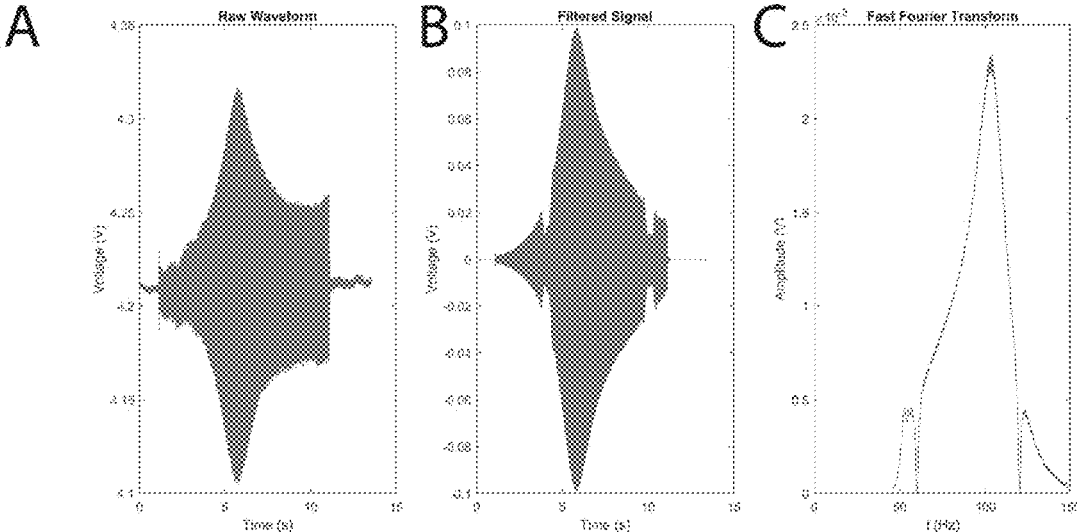
FIG. 17A-C depict a series of voltage/time graphs showing the raw waveform (FIG. 17A), the filtered signal (FIG. 17B) and the FFT (FIG. 17C).

FIGS. 17A-C depict graphs showing where the signal (A) is filtered and standardized to remove unnecessary variation and noise. The resulting signal (B) is then analyzed in the frequency-domain using a fast-Fourier transform, which highlights clear resonance peaks for analysis (C).

Figure 18:
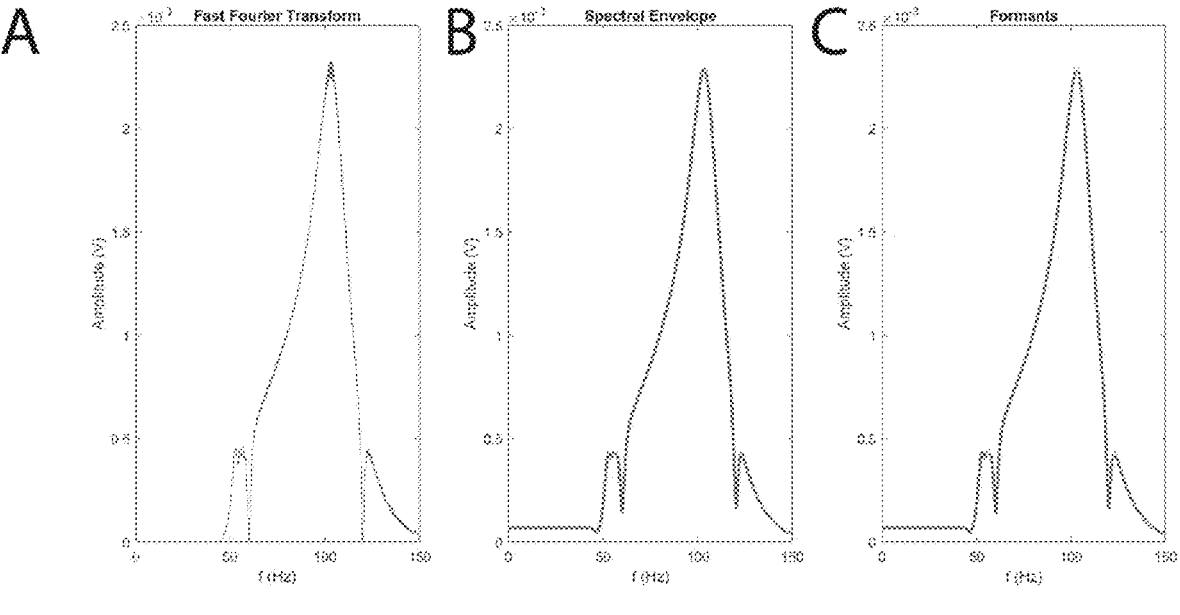
FIG. 18A-C depict a series of amplitude/frequency graphs showing the FFT (FIG. 18A), the spectral envelope (FIG. 18B) and the formants (FIG. 18C).

FIGS. 18A-C depict the Fast Fourier Transform (A), the spectral envelope (B) and the picking of the formants (C). As can be observed, the envelope is much smoother, and the peaks are clearer, allowing for easier discrimination of the resonances of the system.

The Fast Fourier Transform revealed, for most levitated samples, three distinct resonant peaks—each hovering between about 50 and 60 Hz, about 90 and 110 Hz, and about 120 and 125 Hz. To examine exact amplitude and frequency from each of these resonant regions, the envelope-extraction function based on an RMS algorithm was the best method for picking out the right formants (in green).

II. Validation of Control Selection

Samples of 1% dextran, 3% dextran, and 5% dextran solutions were levitated to study the effects of higher dextran concentration on resonant peaks to verify the effect that higher dextran concentrations have on the viscosity of the solution would lower the number of resonant peaks (in this case, variability of them) or oscillatory modes.

Figure 19:
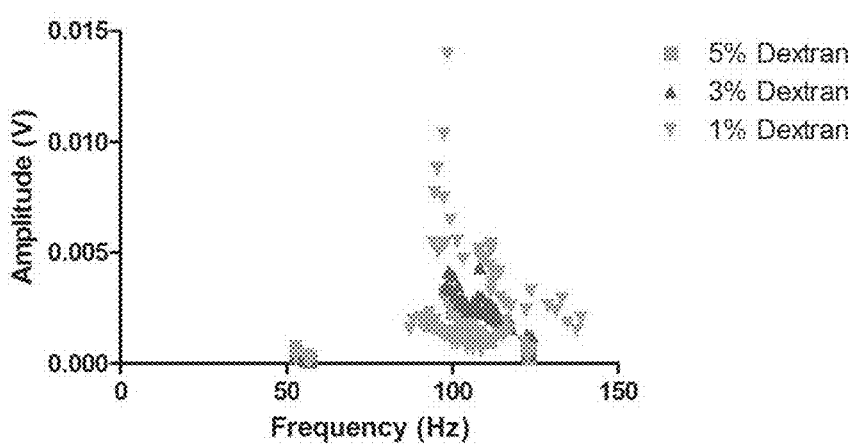
FIG. 19 depicts the amplitude-frequency response of several dextran samples of 1%, 3% and 5% concentrations.

FIG. 19 depicts the results, where 5% dextran (in green) lowers the number of oscillatory modes of the system because higher concentrations of dextran increases the overall viscosity of the sample. The more viscous the sample is, the fewer oscillatory modes it will have. 1% Dextran exhibits behavior very similar to water.

III. Formant Frequency Analysis of Reagents

To directly examine and test the initial hypothesis that complex compositions would form a spectrum that would depict the resonances of its inner components, the individual reagents, 5% dextran solution and 10% PSMP in aqueous solutions, were levitated as in original form prior to mixing.

Figure 20:
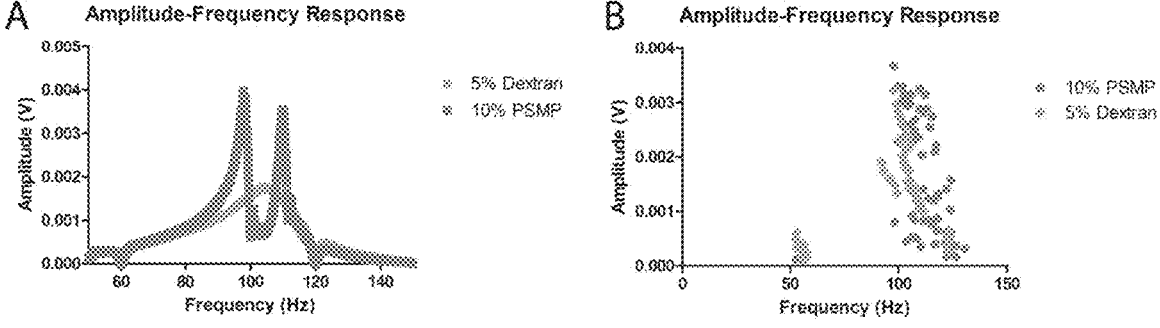
FIGS. 20A-B depict the amplitude-frequency response of 5% dextran and 10% PSMP.

As shown in FIGS. 20A-B, three resonance peaks (two in pink, one in green) in (A) are found when normal oscillation curves are overlayed on one another. (B) shows all of the resonances of all of the samples levitated for all of the time points for all of the trials, clearly showing a higher number for PSMP.

IV. Formant Frequency Analysis of Composition

The oscillation signals of the levitated samples of 0.1 PSMP, 0.05 PSMP, 0.025 PSMP and the control group of 5% dextran were acquired and analyzed as explained in the prior section. Significant peak deterioration, especially of the fourth peak which was seen in the 0.1 PSMP samples was observed typically after 5 minutes of experimentation. Therefore, the data analysis shown here is of the oscillations observed at time intervals of I minute up to 5 minutes of the samples. A two-way ANOVA test revealed the time not to have any significant effect on the variation of the peak formant frequency values of the oscillation curves (p=0.0708), however, the PSMP concentrations themselves had a significant effect on the variation of the peak formant frequency values (p=0.0012).

Figure 21:
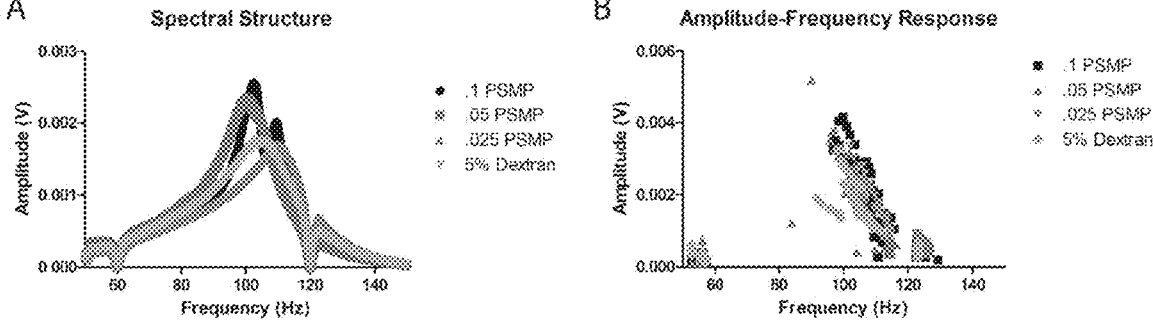
FIGS. 21A-B depict the amplitude-frequency response of 5% dextran and various concentrations of PSMP

As shown in FIG. 21A-B, although harder to see in either plot, in FIG. 21A, a shift can be seen in F0 as the concentration of PSMP increases, as well as an additional resonance peak in black. In FIG. 21B, resonances of all the samples for all of the time points for all of the trials.

To examine this effect further, the highest formant frequency values by amplitude were chosen for head-to-head analysis (F0 for the highest, and F1 for the second highest). This was done to capture the observation that two high oscillatory modes were induced in the 0.1 PSMP samples as opposed to only one high oscillatory mode for the other concentrations tested. Samples with two high oscillatory modes were likely to have F1 frequency values closer to the F0 than samples with one oscillatory mode.

TABLE 2

| Formant Frequency Means (+/−Standard Error Mean) At F0 At Each Time Point For All The Concentrations. F0 Formant Frequency Means | | | |
|---|---|---|---|
| Time (min) | .1 PSMP | .05 PSMP | .025 PSMP | 5% Dextran (control) |
| 0 | 102.623 +/− 1.875 | 102.886 +/− 3.877 | 106.964 +/− 1.512 | 99.525 +/− 1.814 |
| 1 | 104.132 +/− 2.019 | 104.703 +/− 3.491 | 108.051 +/− 1.620 | 100.739 +/− 1.831 |
| 2 | 105.379 +/− 2025 | 109.030 +/− 5.279 | 108.989 +/− 1.646 | 102.398 +/− 1.695 |
| 3 | 107.080 +/− 2.205 | 110.022 +/− 5.265 | 110.099 +/− 1.685 | 103.620 +/− 1.591 |
| 4 | 107.770 +/− 1.847 | 108.061 +/− 3.860 | 110.719 +/− 1.593 | 104.711 +/− 1.693 |
| 5 | 109.139 +/− 1.868 | 104.230 +/− 5.680 | 111.307 +/− 1.366 | 105.683 +/− 1.759 |

TABLE 3

| Formant Frequency Means (+/-Standard Error Mean) At F1 At Each Time Point For All The Concentrations. F1 Formant Frequency Means | | | |
|---|---|---|---|
| Time (min) | 1 PSMP | .05 PSMP | .025 PSMP | 5% Dextran (control) |
| 0 | 112.885 +/- 3.306 | 86.591 +/- 14.016 | 122.992 +/- 0.041 | 88.421 +/- 15.455 |
| 1 | 113.605 +/- 3.136 | 109.213 +/- 11.100 | 122.939 +/- 0.044 | 100.171 +/- 14.476 |
| 2 | 103.286 +/- 9.748 | 117.471 +/- 2.866 | 122.995 +/- 0.061 | 111.863 +/- 11.172 |
| 3 | 117.24 +/- 3.412 | 106.002 +/- 10.312 | 123.115 +/- 0.066 | 123.0651 +/- 0.042 |
| 4 | 123.240 +/- 0.442 | 119.587 +/- 2.788 | 123.115 +/- 0.136 | 104.711 +/- 1.693 |

As shown in FIGS. 22A-D, time was not found to have a significant effect on the F0 frequency values ($p=0.0708$), but it did influence F1 frequency values ($p=0.0037$)*. The concentrations of microparticles in the levitated samples was found to have a significant effect for F0 and F1 ($p=0.0012$ and $p=0.0032$)*.

Figure 22:
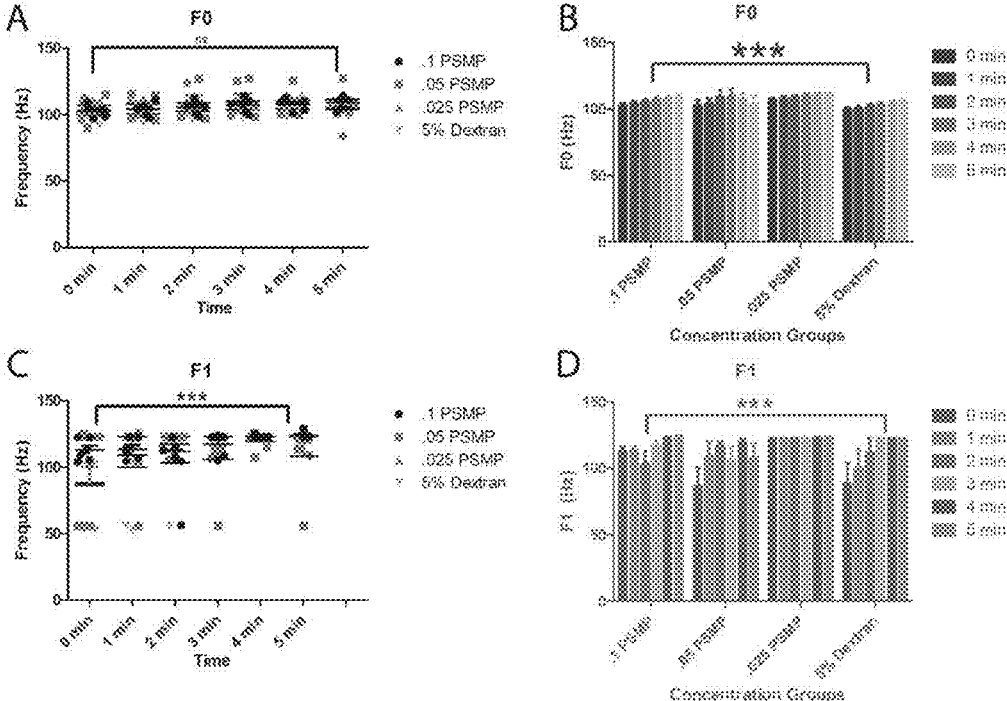
FIG. 22 depicts comparisions of PSMP and dextran concentrations with frequency over time for the highest formant frequency values by amplitude were chosen for head-to-head analysis (F0 for the highest, and F1 for the second highest).

As seen in FIG. 22A, time did not have a significant effect on the values of the peak formant frequency value (F0) between the tested concentration groups. However, time ($p=0.0037$), along with the PSMP concentrations ($p=0.0032$), was seen to have a significant effect on F1 frequency values (FIGS. 22C and 22D). It was observed that the quality in resonant peaks decreased with time-therefore, the Q-factor of each of the resonant peaks was calculated to further examine this phenomenon.

V. Formant Q-Factor Analysis

The Q-factor of each F0 and F1 resonance peak was calculated for samples from each concentration. Similarly, the frequency values of the formants, time was neither found to cause a significant effect (FIGS. 22A and 22C) in variation of the Q-factor means between PSMP concentrations in either F0 ($p=0.1095$) or F1 ($p=0974$). Concentration was only found to cause a significant effect (FIG. 22B) in mean variation in F0 ($p<0.0001$), not F1 ($p=. 4871$).

Figure 23:
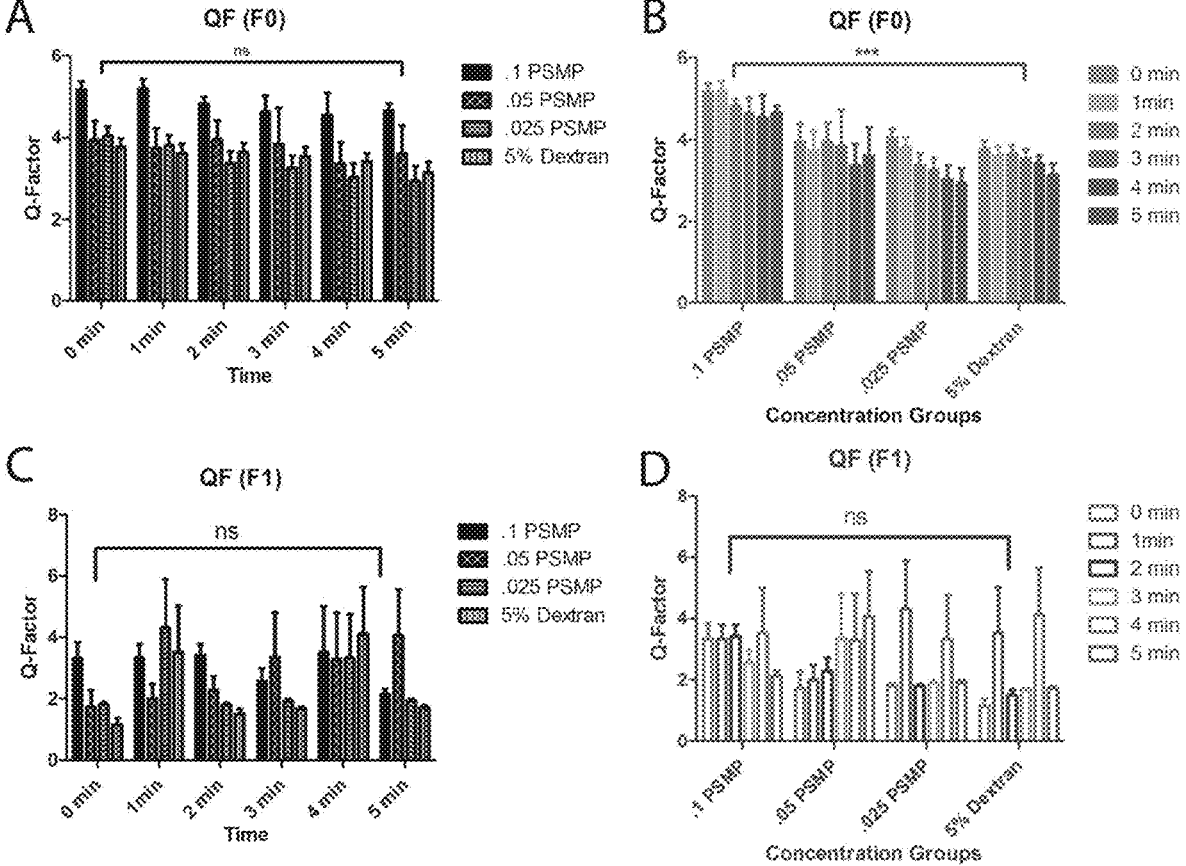
FIGS. 23A-D depict the Q-factor analysis for a range of dextran and PSMP concentrations over time.

As shown in FIG. 23A, time was not found to have a significant effect on the Q-factor values for either F0 ($p=.1094$) or (FIG. 23C) F1 ($p=0.0974$). The concentrations of microparticles in the levitated samples was found to only influence F0 Q-factor values ($p <0.0001$)***, and not F1 Q-factor values ($p=. 4871$).

Figure 24:
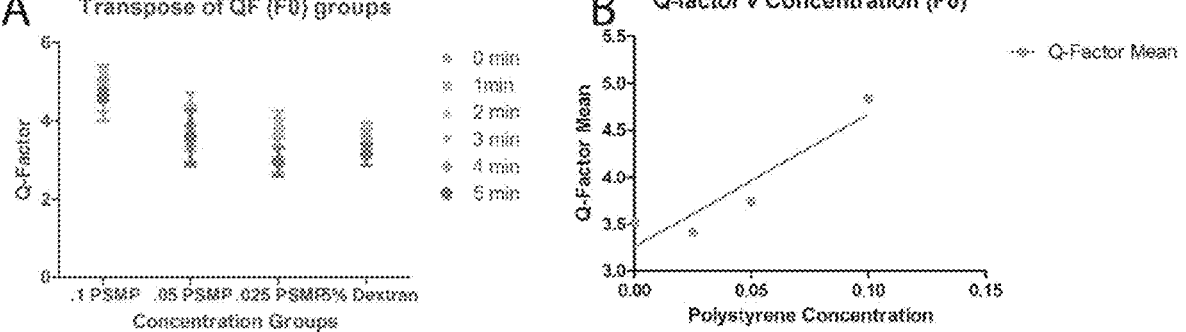
FIG. 24A depicts plots of the means of the Q-factor of the F0 resonance peaks of the different concentrations at each time point.
In FIG. 24B, means of the Q-factor values for F0 showed a linear trend between concentration and Q-factor (R2=0.885).

FIG. 24A depicts plots of the means of the Q-factor of the F0 resonance peaks of the different concentrations at each time point. In FIG. 24B, means of the Q-factor values for F0 showed a linear trend between concentration and Q-factor ($R2=0.885$).

Figure 27:
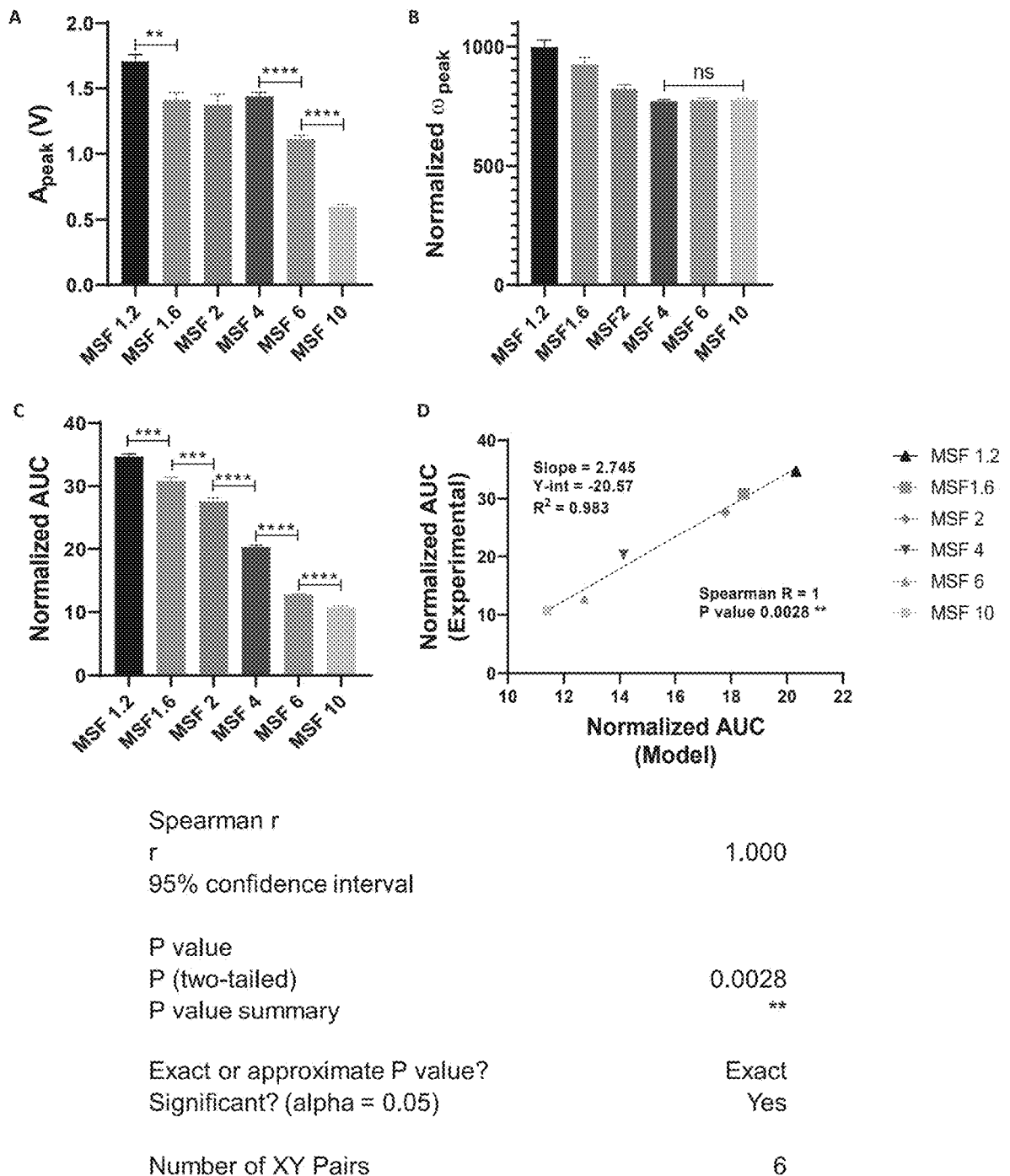
FIG. 27: (A) Peak amplitude (B) Normalized Peak Frequency (ω) (C) Normalized Area under the curve (AUC) of medical standard fluids measured by The disclosed systems and methods. MSF 1.2 (black, n=9), MSF 1.6 (pink, n=9), MSF 2 (green, n=9), MSF 4 (purple, n=9). MSF 6 (lavender, n=9), MSF 10 (blue, n=9) (D) Normalized AUC measured from the theoretical model versus that measured from the experiments.

The Q-factor for F0 of 0.1 PSMP is consistently higher than the means of the Q-factors from the other concentrations (FIG. 27A). A linear regression analysis of the total means of all the Q-factors at each time point for each concentration, returns an R-squared value of 0.885 (FIG. 27B), implicating that concentration of PSMP in 5% dextran has a linear relationship with Q-factor.

TABLE 4

| Q-Factor Means (+/-Standard Error Mean) At F0 At Each Time Point For All The Concentrations Q-Factor Means (+/-Standard Error Mean) At F0 At Each Time Point For All The Concentrations Q-Factor Means of F0 | | | |
|---|---|---|---|
| Time (min) | .1 PSMP | .05 PSMP | .025 PSMP | 5% Dextran (control) |
| 0 | 5.161 +/- 0.211 | 3.948 +/- 0.454 | 4.048 +/- 0.221 | 3.770 +/- 0,198 |
| 1 | 5.188 +/- 0.238 | 3.742 +/- 0.482 | 3.810 +/- 0.247 | 3.617 +/- 0.244 |
| 2 | 4.821 +/- 0.171 | 3.953 +/- 0.457 | 3.379 +/- 0.285 | 3.649 +/- 0.212 |
| 3 | 4.632 +/- 0.395 | 3.837 +/- 0.892 | 3.255 +/- 0.301 | 3.536 +/- 0.231 |
| 4 | 4.543 +/- 0.542 | 3.363 +/- 0.520 | 3.028 +/- 0.344 | 3.413 +/- 0.203 |
| 5 | 4.656 +/- 0.170 | 3.606 +/- 0.693 | 2.943 +/- 0.355 | 3.141 +/- 0,269 |

TABLE 5

| Q-Factor Means (+/-Standard Error Mean) At F1 At Each Time Point For All The Concentrations Q-Factor Means of F1 | | | |
|---|---|---|---|
| Time (min) | 1 PSMP | .05 PSMP | .025 PSMP | 5% Dextran (control) |
| 0 | 3.322 +/- 0.515 | 1.719 +/- 0.561 | 1.812 +/- 0.073 | 1.152 +/- 0.210 |
| 1 | 3.333 +/- 0.442 | 2.002 +/- 0.483 | 4.318 +/- 1.570 | 3.526 +/- 1.498 |
| 2 | 3.418 +/- 0.360 | 2.283 +/- 0.433 | 1.797 +/- 0.058 | 1.505 +/- 0.171 |
| 3 | 2.568 +/- 0.407 | 3.343 +/- 1.463 | 1.902 +/- 0.079 | 1.678 +/- 0.046 |
| 4 | 3.521 +/- 1.479 | 3.285 +/- 1.512 | 3.329 +/- 1.426 | 4.113 +/- 1.522 |
| 5 | 2.140 +/- 0.158 | 4.055 +/- 1.488 | 1.922 +/- 0.065 | 1.716 +/- 0.054 |

Example II

MATERIALS AND METHODS

Medical viscosity standards MGVS100 (MSF 10), MGVS60 (MSF 6), MGVS40 (MSF 4), MGVS20 (MSF 2), MGVS16 (MSF 1.6) and MGVS12 (MSF 1 2) with corresponding viscosities of 10.0 mPa·s, 6.0 mPa·s. 4.0 mPa·s. 2.0 mPa·s, 1.6 mPa·s and 1.2 mPas at 25 0C are purchased (Millipore Sigma, Burlington, MA, USA). Different concentrations of dextran solution are prepared by dissolving 2000000 MW dextran, from *Leuconostoc* spp (Sigma-Aldrich, St. Louis, MO, USA) and Dextran MW 35000 to 45000 (from US biological life sciences, Salem, MA. USA) in phosphate-buffered saline (PBS. Thermo Fisher Scientific. Waltham, MA, USA). Similarly, Xanthan gum from *Xanthomonas campestris* (Sigma-Aldrich, St. Louis, MO, USA) and Gelatin from porcine skin with gel strength 200. Type A (Sigma-Aldrich. St Louis. MO, USA) are mixed with distilled water to attain desired concentration. Xanthan gum is allowed to dissolve at room temperature for 2-3 hours while gelatin mixture is kept in 37 C water bath for at least 30 minutes to dissolve.

For blood plasma studies, control normal, Level 1 human plasma (REF 10059). Activated Partial Thromboplastin Time APTT-XL (Ellagic Acid Activator) was purchased from (Thermo Fisher Scientific, Waltham. MA, USA) and calcium chloride powder is purchased (Sigma-Aldrich,, St. Louis, MO, USA). Intrinsic pathway of plasma coagulation is initiated by mixing the plasma with a custom recipe of the APTT-XL and 0.2M CaCL2. Plasma and APTT-XL reagent mixture is used as an intrinsic pathway. Whole blood is collected from volunteers using a human subject IRB protocol in sodium citrate tubes (blue top). Whole blood coagulation is initiated in the intrinsic pathway similar to that of blood plasma. 10% washed pooled Sheep red blood cells are purchased from Rockland Immunochemicals. Inc. (Gilbertsville, PA, USA). The 10% solution is further diluted in equal amount of PBS to get 5% RBC solution.

I. Device Setup

An acoustic tweezing system was custom fabricated in the lab. A schematic of this acoustic tweezing system is shown in FIG. 25A. One key component of the system consists of an acoustic levitator consisting of a transducer with a natural frequency in the order of 29.5 KHz, a reflector surface placed at half wavelength distance from the transducer surface. In this Example, two signal generators (Agilent 33220A, Santa Clara, CA, USA) are setup to create the driving signal that includes both static signal and modulation signal generated from each signal generator, respectively. This combined driving signal as represented in FIG. 25B is amplified with (Krohn-Hite 7500, Brockton, MA, USA) and sent to the transducer. A digital camera (acA1920-25 um, Basler, Ahrensburg, Germany or HotShot HS MegaX3CC, NAC Image Technology. Tokyo, Japan) is used to capture images of the sample drop at regular intervals during the experiment in order to track the size of the drop. A photodetector (DET 100A Si Biased Detector, 350-1100 nm, Thorlabs Inc. Newton, NJ, USA) and focused light source (Odepro KL52Plus Zoomable Hunting Flashlight, Odepro Technology Co. Ltd, Shenzhen, China) setup are used to track the vertical deformation i.e change in the height of the sample drop during shape oscillation similar to that described in with the exception of using a focused light source instead of a He—Ne laser. This Example observed that a focused light is good enough to track the deformation and acts as a cheaper and safer alternative to using a laser in such setup. The output voltage of the photodiode is acquired using National Instruments (Austin, TX, USA) Data acquisition system (cDAQ-9171 CompactDAQ chassis with NI-9239 C series voltage input module) and DAQExpress software and further signal processing and parameter extraction is done in MATLAB.

As used herein, the depth is a given amplitude of the modulation signal over the amplitude of the carrier signal, such that [amplitude of the modulation signal=depth*amplitude of the carrier signal] and if the depth lies between 0 and IV, where 0)=0% and 1=100%; a depth of 10%=0.1V, and a depth of up to about 50% is contemplated.

For example, in FIG. 25B, the signal in black is the carrier signal having an amplitude of A, and because 10% depth was used, the signal in pink (the modulation signal) has an amplitude of 0.1A based on above formula, as would be readily appreciated.

II. Experimental Procedure

A sinusoidal signal of 29.5 KHz acts as the static signal to create the acoustic standing wave field to levitate the sample drop (typically about 6 μl in volume). Another sinusoidal signal swept in a range of frequencies in the order of Hz for a short period of time with 10% of the static signal amplitude acts as the modulation signal which induces forced drop deformation by producing shape oscillations of the sample drop within the range of the swept frequencies. FIG. 25C demonstrated a series of levitating blood drops undergoing shape oscillation captured by the camera. A custom written MATLAB code with edge detection algorithm is used to extract the drop dimensions including width, height, aspect ratio and equivalent radius. FIG. 25D represents a sample drop response during a single frequency sweep.

Unless otherwise mentioned, the modulation signal is swept from about 150 Hz to about 50 Hz at a rate of 10 Hz/sec. It is readily appreciated that further ranges of frequencies are of course contemplated, such as any range from about 1 Hz Upper and lower envelopes of the drop response were obtained using a custom MATLAB code. The difference between both the envelopes represents the total peak to peak amplitude as a function of the frequency. An amplitude-frequency response (AFR) (FIG. 25E) was thus obtained for each drop response, which represents the total peak to peak amplitude as a function of the frequency range in which the sweep is performed. Several parameters were extracted from the AFR curve including the frequency at which the drop undergoes maximum deformation (fpeak), maximum deformation amplitude (Apeak), Area under the curve (AUC), Quality factor (QF), Amplitude at the minimum value of the modulated frequency (Amin) and Amplitude at the maximum value of the modulated frequency (Amax), Quality Factor is measured from the AFR curve as:

$$QF = \frac{f_{peak}}{\left| f_{\frac{1}{2}left} - f_{\frac{1}{2}right} \right|} \qquad \text{Eq. (2)}$$

where $$f_{\frac{1}{2}left} \text{ and } f_{\frac{1}{2}right}$$

are the frequencies at half the value of $A_{peak}$. Peak frequency is reported either as $f_{peak}$ in Hz or as $\omega_{peak}=2\pi f_{peak}$ in $\sec^{-1}$.

III. Viscosity Measurement

A simplified version of Marstons's theory formula has been previously used to fit the strain response of the drop with respect to frequency during shape oscillation for estimating viscosity. This Example used another form of this formula, given below Eq. (3) in a numerical analysis to generate the amplitude frequency response curves and the respective parameters from those curves for the medical standard fluids with known viscosities:

$$x = \frac{8\sigma A}{\sqrt{\left(8\sigma - \omega^2 \rho R^3\right)^2 + \left(10\omega R\mu\right)^2}} \qquad \text{Eq. (3)}$$

where x is the amplitude response, A is the driving amplitude, ω is the modulation frequency, σ is the surface tension, ρ is the density, μ is the viscosity and R is the radius of the drop. The parameters obtained from the model are compared and correlated with the experimentally obtained parameters to obtain a correction to the model. This Example choose AUC, normalized based on drop volume and aspect ratio as the parameter for such analysis in this manuscript. However, similar analysis can be done on the remaining parameters as well. The correction is then applied to the model to create unique calibration curves based on the viscosity of the medical standard fluids for each sample whose viscosity is to be determined. In this case, the calibration curve is a plot of the viscosity versus normalized AUC from which the viscosity of the sample is determined based on its experimentally obtained normalized AUC value.

IV. Elasticity Measurement

Elastic modulus (G) is assessed from the formula obtained by doing theoretical analysis of shape oscillations of viscoelastic drops similar to that done in but by using a Kelvin-Voigt viscoelastic model.

$$G = \frac{(\omega_{peak}^2 - \omega_i^2)\rho R^2}{10}, \, \omega_i^2 = \frac{8\sigma}{\rho R^3}. \qquad \text{Eq. (4)}$$

FIGS. 26A-C depict the amplitude frequency response curves of (A) Medical standard fluids MSF 1.2 (black), MSF 1.6 (pink), MSF 2 (green), MSF 4 (purple), MSF 6 (lavender), MSF 10 (blue). (B) Dextran 5% (w/v) solutions of molecular weights-2000000 (pink), 20000 (blue). (C) Commercial blood plasma (dashed line) and commercial blood plasma treated with APTT and CaCl2 (solid line) at time 0 minutes (blue). 2.5 minutes (pink) and 5 minutes (green).

Note that the ability to measure elastic modulus is dependent on being able to measure $\omega_{peak}$. However, $\omega_{peak}$ can only be measured in the resonance phase but not in the non-resonance phase of the experiment. The resonance and non-resonance phases are depicted in FIG. 26C and explained in detail in the next section. $A_{min}$ parameter is observed to vary in a similar fashion as $\omega_{peak}$ Therefore, G value in the non-resonance phase, can be estimated from Amin based on the relationship between G and $A_{min}$ in the resonance phase.

RESULTS

I. Amplitude Frequency Response Curves

FIG. 26A shows the amplitude frequency response curves of medical viscosity standards (also referred to as Medical standard fluids (MSFs)) of different viscosities varying from 1.2 cP to 10 cP. This Example notice that there are multiple peaks observed for the low viscosity drops compared to high viscosity drops. While it appears as if there are multiple resonance peaks, however in reality, the energy of the drop which is undergoing quadrupole shape oscillations during forcing is translated into other modes of oscillation when approaching its resonance frequency and as it moves away from the resonance frequency, the drop gets back to quadrupole oscillation. This leads to an artificial appearance of two or more peaks instead of one true resonance peak that lies somewhere between the two or more peaks observed. The lower the viscosity, there is a wider range of frequencies around the resonance where this happens as seen in case of MSF 1.2 which has around 21.5 Hz difference between the appearance of two peaks. As the viscosity increases however, this gap between the multiple peaks decreases as the difference is reduced to around 14.6.8 Hz, 13.1 Hz. 12.9 Hz and 8.2 Hz respectively for MSF 1.6. MSF 2. MSF 4, and MSF 6 respectively.

The issue disappears all together for MSF 10. This suggests that the samples with lower viscosities have less stability to stay in quadrupole oscillation near resonance compared to those with higher viscosity. That said, this Example did not observe the same behavior in blood plasma whose viscosity at room temperature is within the range of MSF 1.2 to MSF 2. To further investigate, this Example compared the ARF curves of 5% (w/v) dextran solutions (FIG. 26B), one with a lower molecular weight (MW 35000-45000) and one with a higher molecular weight (MW 2000000). This Example observed the appearance of multiple peaks in dextran solution with MW 35000-45000 compared to only one peak in dextran solution with MW 2000000. While the viscosity difference between the two dextran solutions appears to be an obvious reason for this behavior, similar to that observed in the MSFs, another key difference is the molecular structure and entanglements of the polymer chains within the solutions. The ability of the higher molecular weight dextran solution to form a stable fiber structure compared to the lower molecular weight dextran solution may explain why it is more stable during the quadrupole oscillation. The presence of proteins such as albumin, globulins, fibrinogen and the like in blood plasma may be involved in stabilizing it even though its viscosity is less.

FIG. 26C shows AFR curves of untreated blood plasma (in dashed lines) and re-calcified blood plasma (solid lines) at 0, 2.5 and 5 minutes, respectively. This FIG. aims to explain the damping of the AFR curves over time leading to a decrease in peak amplitude as well as a shift in peak frequency to the left i.e toward higher frequency. In case of untreated blood plasma, where no change in elasticity is expected over time, the decrease in peak amplitude is mainly attributed to viscous damping, which leads to approximately 0.2V amplitude decrease in 5 minutes. Around 5 Hz shift in peak frequency is also observed due to slight decrease in effective radius of the drop caused by evaporation. In case of re-calcified blood plasma however, there is a similar decrease in peak amplitude and shift in peak frequency at 2.5 minutes, but there is a significant drop in peak amplitude as well as shift in peak frequency at 5 minutes. This is mainly attributed to an increase in both viscosity and elasticity of blood plasma due to clotting. At this time point, there is a shift from resonance phase to non-resonance phase in which there is no peak observed, hence it is not possible to measure parameters such as peak amplitude, peak frequency and quality factor. However, in this Example it was still possible to measure other parameters like AUC, Amin and Amax even in the non-resonance phase. This is one of the main reasons why this Example chose normalized AUC to create calibration curves for measuring viscosity as AUC can be measured in both resonance and non-resonance phases.

II. Medical Standard Fluids

FIG. 27A shows peak amplitude measured for different medical standard fluids and the corresponding peak frequency normalized with radius is shown in FIG. 27B, $A_{peak}$ is a parameter sensitive to the sample viscosity with lower viscosities leading to higher peak amplitudes values while $\omega_{peak}$ is sensitive to elasticity and a higher $\omega_{peak}$ is indicative of higher elasticity. This Example observed a significant difference between the $A_{peak}$ values between MSF 4, 6 and 10 with viscosities 4 cP. 6 cP and 10 cp and no significant differences in peak frequency as expected since there is no difference in elasticity between these standards. Although there is some loss of energy near resonance in case of MSF 4 and 6, that did not cause a big impact on the measured peak frequency and amplitude may be due to a smaller range of frequencies in which this happens. However, for MSF 1.2, 1.4 and 2, the loss occurred is large enough that the measured highest peak is far enough from the true resonance peak and the expected effect is not as significant. Hence, Apeak can be used to measure viscosity when a single major peak is present, but is not the best parameter to rely on when there are multiple peaks present. FIG. 27C shows the normalized AUC parameter for different MSFs this Example tested and suggests that this is a better parameter to measure viscosity and the effect holds true even if there is an instability in quadrupole oscillation and cause multiple peaks. To validate this, this Example numerically estimated the normalized AUC for MSFs from the theoretical model using Eq. (3) and compare it with the normalized AUC measured experiments (FIG. 27D). When Spearman correlation is performed, this Example establishes a coefficient of 1 with ** significance confirming that normalized AUC may be a better parameter to estimate the viscosity. Additionally, there appears to be a linear relationship between normalized AUC from experiments compared to the model is used as a correction to create viscosity calibration curves.

III. Dextran

To test whether this Example can apply this technique to measure the viscosity of Newtonian fluids with different bulk viscosities but no bulk elasticity, aspects of the disclosed system 10 were utilized in experiments on dextran solutions (MW 2000000) of concentrations varying from 1 to 5% (w/v), brief switch to other modes of oscillation near resonance is observed in land 2% solutions but not in 3, 4 or 5%. Hence, for 1% and 2%, QF could not be calculated as well as Apeak and fpeak are slightly off the true values. The bulk viscosity difference between all the concentrations is captured by both Apeak (FIG. 28A) and normalized AUC (FIG. 28D) and by QF (FIG. 28B) for 3% to 5% solutions. This Example did not observe any differences in normalized ωpeak as there is no bulk elasticity for detxran. From the calibration curves create using the MSFs, viscosity of the dextran solutions has been estimated FIG. 28E), reported the viscosity of dextran solutions 3, 4 and 5% at varying temperatures and represented as dashed lines in FIG. 28E. The error in calculation of viscosity from the system compared to the reported value is around 14.9% for 3% dextran, 0.6% for 4% dextran and 3.7% for 5% dextran. The error in measurement may be due to the difference in solution preparation although the same dextran powder is used. Note that this Example used PBS but used a different stock solution to prepare the dextran solutions.

IV. Xanthan Gum

To determine how this technique can be used to detect both the viscosity and elasticity, this Example tested Xanthan Gums of concentrations 0.1, 0.2 and 0.3% (w/v). These fluids exhibit constant viscoelasticity, with higher concentration leading to higher bulk viscosity and elasticity. FIG. 29A shows that there is an increase in the value of $\omega_{peak}$ with increase in the gum concentration, but no change is observed with time. Elastic modulus is calculated from Eq. (4) based on the ωpeak values and shown in FIG. 29B. As expected.

0.3% gum has higher elastic modulus of about 22 Pa compared to 0.2 and 0.1% gum with about 7 Pa and 4 Pa respectively and remains about the same even after 5 minutes. FIG. 29C shows that the normalized AUC decrease with increasing gum concentrations indicating a that 0.3% gum has a higher viscosity compared to 0.2 and 0.1%. Again, there is no significant change in normalized AUC with time. FIG. 29D shows the viscosity values estimated from the calibration curves of the MSFs, with an average viscosity of 6.6 cP, 10.2 cP and 13.5 cP for 0.1, 0.2 and 0.3% xanthan gum respectively. An increase in viscosity is noted at 5 minutes. The viscosity of Xanthan gum is not expected to change over time, however, this is observed due to an apparent increase in viscosity within the drop due to evaporation.

V. Gelatin

After applying the disclosed systems and methods to a material like Xanthan gum with constant viscoelastic behavior, this Example further tested this on gelatin solutions which are characterized by an increase in bulk viscoelasticity over time due to polymerization and gelation. Gelatin solutions of different concentrations will exhibit different rates of gelation. This Example tested 2, 3 and 4% gelatin solutions to assess their viscosity and elasticity during the gelation process. FIG. 30A and FIG. 30B shows the change in $\omega_{peak}$ and G, respectively with time for different gelatin concentrations. It appears that gelation is quickly initiated in 4% gelatin and continues to increase the bulk elasticity until reaching maximum gelation around 49 Pa within 8 minutes after which ωpeak disappears as non-resonance phase begins. G reached about 43 Pa in 12.5 minutes for 3% gelatin and about 34 Pa in 20 minutes for 2% gelatin. This demonstrates that the change in bulk elasticity can be successfully measured and this technique is also sensitive to different rates of gelation as seen between different concentrations of gelatin. FIG. 30C and FIG. 30D shows the change in normalized AUC and viscosity for different gelatin solutions which are undergoing gelation at a different rate. The normalized AUC continues to decrease for each gelatin drop indicating an increase in viscosity during gelation and is sensitive to the rate at which each sample undergoes gelation. The viscosity increases from around 49 cP to 160 cP within 1 minute for 2% gelatin before reaching saturation at 200 cP in around 10.5 minutes whereas 3% gelatin's viscosity goes from 80 cP to 175 cP in 1 minute before saturating at 200 cP in 2.5 minutes and 4% gelatin's viscosity starts at 127 cP and saturates to 200 cP within 30 seconds. Although this Example was able to measure the different initial viscosities for these gelatin solutions, they all saturate to 200 cP, indicating that the drops are already turned into gel form from liquid form within 30 seconds to 2 minutes.

VI. Blood Plasma

Since the disclosed systems and methods can be used to measure the viscoelastic changes of the drop during gelation/polymerization, this technique can be applied to blood plasma to estimate the change in viscoelasticity during clotting. FIG. 31A shows the change in elastic modulus for untreated Blood Plasma (control group) as well as Blood plasma treated with APTT reagent and re-calcified to initiate coagulation (clotting group) as well as G value estimated from Amin for the clotting group. This Example observed that there was no change in bulk elasticity in the control group but an increase in elasticity in the clotting group until reaching a plateau at 5 minutes. The G value estimated from Amin appears to be changing similar to G calculated from Eq. (4) proving that G estimation from Amin is a valid approach in the non-resonance phase and can be reliably used to measure elastic modulus. FIG. 31B shows the change in viscosity of the control and the clotting groups. The initial viscosity of blood plasma is estimated to be around 1 37 cP which agrees with the previously reported values of blood plasma viscosity and reached to about 3.5 cP in 6 minutes before saturation. On the other hand, the viscosity of the control plasma also increases to about 2.4 cP in 10 minutes. As there is no clotting, this apparent increase is mainly attributed to the drop evaporation. There is drop evaporation even in the clotting group, however the dominant effect is clotting. FIG. 31C shows the difference between the viscosities of the control and the clotting group. This curve indicates the absolute change in viscosity due to clot formation as it removes the effect of evaporation. This curve is valuable to extract clinical information during to clot formation.

FIG. 31D shows the coagulation parameters, reaction time (RT), fibrin formation rate (FFR) and Maximum fibrin level (MFL) extracted from the viscous tweezograph (FIG. 31B) for the clotting group. RT is the onset time of viscosity change, FFR is the maximum rate of change of viscosity with time. MFL is the maximum viscosity at the plateau. FIG. 31E shows the coagulation parameters-clot initiation time (CIT), time to firm clot formation (TFCF), clotting time (CT), clotting rate (CR), maximum clot firmness (MCF) and time to reach peak (TRP). CIT indicates the onset of the blood plasma elasticity change, TFCF is the time taken to for the clot stiffness to reach plateau, clotting time is the difference between the CIT and TFCF indicating total time from clot initiation to reaching plateau, CR is the maximum rate of elasticity change, MCF is the maximum value of elastic modulus reached at plateau and TRP is the time to reach the maximum rate of change of elasticity.

FIG. 32A indicates the elastic tweezograph of the coagulating citrated wholeblood treated with aPTT reagent and CaCl2 and the coagulation parameters CIT, TFCT, CT. CR and MCF extracted from this tweezograph are shown in FIG. 32C. The viscous tweezograph is shown in FIG. 32B and parameters extracted from viscous tweezograph RT, FFR and MFL have been shown in FIG. 32D. Traditionally, fibrin kinetics are measured only from blood plasma and not from whole blood because these methods are based on turbidity measurements which are limited to the sample opacity. Hence such measurements were limited to blood plasma only but cannot be successfully done on whole blood. However, with the disclosed systems and methods, the fibrin kinetics can be extracted from the viscous tweezograph. Therefore, this eliminates the need for blood plasma coagulation assays to determine fibrin kinetics and just by using a single dop of blood, this Example can get a complete coagulation profile with a comprehensive set of parameters.

FIGS. 33A, 33B and 33C show the AFR curves of water and 5% (w/v) dextran solutions of molecular weight MW 35000 to 45000 and MW 2000000 respectively. FIG. 33D shows the parameters extracted from AFR including sum of amplitudes of all the peaks in the instability region (if present), total AUC. AUC of the instability region and the bandwidth of instability. The main difference between the three groups is the presence or absence of dextran molecules, and with different molecular weights. There is a clear difference in the AFR curves as well as parameters between the control group (without any dextran molecules), low MW dextran group, and high MW dextran group. This Example observed a decrease in instability with an increase in the molecular weight of dextran. By correlating the differences in the parameters between different groups with their molecular weight, the disclosed systems and methods can be used to capture and quantify the molecular weight differences between different fluids similar to that shown with the dextran example.

FIG. 34A shows the AFR curves of MSF 1.2 and blood plasma and FIG. 34B shows the parameters measured from the AFR curves. This FIG. explains the ability of the AFR method to detect and quantify the plasma proteins such as albumin Although the viscosity of the MSF 1.2 and blood plasma are identical (1.2 cP) and is evident from similar AUC measurements, presence of large protein molecules such as albumin made the blood plasma drop more stable and hence there is no region of instability observed in blood plasma AFR curve, however since there are no large stabilizing molecules present in MSF 1.2, this Example illustrates the region of instability. Thus this technique allows users to detect and quantify the presence of large proteins such as albumin in blood plasma and can also be applied to other biological fluids that contain large proteins to detect them.

FIGS. 35A, 35B and 35C show the AFR curves of PBS with no cells. 5% and 10% sheep Red blood cells respectively. FIG. 35D shows the parameters extracted from AFR including sum of amplitudes of all the peaks in the instability region (if present), total AUC, AUC of the instability region and the bandwidth of instability. The main difference between the three groups is the total number of Red Blood Cells. There is a clear difference in the AFR curves as well as parameters between the three groups with varying number of cells. This Example observed that the PBS with no RBC has instability near resonance, but the sample is more stable with addition of cells. By correlating the number of cells with the parameters extracted from AFR curves, the disclosed method can be used to quantify the number of cells in the samples.

FIGS. 36A and 36B show the change in the total amplitude and AUC between the control and coagulating blood plasma samples extracted from the amplitude response experiments. Instead of using a sweep in a range of frequencies to apply forcing on the sample, a single frequency is used to force the drop. In this case, the blood plasma samples are oscillated at 125 Hz to collect the stable amplitude response from the drop oscillation. The amplitude and AUC of control group sample increases slightly with time whereas they decrease for the clotting group and reach a plateau due to change in viscoelasticity as a result of sample clotting. The difference in change in amplitude and AUC between the control and clotting group are shown in FIGS. 36C and 36D, respectively from which the coagulation parameters can be obtained similar to those extracted from the viscous and elastic tweezographs previously discussed. Hence, this is another approach to extracting material properties with forced oscillation of drops using the system setup.

DISCUSSION

The Fourier spectra of the oscillations of droplets containing different concentrations of polystyrene microparticles revealed differences in resonant peak parameters. These resonant peaks are modes of oscillation, or overtones, and the number of these modes may depend on several factors, including viscosity. Spectra of the drops with higher concentrations of polystyrene microparticles were more likely to induce a resonant peak closer to that of the fundamental frequency than lower concentrations and were also more likely to induce resonant peaks with higher Q-factors than their lower concentration counterparts.

Due to their being a significant difference in the spectral shape between the oscillations of the concentrations, a concentration threshold can be established for the detection of the presence of microparticles. This threshold, however, is likely to be specific for polystyrene microparticles. Other types of microparticles, such as silica microparticles, or even biological cells will have different thresholds due to difference in acoustic properties, such as speed of sound and acoustic impedance. The effects of polystyrene microparticles on the viscosity of a dextran solution are very likely to be different than the effect of sickled red blood cells on whole blood. The same can be said for other properties which affect modes of oscillation, such as the elasticity of the object.

This is important also due to the finding that the initial hypothesis stating fluids with inner compositions of particles and like substances, cannot be proven true in its entirety. The resulting complex wave from the oscillations of dextran solutions with polystyrene microparticles did not compose of frequencies which were identical to that of the oscillations of the components individually. However, the possibility cannot be ruled out due to the fact that this is a new application with a new system—it is not clear how resonant peak parameters can be used to classify the presence of inner components, whether by just detecting the presence or also being able to translate the resonant peak parameters into information about concentration, similar to the way the peaks in acoustic impedance for Coulter counters are correlated with the volume of cells. It is promising, however, that Q-factor has been shown to have a linear relationship with concentration, signaling that Q-factor may be a method of assessing concentration of detected particles.

Also, settling on the appropriate experimental time for future classification analysis is key. It was observed that with time, the resonance frequencies of the high peaks (two peaks for 0.1 PSMP samples and one for the other concentrations and control) would continue to shift without stabilizing. Unique to 0.1 PSMP samples, the second high resonance peak would dissipate, opening the door for the possibility that interactions within the sample may dampen resonances with time—as seen in comparison of the individual reagents (5% dextran and 10% PSMP) and their resulting combinations in various concentrations. Future experimentation and more robust analysis is needed to further understand this phenomena.

More experimentation involving different media with differing compositions (including particles of a different size) is needed to verify this model and to give direction on possible methods of improvement, answering questions such as the concentration threshold for particle detection, whether drop calibration is needed (whether or not a control drop without particles is needed, and whether the model is capable of detecting different types of particles (for example, polystyrene vs, silica microparticles or red vs, white blood cells).

In order to tackle these questions, improvements to the system must be made. From an experimental perspective, a current limitation of the model is rooted in the experimental setup. The levitation system records drop oscillations in 2D. Drop oscillations will only block light as it moves up and down (y-axis) or left and right (x-axis). However, activity of the drop in the z-axis is not recorded. It is reasonable to think that a model with the goal of performing cellular chromatography on biological fluid samples would need all of the data necessary to make fine, precise decisions on what can be detected. A recording system which can capture all modes of oscillation and provide the necessary data to the model is needed.

Another limitation of the experimental setup resides in the levitator being an open system. With time, the resonant frequencies (F0, and in the case of.] PSMP, F1 also) of the levitated drop shifts. One of the reasons for this shift may be that the radius shrinks with each minute of recording due to evaporation. Time was not found to cause significant differences in any of the F0, F1, or their respective Q-factors-however, this is likely because experimental analysis was only considered for modulation sweeps over 5 minutes. Had the experimental analysis considered the sweeps up to 10 minutes, it is likely that time would have caused a significant effect on the results, since the radius of the droplet would have had more time to shrink. Although a humidifier may be used to control the experimental atmosphere and slow down evaporation of the levitated sample, a system in which airflow can be more finely controlled would be beneficial to limiting experimental variability.

From an analytical perspective, a problem which can be encountered in comparing spectra of different concentrations, is the lack of normalization. A similar problem is found in speech recognition systems, where the system attempts to capture similar sounds made from different speakers. What if the person has an accent? How does the system still recognize the sound? For this application, most of the time the fundamental frequency of different levitated drops from the same solution will differ. Simply averaging the resonant frequencies of the different drops would not be an accurate representation of the spectral shape. It would be more accurate to evaluate the spectral patterns-just as with speech, the spectral pattern should remain the same regardless of frequency values. More research on evaluation methods of spectral patterns is required to develop a more robust spectroscopy model in the hopes of translating it into a deep learning neural network for the purposes of detecting the presence of these same microparticles in new samples.

The disclosed technology provides a Non-contact real-time measurement of rheological properties of fluids by using a very small sample volume. There is no sample contamination and no measurement errors due to wall contact. While QATT technique allows to measure elasticity, this oscillatory acoustic tweezing method allows the user to measure both the viscosity and elasticity (via elastic modulus) of the sample fluids.

In the acoustic tweezing spectroscopy method, several parameters can be measured from the raw data curve such as peak amplitude, peak frequency, quality factor, area under the curve, amplitude at minimum frequency and amplitude at maximum frequency. All these parameters are either sensitive to viscosity or elasticity or both and serve as indicators of viscosity or elasticity as long as resonance is observed. However, when this experiment is continued over several minutes, this Example observed a few things like drop in peak amplitude and area under the curve values, inability to capture the bandwidth to measure quality factor, and even complete disappearance of the resonance peak especially in the sample drops undergoing polymerization. This can be attributed mainly to the viscous damping, rapid increase in elasticity as well as drop evaporation. While each of these can independently cause this phenomenon, a combination of two or more of these can cause a rapid shift from resonance mode to non-resonance mode. Example, a highly viscous drop can lose resonance faster than a less viscous drop. 4% gelatin drop with much more increase in elasticity can go into non-resonance mode in less than five minutes compared to a 2% gelatin drop which has resonance until about 15 to 20 minutes. While parameters like peak amplitude, peak frequency and quality factor cannot be extracted in the non-resonance AFR curves, other parameters such as AUC and amplitude at minimum frequency can still be obtained to measure the viscosity and elasticity from these experiments.

The ability of this method to detect rheological properties of fluids with such a small volume opens up the scope for several applications with significant benefits This can be applied to coagulating whole blood and blood plasma for detecting the bleeding or thrombotic risk in patients with coagulation disorders and other diseases in which the coagulation is altered. Other than coagulation related applications, the blood viscosity is already known as an important early indicator of Cardio vascular disease. Although there are several viscometers available in the market, and blood viscosity is a key indicator to detect these diseases, blood viscosity assay is not a routine lab test because of the problems associated with sample volume requirement. However, with the disclosed systems and methods, blood viscosity monitoring can be a new routine. This technique can also be used in pharmaceutical in different stages of drug development and testing especially the drugs that have an effect on blood rheology. Often times, drug development and testing is done in small animal models such as mice or rats, which bave very limited amount of blood inside them. Usually, the animal needs to be sacrificed in order to extract enough blood from its body to perform a regular laboratory test on its blood while testing the drugs. However, this technique enables to the drug effect on blood rheology using only one drop of blood, which can be easily extracted from the animal without sacrificing it. Additionally, during clinical trials, the patients participating in these trials are tested several times throughout the trial to monitor the drug effect which needs multiple blood draws and a lot of blood taken from the patients especially if the test is done several times during the trial. Again, the present systems and methods can significantly reduce the amount of sample needed for such tests making it easy, convenient and less risky for patients. Overall, this can significantly lower the cost of drug development and testing with providing benefits of low sample requirements. This technique can also be applied on assessing the rheological and structural components of other biological fluids such as synovial fluid, amniotic fluid, mucus, saliva, seminal fluid etc, whose rheology is altered in disease conditions. Overall, this serves as a diagnostic tool to detect several diseases in which one or more of the biological fluids have altered rheology due to the disease.

CONCLUSION

The platform presented here can detect the presence of particles of a micrometer diameter size within media. The platform uses the technique of acoustic tweezing to trap and manipulate objects in air, avoiding the risk of contamination or inaccurate experimental results while reducing the amount of sample needed for experiments. By applying a modulation signal to the wave field, oscillations by the levitated sample could be induced and tracked by a photodiode system, as the light being received by the photodiode is linearly correlated with the drop's oscillatory patterns.

Because biological fluids are complex samples with a variety of components, such as cells and proteins, samples of a chosen media mixed with a solution of polystyrene microparticles were made to mimic biological fluids with cells of a micrometer diameter. Due to the difference in acoustic properties between the media and the microparticles, the response to the modulation signal will differ, therefore contributing oscillations at differing frequencies to the overall oscillation by the levitated drop. Therefore, the oscillation of the drop can be recorded as a complex signal which can be broken down into its frequency components by applying a Fast Fourier Transform.

The experiments reported in thesis indicate that changes in the composition of a fluid sample will alter its resonance frequencies, and that a concentration threshold must be reached for the model to detect the presence of the additive (in this case, polystyrene microparticles) in the media. These fundamental conclusions verify the potential of this model to be used for clinical diagnostics, to detect the presence of cells, proteins, and molecules in biological fluid samples for the purpose of diagnosing pathologies. However, improvements to the model as well as further experimentation with biological fluids such as whole blood are needed to validate the model's ability to achieve its purpose.

Ranges can be expressed herein as from "about" one particular value, and/or to "about" another particular value. When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the term "subject" refers to the target of administration, e.g., an animal. Thus, the subject of the herein disclosed methods can be a human, non-human primate, horse, pig, rabbit, dog, sheep, goat, cow, cat, guinea pig or rodent. The term does not denote a particular age or sex. Thus, adult and newborn subjects, as well as fetuses, whether male or female, are intended to be covered. In one aspect, the subject is a mammal. A patient refers to a subject afflicted with a disease or disorder. The term "patient" includes human and veterinary subjects.

Although the disclosure has been described with reference to preferred embodiments, persons skilled in the art will recognize that changes may be made in form and detail without departing from the spirit and scope of the disclosed apparatus, systems and methods

The invention claimed is:

1. A noncontact in vitro method of analyzing a sample, comprising:
   levitating the sample using an acoustic carrier signal at a first frequency;
   perturbing the sample using an acoustic modulation signal at one or more second frequencies;
   measuring the oscillations of the sample resulting from the acoustic modulation signal to obtain amplitude measurements against time;
   analyzing amplitude measurements against time to calculate an extracted parameter; and
   filtering the amplitude measurements with a bandpass filter, wherein one or more second frequencies is a single frequency.

2. The noncontact in vitro method of claim 1, further comprising:

repeating one or more steps with a fluid of known viscosity, wherein the one or more steps are selected from a list consisting of levitating the sample using an acoustic carrier signal at a first frequency, perturbing the sample using an acoustic modulation signal at one or more second frequencies, measuring the oscillations of the sample resulting from the acoustic modulation signal to obtain amplitude measurements against time, analyzing amplitude measurements against time to calculate an extracted parameter, and filtering the amplitude measurements with a bandpass filter.

3. The noncontact in vitro method of claim 1, further comprising generating a calibration curve using the extracted parameters of a fluid of known viscosity.

4. The noncontact in vitro method of claim 1, further comprising estimating at least one characteristic of the sample by plotting its extracted parameter on a calibration curve.

5. The noncontact in vitro method of claim 4, wherein the at least one characteristic is viscosity.

6. The noncontact in vitro method of claim 1, wherein the one or more second frequencies be between about 1000 Hz to about 10 Hz.

7. The noncontact in vitro method of claim 1, wherein the one or more second frequencies be between about 150 Hz to about 50 Hz.

8. The noncontact in vitro method of claim 1, wherein the amplitude measurements against time are analyzed by generating an AFR curve from which the extracted parameters are calculated.

9. The noncontact in vitro method of claim 8, wherein the extracted parameter is area under the curve (AUC), peak frequency (fpeak), peak amplitude (Apeak), lowest frequency at half-frequency width (f1/2left), highest frequency at half-frequency width (f1/2right), minimum amplitude (Amin), maximum amplitude (Amin), quality factor (QF) and fpeak, the sum of several Apeaks, the bandwidth of instability, and/or the AUC of instability.

10. The noncontact in vitro method of claim 9, wherein the QF is calculated by dividing a resonant frequency of the AFR over a frequency range centered on the resonant frequency.

11. The noncontact in vitro method of claim 10, wherein the resonant frequency is the frequency at which a maximum amplitude of the AFR curve is observed.

12. The noncontact in vitro method of claim 10, wherein the frequency range is between about 30% to about 70% of the frequency at which a maximum amplitude is observed.

13. The noncontact in vitro method of claim 1, wherein the amplitude measurements against time are measured with a viscous tweezograph.

14. The noncontact in vitro method of claim 1, wherein the biological sample is whole blood or blood plasma.

\* \* \* \* \*